(12) United States Patent
Yang et al.

(10) Patent No.: US 12,177,289 B2
(45) Date of Patent: Dec. 24, 2024

(54) REMOTE ASSISTANCE METHOD AND SYSTEM, ELECTRONIC DEVICE, AND STORAGE MEDIUM

(71) Applicant: Huawei Technologies Co., Ltd., Shenzhen (CN)

(72) Inventors: Zhihui Yang, Shenzhen (CN); Liwei Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/307,242

(22) Filed: Apr. 26, 2023

(65) Prior Publication Data

US 2023/0262110 A1 Aug. 17, 2023

Related U.S. Application Data

(63) Continuation of application No. PCT/CN2021/116514, filed on Sep. 3, 2021.

(30) Foreign Application Priority Data

Oct. 27, 2020 (CN) .......................... 202011167175.3

(51) Int. Cl.
*G06F 3/048* (2013.01)
*H04L 67/025* (2022.01)
*H04W 4/80* (2018.01)

(52) U.S. Cl.
CPC ............. *H04L 67/025* (2013.01); *H04W 4/80* (2018.02)

(58) Field of Classification Search
CPC .............................. H04L 67/025; H04W 4/80
See application file for complete search history.

(56) References Cited

U.S. PATENT DOCUMENTS

| 9,369,820 | B2 * | 6/2016 | Jan ..................... H04M 1/72415 |
| 10,116,505 | B2 * | 10/2018 | Kim ..................... H04L 12/282 |
| 10,263,803 | B2 * | 4/2019 | Ansari ................. G05B 19/042 |
| 10,453,331 | B2 * | 10/2019 | Su ....................... H04N 21/4131 |
| 10,678,400 | B2 * | 6/2020 | Kreiner ................. G06F 3/0481 |
| 10,701,661 | B1 * | 6/2020 | Coelho ................. H04W 4/023 |

(Continued)

FOREIGN PATENT DOCUMENTS

| CN | 104038560 A | 9/2014 |
| CN | 104135443 A | 11/2014 |

(Continued)

*Primary Examiner* — David Phantana-angkool
(74) *Attorney, Agent, or Firm* — Conley Rose, P.C.

(57) ABSTRACT

A remote assistance method includes: a first device as an assisted device obtains first information and starts a first remote assistance application in the first device, where the first information includes an application identifier of a second application for controlling a second device and an identifier for indicating that the second device supports a remote control; the first device sends a remote assistance request to a third device as an assisting device using the first remote assistance application, where the remote assistance request carries the application identifier; the third device receives the remote assistance request and starts a second remote assistance application, where a control interface of the second application is displayed in the second remote assistance application; and a control instruction is received on the control interface.

20 Claims, 27 Drawing Sheets

(56) References Cited

U.S. PATENT DOCUMENTS

| | | | |
|---|---|---|---|
| 10,922,583 B2* | 2/2021 | Kaehler | G06T 19/006 |
| 11,244,561 B1* | 2/2022 | Fuchs | H04W 12/68 |
| 11,350,264 B2* | 5/2022 | Chen | G06F 3/0482 |
| 11,533,302 B2* | 12/2022 | Denker | G06Q 10/087 |
| 11,943,286 B2* | 3/2024 | Feng | H04L 67/148 |
| 2010/0169791 A1* | 7/2010 | Pering | G06F 3/1454 |
| | | | 715/740 |
| 2014/0173069 A1 | 6/2014 | Kim et al. | |
| 2014/0309812 A1* | 10/2014 | Lee | H04L 67/12 |
| | | | 701/2 |
| 2015/0268648 A1* | 9/2015 | Zhang | G05B 15/02 |
| | | | 700/90 |
| 2017/0078154 A1* | 3/2017 | Ansari | H04L 12/2818 |
| 2018/0077237 A1 | 3/2018 | An et al. | |
| 2018/0313544 A1* | 11/2018 | Lee | F24C 7/085 |
| 2019/0272740 A1* | 9/2019 | James | H04N 21/42204 |
| 2019/0281326 A1 | 9/2019 | Zhang | |
| 2019/0391716 A1* | 12/2019 | Badr | G06F 3/0482 |
| 2020/0184805 A1* | 6/2020 | James | H04W 88/06 |
| 2020/0234077 A1* | 7/2020 | Wang | H04L 67/131 |
| 2020/0319765 A1* | 10/2020 | Badr | G06F 3/167 |
| 2020/0322178 A1* | 10/2020 | Wang | H04W 4/021 |
| 2020/0342676 A1* | 10/2020 | Koohmarey | H04L 67/12 |
| 2021/0342047 A1* | 11/2021 | Badr | G06F 3/011 |
| 2022/0240819 A1* | 8/2022 | Lee | G16H 10/60 |
| 2022/0272399 A1* | 8/2022 | Zhang | H04N 21/43615 |
| 2023/0119058 A1* | 4/2023 | Crettenand | G05B 15/02 |
| | | | 700/39 |
| 2023/0199866 A1* | 6/2023 | Chung | H04W 76/14 |
| | | | 370/328 |
| 2023/0259250 A1* | 8/2023 | Xu | G06F 9/451 |
| | | | 715/727 |
| 2023/0379706 A1* | 11/2023 | Morishita | H04W 12/69 |

FOREIGN PATENT DOCUMENTS

| | | |
|---|---|---|
| CN | 108668139 A | 10/2018 |
| CN | 109587536 A | 4/2019 |

\* cited by examiner

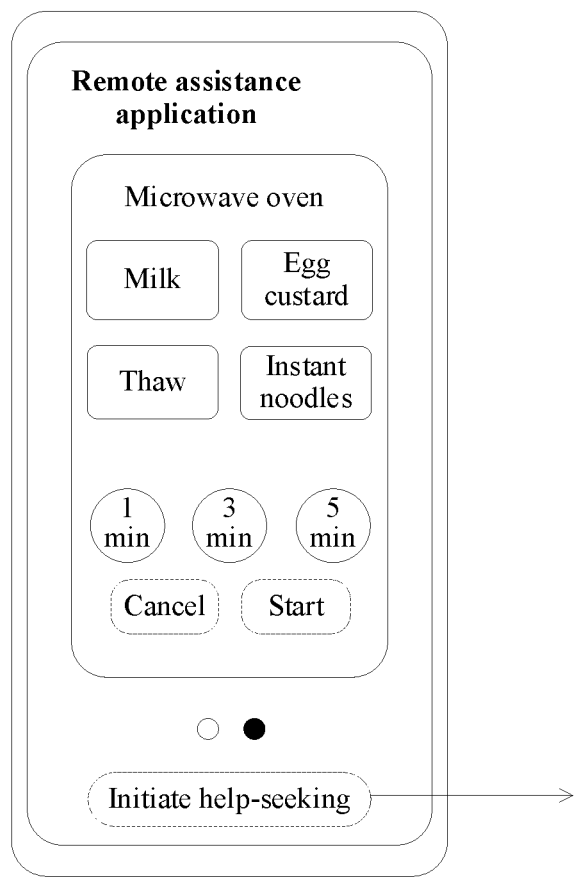
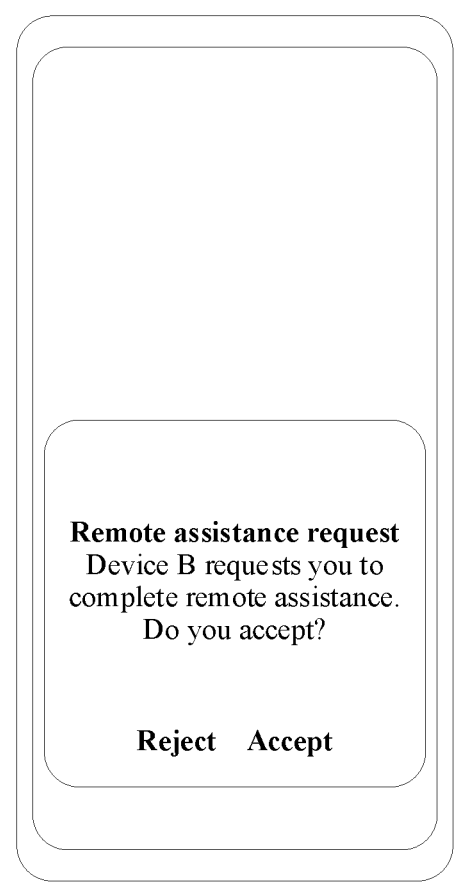
FIG. 6C
FIG. 6D

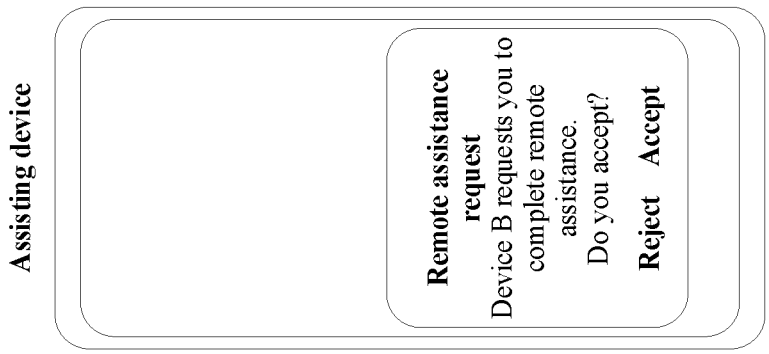
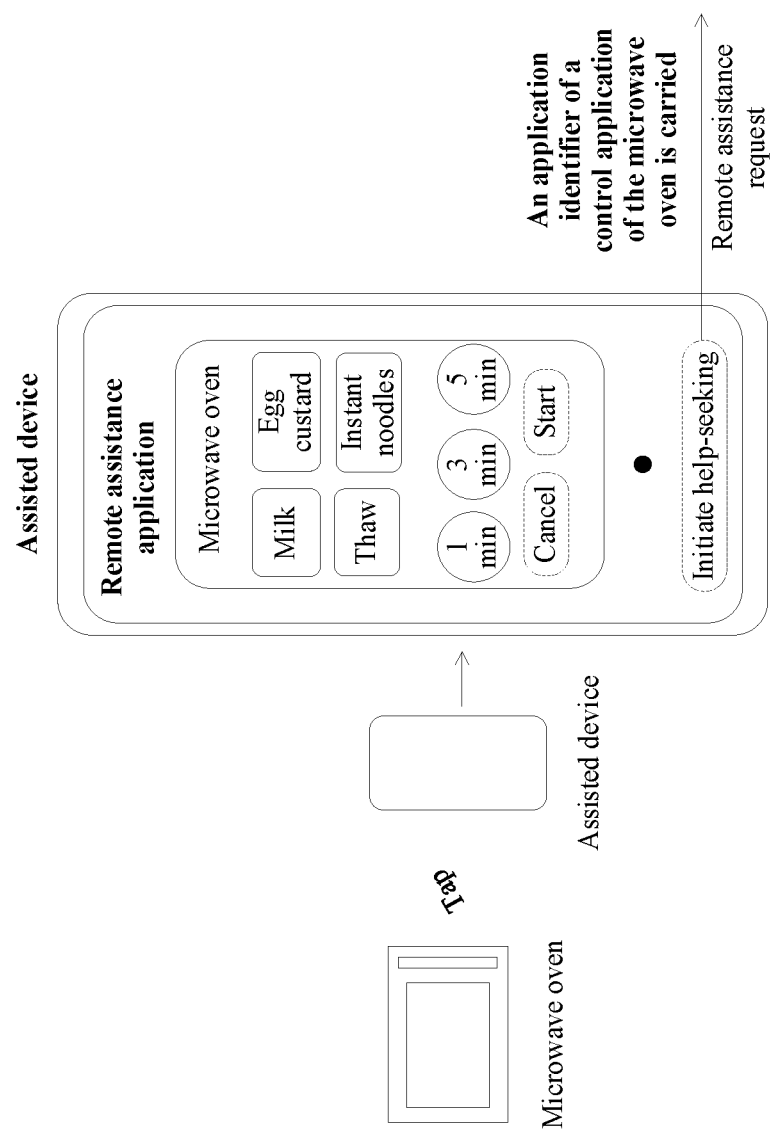
FIG. 12A
FIG. 12B
FIG. 12C

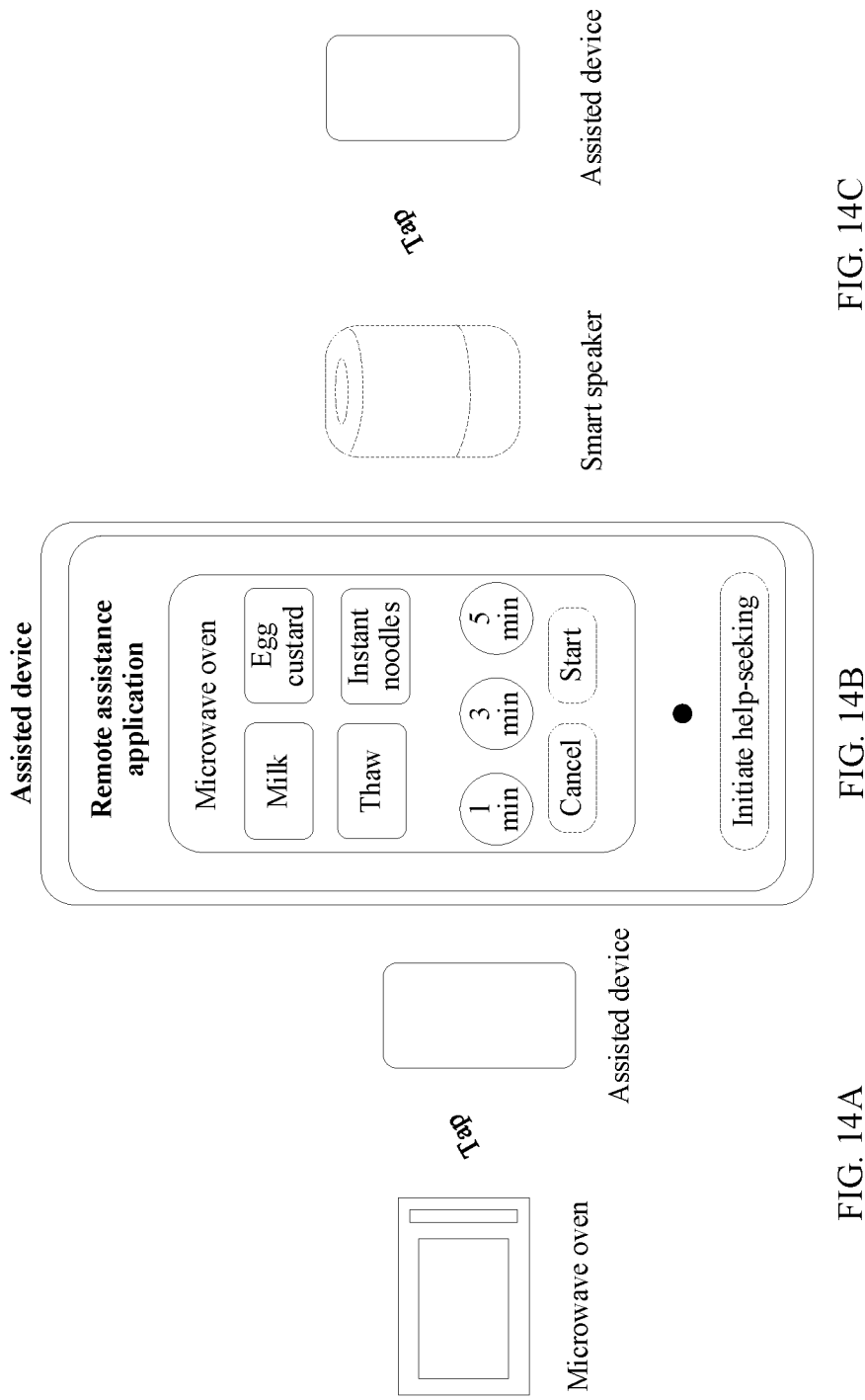

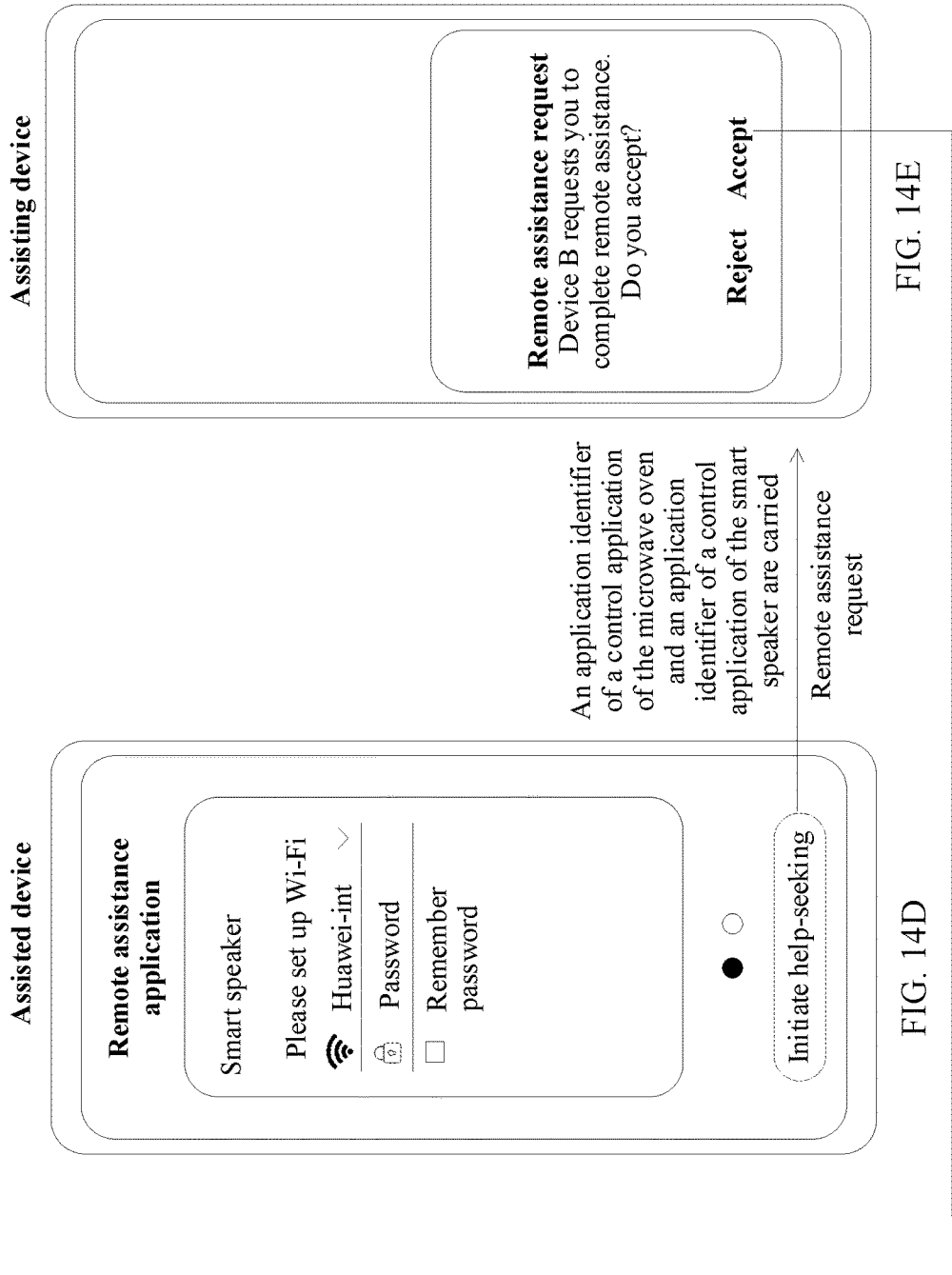

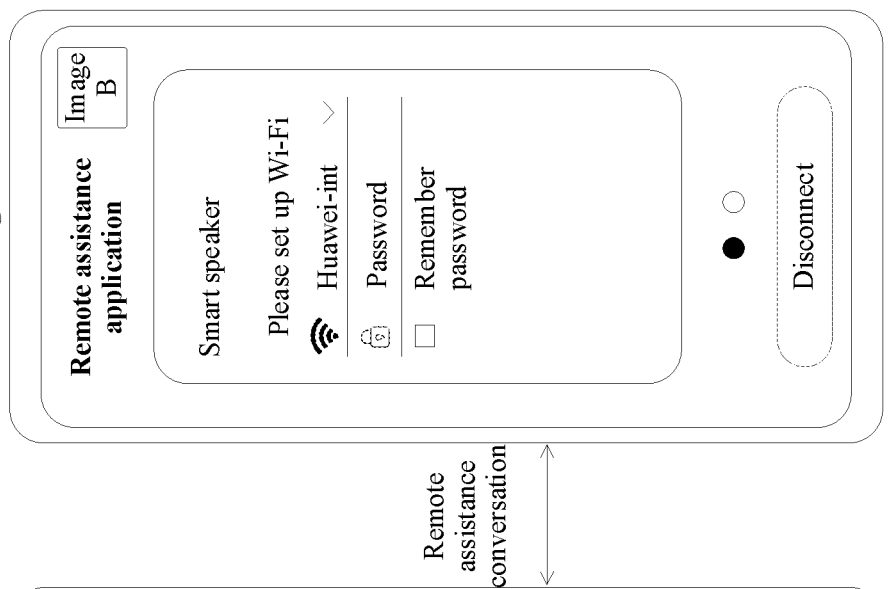
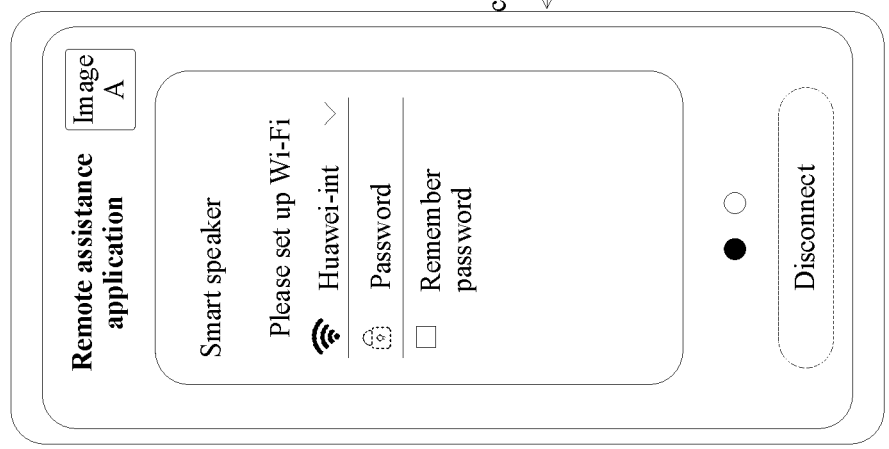
FIG. 14F

TO FIG. 15D

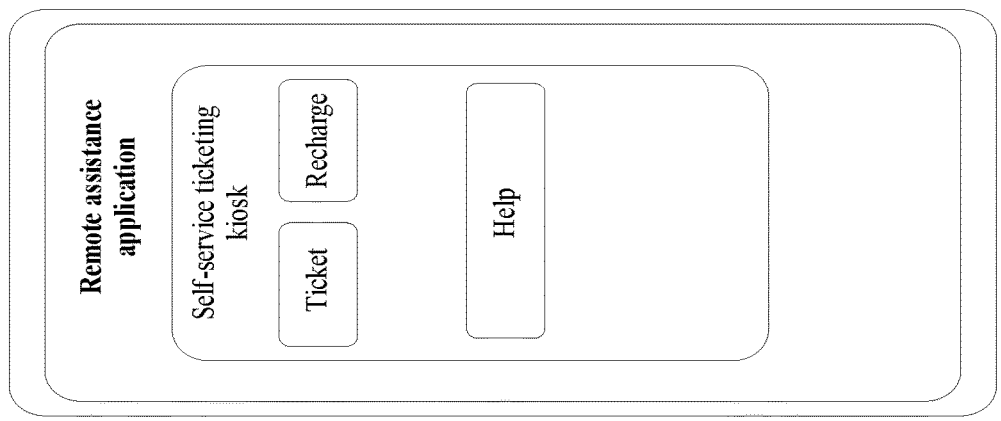

```
                                                          ┌─ 1601
┌─────────────────────────────────────────────────────────────────────────┐
│ After obtaining first information, a first device starts a first remote assistance application in │
│  the first device, where the first information includes an application identifier of a second     │
│   application for controlling a second device and an identifier for indicating that the second    │
│    device supports remote control, the first device is a preset assisted device, and the second   │
│                            device is a controlled device                                          │
└─────────────────────────────────────────────────────────────────────────┘
                                         │
                                         │                ┌─ 1602
                                         ▼
┌─────────────────────────────────────────────────────────────────────────┐
│ The first device sends a remote assistance request to a third device by using the first remote   │
│  assistance application, where the third device is an assisting device of the first device, the  │
│   remote assistance request carries the application identifier of the second application, and    │
│   the remote assistance request is used to indicate the third device to start a second remote    │
│   assistance application and remotely control the second device based on the second remote       │
│                      assistance application and the second application                            │
└─────────────────────────────────────────────────────────────────────────┘
```

FIG. 16

```
                                                          ┌─ 1701
┌─────────────────────────────────────────────────────────────────────────┐
│    A third device starts, in response to receiving a remote assistance request, a                │
│      second remote assistance application in the third device, where the remote                  │
│   assistance request carries an application identifier of a second application for               │
│    controlling a second device, the second device is a controlled device, and a                  │
│    control interface of the second application is displayed in the second remote                 │
│                              assistance application                                               │
└─────────────────────────────────────────────────────────────────────────┘
                                         │
                                         │                ┌─ 1702
                                         ▼
┌─────────────────────────────────────────────────────────────────────────┐
│  The third device remotely controls the second device in response to a control                   │
│       instruction received on the control interface of the second application                    │
└─────────────────────────────────────────────────────────────────────────┘
```

FIG. 17

REMOTE ASSISTANCE METHOD AND SYSTEM, ELECTRONIC DEVICE, AND STORAGE MEDIUM

CROSS-REFERENCE TO RELATED APPLICATIONS

This is a continuation of International Patent Application No. PCT/CN2021/116514 filed on Sep. 3, 2021, which claims priority to Chinese Patent Application No. 202011167175.3 filed on Oct. 27, 2020. The disclosures of the aforementioned applications are hereby incorporated by reference in their entireties.

TECHNICAL FIELD

Embodiments of this disclosure relate to the field of remote assistance, and in particular, to a remote assistance method and system, an electronic device, and a storage medium.

BACKGROUND

With the development of the Internet of things, an increasing quantity of electronic devices are found in a home environment. These electronic devices may be directly operated by a user, or may be indirectly operated by the user with a matching application (APP) on another electronic device (for example, a mobile phone). However, it is difficult for some elderly people to directly operate these electronic devices or indirectly operate these electronic devices with a matching application on another electronic device.

There are some remote assistance methods to help the elderly people use these electronic devices. For example, a mobile phone of an elderly parent establishes a remote assistance connection to a mobile phone of a child, the mobile phone of the elderly parent records a screen, and sends recorded screen data to the mobile phone of the child, the child performs an operation on the mobile phone of the child based on the received screen data, and sends location coordinates of the operation to the mobile phone of the elderly parent, and the mobile phone of the elderly parent generates a corresponding control instruction based on the received location coordinates, so as to control the electronic devices. However, this remote assistance method requires very high network quality, and this causes a relatively poor interface display effect during remote assistance. In addition, in this remote assistance method based on screen sharing, the electronic devices are still operated with the matching application on the mobile phone of the elderly parent. As a result, a large quantity of matching applications are downloaded onto the mobile phone of the elderly parent, and excessive storage space is occupied.

SUMMARY

Embodiments of this disclosure provide a remote assistance method and system, an electronic device, and a storage medium, so as to resolve the problems of an existing remote assistance method requiring high network quality but having a poor display effect during remote assistance, and causing occupation of excessive storage space of an assisted electronic device.

To achieve the foregoing objective, this disclosure uses the following technical solutions.

According to a first aspect, an embodiment of this disclosure provides a remote assistance method, applied to a system including a first device, a second device, and a third device. The first device is a preset assisted device. The second device is a controlled device. The third device is an assisting device of the first device. The method includes, after obtaining first information, the first device starts a first remote assistance application in the first device, where the first information includes an application identifier of a second application for controlling the second device and an identifier for indicating that the second device supports a remote control. The first device sends a remote assistance request to the third device by using the first remote assistance application, where the remote assistance request carries the application identifier of the second application. The third device starts, in response to receiving the remote assistance request, a second remote assistance application in the third device, where a first control interface of the second application is displayed in the second remote assistance application. The third device remotely controls the second device in response to a control instruction received on the control interface of the second application.

In this embodiment of this disclosure, the first device may serve as an assisted device used by a user that needs assistance, and during the use of the assisted device, the assisted user may trigger, in a short-range communication manner, the assisted device to obtain the first information of the controlled device. Subsequently, without further operations on the assisted device, the assisted user can notify an assisting user on the side of the third device serving as an assisting device to remotely control the second device serving as the controlled device, thereby simplifying operations of the assisted user. In addition, because the assisted device sends, to the assisting device, the remote assistance request that carries the application identifier of the control application of the controlled device, high network quality is not required. Finally, because control of the controlled device is completed on the assisting device, control applications corresponding to all controlled devices may not be installed on the assisted device. Therefore, excessive storage space of the assisted device used by the assisted user may not be occupied.

In a possible implementation of the first aspect, the method further includes the following. The second remote assistance application of the third device displays a first interface, where the first interface includes a first control, and the first control is used to indicate the third device to search for an electronic device. The third device detects a first operation entered by a user, where the first operation acts on the first control. The second remote assistance application of the third device displays, in response to the first operation, a second interface, where the second interface displays an identifier of a found electronic device, and the identifier of the found electronic device includes an identifier of the first device. The third device detects a second operation entered by the user, where the second operation acts on the identifier of the first device. The third device sends, in response to the second operation, a first request to the first device by using the second remote assistance application, where the first request carries account information of the third device, and the first request is used to indicate the first device to set the third device as an assisting device of the first device. The first device sends, in response to receiving the first request, the third device as an assisting device of the first device. The first device stores an assistance relationship between the first device and the third device, where the assistance relationship between the first device and the third device includes a correspondence between account information of the first device and the account information of the third device. The found electronic device may be one or more devices in a surrounding communication range that are discovered by the third device in a manner such as BLUETOOTH, a near-field communication (NFC), or WI-FI.

In a possible implementation of the first aspect, after the first device sets the third device as an assisting device of the first device, the method further includes the following. The first device sends second information to the third device, where the second information carries the account information of the first device, or the second information carries an assistance relationship between the account information of the first device and the account information of the third device. The third device sets, in response to receiving the second information, the first device as an assisted device of the third device. The third device stores the assistance relationship between the first device and the third device.

In this embodiment of this disclosure, the assistance relationship between the first device and the third device may be preset. In a possible implementation of the first aspect, the first device is provided with an NFC module, and the first information is NFC tag information of the second device, and starting, by the first device after obtaining first information, a first remote assistance application in the first device includes, after the first device obtains the NFC tag information of the second device by using the NFC module, starting the first remote assistance application in the first device.

In this embodiment of this disclosure, the first device obtains the NFC tag information of the second device by using the NFC module. Such a manner of obtaining the first information does not require an operation on the first device and the second device by the user. For the user, it is simple and convenient.

In a possible implementation of the first aspect, starting, by the third device in response to receiving the remote assistance request, a second remote assistance application in the third device includes displaying, by the third device in response to receiving the remote assistance request, a third interface, where the third interface includes a second control and a third control, the second control is used to accept the remote assistance request, and the third control is used to reject the remote assistance request, detecting a third operation entered by the user, where the third operation acts on the second control, and starting, by the third device in response to the third operation, the second remote assistance application in the third device.

In this embodiment of this disclosure, after receiving the remote assistance request, the assisting user may provide the third interface including the second control and the third control, so that the assisting user may reject the current remote assistance request via the third control when it is inconvenient for the assisting user to help the assisted user. The third operation may be a touch operation of the user on the third interface, or may be a voice of the user. Diversified trigger operations are provided, which enhances user experience from the perspective of the assisting user.

In a possible implementation of the first aspect, that a control interface of the second application is displayed in the second remote assistance application includes an entrance icon of the second application is displayed in the second remote assistance application, and the second remote assistance application displays the control interface of the second application in response to an entry instruction received via the entrance icon of the second application.

In a possible implementation of the first aspect, the system further includes a first cloud platform, and sending, by the first device, a remote assistance request to the third device by using the first remote assistance application includes sending, by the first device, a first remote assistance request to the first cloud platform by using the first remote assistance application, where the first remote assistance request carries the application identifier of the second application, and the first remote assistance request is used to indicate the first cloud platform to send a second remote assistance request to the third device, and sending, by the first cloud platform in response to receiving the first remote assistance request, the second remote assistance request to the third device, where the second remote assistance request carries the application identifier of the second application.

In this embodiment of this disclosure, when the assisted user uses the first device to seek help from the third device used by the assisting user, the first device and the third device are usually in different spaces, or even the first device and the third device are far away from each other. Therefore, it is inconvenient for the first device and the third device to communicate in a short-range communication manner. Therefore, a communication connection between the first device and the third device may be established by using the first cloud platform.

In a specific implementation process, the first remote assistance request and the second remote assistance request may be the same or different. For example, because different communications protocols are used between different devices, although both the first remote assistance request and the second remote assistance request carry the application identifier of the second application, other information carried in the first remote assistance request and the second remote assistance request or encapsulation formats thereof may be different. In the specific implementations of this disclosure, a transmission process of the remote assistance request is described by using an example in which the first remote assistance request and the second remote assistance request are the same. It does not mean that the first remote assistance request and the second remote assistance request are necessarily the same.

In a possible implementation of the first aspect, the system further includes the first cloud platform, and remotely controlling, by the third device in response to a control instruction received on the first control interface of the second application, the second device includes sending, by the third device in response to the control instruction received on the first control interface of the second application, a first control instruction to the first cloud platform by using the second remote assistance application, where the first control instruction is used to instruct the second device to perform an operation corresponding to the control instruction, sending, by the first cloud platform in response to receiving the first control instruction, a second control instruction to the first device, where the second control instruction is used to instruct the second device to perform the operation corresponding to the control instruction, and sending, by the first device in response to receiving the second control instruction, a third control instruction to the second device, where the third control instruction is used to instruct the second device to perform the operation corresponding to the control instruction.

In this embodiment of this disclosure, a transmission path of the control instruction from the third device to the second device is: the third device—the first cloud platform—the first device—the second device. Because different transmission protocols may be used for different devices, the following three cases may exist for the first control instruction, the second control instruction, and the third control instruction: all the same, partially the same, and all different. However, the first control instruction, the second control instruction, and the third control instruction are all used to instruct the second device to perform the operation corresponding to the control instruction. In the specific embodiments of this disclosure, a transmission process of the control instruction is described by using an example in which the first control instruction, the second control instruction, and the third control instruction are all the same. However, it does not mean that the first control instruction, the second control instruction, and the third control instruction are necessarily all the same.

In a possible implementation of the first aspect, the first information further includes a device identifier of the second device, and before sending, by the first device, a third control instruction to the second device, the method further includes establishing, by the first device, a connection to the first device based on the device identifier of the second device.

In this embodiment of this disclosure, if the third control instruction needs to be sent to the second device by the first device, a connection needs to be established between the first device and the second device in advance.

In a possible implementation of the first aspect, the system further includes a first cloud platform, and remotely controlling, by the third device in response to a control instruction received on the first control interface of the second application, the second device includes sending, by the third device in response to the control instruction received on the first control interface of the second application, a fourth control instruction to the first cloud platform by using the second remote assistance application, where the fourth control instruction is used to instruct the second device to perform an operation corresponding to the control instruction, and sending, by the first cloud platform in response to receiving the fourth control instruction, a fifth control instruction to the second device, where the fifth control instruction is used to instruct the second device to perform the operation corresponding to the control instruction, or sending, by the third device in response to the control instruction received on the first control interface of the second application, a sixth control instruction to the first cloud platform by using the second remote assistance application, where the sixth control instruction is used to instruct the second device to perform an operation corresponding to the control instruction, and sending, by the first cloud platform in response to receiving the sixth control instruction, a seventh control instruction to a second cloud platform, where the seventh control instruction is used to instruct the second device to perform the operation corresponding to the control instruction, the seventh control instruction is used to instruct the second cloud platform to send an eighth control instruction to the second device, and the eighth control instruction is used to instruct the second device to perform the operation corresponding to the control instruction.

In this embodiment of this disclosure, a plurality of manners is provided to implement transmission of the control instruction from the assisting device to the controlled device. This improves flexibility during implementation of this disclosure. In this embodiment of this disclosure, the following several cases may exist for the first control instruction to the eighth control instruction: all the same, partially the same, and all different. In the specific embodiments of this disclosure, a transmission process of the control instruction is described by using an example in which the first control instruction to the eighth control instruction are the same, and it does not mean that the first control instruction to the eighth control instruction are necessarily the same. In addition, for ease of differentiation, the control interface of the second application displayed by the second remote assistance application of the third device is denoted as the first control interface, and the control interface of the first application displayed by the first remote assistance application of the first device is denoted as the second control interface. The first control interface and the second control interface have the same function. Because operating systems of the first device and the third device may be different, layouts and/or displayed content of the first control interface and the second control interface may be different. In the specific implementations, although the control interface is used as an example, it does not mean that the first control interface and the second control interface are necessarily the same.

In a possible implementation of the first aspect, after starting, by the first device, the first remote assistance application in the first device, the method further includes displaying, by the first remote assistance application in the first device, a second control interface of the second application.

In this embodiment of this disclosure, the first device used by the assisted user may also display the second control interface of the second application, so that the assisted user may also enter the control instruction on the second control interface of the second application displayed on the first device, thereby providing a more flexible manner of controlling the second device.

In a possible implementation of the first aspect, the method further includes a control interface of the first remote assistance application in the first device includes a fourth control, where the fourth control is used to initiate help-seeking to the third device, and sending, by the first device in response to a fourth operation, the remote assistance request to the third device by using the first remote assistance application, where the fourth operation acts on the fourth control.

In this embodiment of this disclosure, the fourth control is set on the control interface of the first remote assistance application of the assisted device to initiate help-seeking to the third device, thereby improving flexibility of implementing the remote assistance method provided in this embodiment of this disclosure.

In a possible implementation of the first aspect, before sending, by the first device, a remote assistance request to the third device by using the first remote assistance application, the method further includes obtaining, by the first device, third information, where the third information includes an application identifier of a fourth application for controlling a fourth device and an identifier for indicating that the fourth device supports remote control, and displaying, by the first device, a control interface of the fourth application by using the first remote assistance application, and sending, by the first device, a remote assistance request to the third device by using the first remote assistance application includes sending, by the first device, the remote assistance request to the third device by using the first remote assistance application, where the remote assistance request carries the application identifier of the second application and the application identifier of the fourth application.

In this embodiment of this disclosure, the assisted user may control the first device to approach a plurality of controlled devices to obtain information (for example, the first information and one or more pieces of third information) about the plurality of controlled devices, and then initiate help-seeking, so as to control the plurality of controlled devices in one help-seeking process, and provide diversified remote assistance manners.

In a possible implementation of the first aspect, after sending, by the first device, a remote assistance request to the third device by using the first remote assistance application, the method further includes obtaining, by the first device, fourth information, where the fourth information includes an application identifier of a fifth application for controlling a fifth device and an identifier for indicating that the fifth device supports remote control, displaying, by the first device, a control interface of the fifth application by using the first remote assistance application, and sending, by the first device, the application identifier of the fifth application to the third device.

In this embodiment of this disclosure, even if the user has initiated help-seeking to the third device by using the first device, the user may further control the first device to approach at least one controlled device to obtain information (for example, at least one piece of fourth information) about the at least one controlled device. In this case, the assisted user does not need to initiate help-seeking again. This provides diversified remote assistance manners.

In a possible implementation of the first aspect, the second remote assistance application of the third device receives application identifiers of control applications of at least two controlled devices, the at least two controlled devices include the second device and the fourth device, and after the third device displays the first control interface of the second application by using the second remote assistance application, the method further includes switching, in response to a received first switching instruction, the first control interface of the second application displayed in the second remote assistance application of the third device to the control interface of the fourth application.

In a possible implementation of the first aspect, after the second remote assistance application of the third device receives the application identifiers of the control applications of the at least two controlled devices, where when the at least two controlled devices include the second device, the control applications of the at least two controlled devices include the second application, when the at least two controlled devices include the fourth device, the control applications of the at least two controlled devices include the fourth application, and when the at least two controlled devices include the fifth device, the control applications of the at least two controlled devices include the fifth application, the method further includes displaying, by the third device, the first control interface by using the second remote assistance application, where the first control interface is any one of the control interfaces of the control applications of the at least two controlled devices, and switching, in response to the received first switching instruction, the first control interface displayed in the second remote assistance application of the third device to the second control interface, where the second control interface is any one of the control interfaces of the control applications of the at least two controlled devices except the first control interface.

In this embodiment of this disclosure, when receiving the application identifiers of the control applications of the at least two controlled devices, the third device may display the control interfaces of the control applications of the plurality of controlled devices in a display switching manner.

In a possible implementation of the first aspect, the method further includes obtaining, by the first device, the first information by approaching or tapping the second device.

In this embodiment of this disclosure, the first device may obtain the first information by approaching or tapping the second device in an NFC manner, a BLUETOOTH proximity discovery manner, or WI-FI Aware proximity discovery.

In a possible implementation of the first aspect, before sending, by the first device, a remote assistance request to the third device by using the first remote assistance application, the method further includes searching, by the first device, for an assisting device of the first device according to the stored assistance relationship, where the assisting device of the first device includes the third device.

In this embodiment of this disclosure, the assistance relationship between the first device and the third device is pre-stored in the first device, and the assistance relationship between the first device and the third device determines that the first device is an assisted device of the third device, and that the third device is an assisting device of the first device. Therefore, the first device may search for the prestored assisting device of the first device.

In a possible implementation of the first aspect, the method further includes, when there are at least two assisting devices of the first device, the third device is an assisting device with the highest priority in the assisting devices of the first device.

In this embodiment of this disclosure, a plurality of assisting devices may be set for one first device. For example, mobile phones of a plurality of children of an elderly parent may be set as assisting devices of a mobile phone of the elderly parent. In addition, the plurality of assisting devices may be prioritized. Help-seeking may be initiated to an assisting device with the highest priority. When the help-seeking to the assisting device with the highest priority fails, help-seeking may be initiated to an assisting device with the second highest priority. This improves user experience during implementation of the remote assistance method provided in this embodiment of this disclosure.

According to a second aspect, an embodiment of this disclosure provides a remote assistance method, applied to a first device. The method includes the following. The first device starts, after obtaining first information, a first remote assistance application in the first device, where the first information includes an application identifier of a second application for controlling a second device and an identifier for indicating that the second device supports remote control, the first device is a preset assisted device, and the second device is a controlled device. The first device sends a remote assistance request to a third device by using the first remote assistance application, where the third device is an assisting device of the first device, the remote assistance request carries the application identifier of the second application, and the remote assistance request is used to indicate the third device to start a second remote assistance application and remotely control the second device based on the second remote assistance application and the second application.

In a possible implementation of the second aspect, the first device sets, in response to receiving a first request, the third device as an assisting device of the first device, where the first request is sent by the third device to the first device, and the first request carries account information of the third device, the first device stores an assistance relationship between the first device and the third device, where the assistance relationship between the first device and the third device includes a correspondence between account information of the first device and the account information of the third device, and the first device sends second information to the third device, where the second information carries the account information of the first device, or the second information carries the correspondence between the account information of the first device and the account information of the third device, and the second information is used to indicate the third device to set the first device as an assisted device of the third device.

In a possible implementation of the second aspect, the first device is provided with an NFC module, and the first information is NFC tag information of the second device, and starting, by the first device after obtaining first information, a first remote assistance application in the first device in response to determining, according to the identifier for indicating that the second device supports remote control, that the second device supports remote control includes, after the first device obtains the NFC tag information of the second device by using the NFC module, starting the first remote assistance application in the first device.

In a possible implementation of the second aspect, sending, by the first device, a remote assistance request to a third device by using the first remote assistance application includes sending, by the first device, a first remote assistance request to a first cloud platform by using the first remote assistance application, where the first remote assistance request carries the application identifier of the second application, the first remote assistance request is used to indicate the first cloud platform to send a second remote assistance request to the third device, and the second remote assistance request carries the application identifier of the second application.

In a possible implementation of the second aspect, after starting, by the first device, a first remote assistance application in the first device, the method further includes displaying, by the first remote assistance application in the first device, a control interface of the second application.

In a possible implementation of the second aspect, the method further includes a control interface of the first remote assistance application in the first device includes a fourth control, where the fourth control is used to initiate help-seeking to the third device, detecting a fourth operation entered by a user, where the fourth operation acts on the fourth control, and sending, by the first device in response to the fourth operation, the remote assistance request to the third device by using the first remote assistance application.

In a possible implementation of the second aspect, before sending, by the first device, a remote assistance request to a third device by using the first remote assistance application, the method further includes obtaining, by the first device, third information, where the third information includes an application identifier of a fourth application for controlling a fourth device and an identifier for indicating that the fourth device supports remote control, and displaying, by the first device, a control interface of the fourth application by using the first remote assistance application, and sending, by the first device, a remote assistance request to a third device by using the first remote assistance application includes sending, by the first device, the remote assistance request to the third device by using the first remote assistance application, where the remote assistance request carries the application identifier of the second application and the application identifier of the fourth application.

In a possible implementation of the second aspect, after sending, by the first device, a remote assistance request to a third device by using the first remote assistance application, the method further includes obtaining, by the first device, fourth information, and displaying, by the first device, a control interface of a fifth application by using the first remote assistance application, where the fourth information includes an application identifier of a fifth application for controlling a fifth device and an identifier for indicating that the fifth device supports remote control, displaying, by the first device, a control interface of the fifth application by using the first remote assistance application, and sending, by the first device, the application identifier of the fifth application to the third device.

In a possible implementation of the second aspect, the first device obtains application identifiers of control applications of at least two controlled devices, the at least two controlled devices include the second device and the fourth device, and after the displaying, by the first remote assistance application in the first device, a second control interface of the second application, the method further includes switching, in response to a received second switching instruction, the control interface of the second application currently displayed in the first remote assistance application of the first device to the control interface of the fourth application.

In a possible implementation of the second aspect, the method further includes obtaining, by the first device, the first information by approaching or tapping the second device.

In a possible implementation of the second aspect, before sending, by the first device, a remote assistance request to a third device by using the first remote assistance application, the method further includes searching, by the first device, for an assisting device of the first device according to the stored assistance relationship, where the assisting device of the first device includes the third device.

In a possible implementation of the second aspect, the method further includes, when there are at least two assisting devices of the first device, the third device is an assisting device with the highest priority in the assisting devices of the first device.

According to a third aspect, an embodiment of this disclosure provides a remote assistance method, applied to a third device. The method includes the following. The third device starts, in response to receiving a remote assistance request, a second remote assistance application in the third device, where the remote assistance request is sent by a first device to the third device by using a first remote assistance application, the remote assistance request carries an application identifier of a second application for controlling a second device, and a control interface of the second application is displayed in the second remote assistance application of the third device. The third device remotely controls the second device in response to a control instruction received on the control interface of the second application.

In a possible implementation of the third aspect, the method further includes displaying, by the second remote assistance application of the third device, a first interface, where the first interface includes a first control, and the first control is used to indicate the third device to search for an electronic device, detecting, by the third device, a first operation entered by a user, where the first operation acts on the first control, displaying, by the second remote assistance application of the third device in response to the first operation, a second interface, where the second interface displays an identifier of a found electronic device, and the identifier of the found electronic device includes an identifier of the first device, detecting, by the third device, a second operation entered by the user, where the second operation acts on the identifier of the first device, and sending, by the third device in response to the second operation, a first request to the first device by using the second remote assistance application, where the first request carries account information of the third device, and the first request is used to indicate the first device to set the third device as an assisting device of the first device.

In a possible implementation of the third aspect, starting, by the third device in response to receiving the remote assistance request, a second remote assistance application in the third device includes displaying, by the third device in response to receiving the remote assistance request, a third interface, where the third interface includes a second control and a third control, the second control is used to accept the remote assistance request, and the third control is used to reject the remote assistance request, detecting a third operation entered by the user, where the third operation acts on the second control, and starting, by the third device in response to the third operation, the second remote assistance application in the third device.

In a possible implementation of the third aspect, that a control interface of the second application is displayed in the second remote assistance application in the third device includes an entrance icon of the second application is displayed in the second remote assistance application in the third device, and the second remote assistance application displays the control interface of the second application in response to an entry instruction received via the entrance icon of the second application.

In a possible implementation of the third aspect, remotely controlling, by the third device in response to a control instruction received on the control interface of the second application, the second device includes sending, by the third device in response to the control instruction received on the control interface of the second application, a first control instruction to a first cloud platform by using the second remote assistance application, where the first control instruction is used to instruct the first cloud platform to send a second control instruction to the first device, the second control instruction is used to instruct the first device to send a third control instruction to the second device, and the first control instruction, the second control instruction, and the third control instruction are all used to instruct the second device to perform an operation corresponding to the control instruction, or sending, by the third device in response to the control instruction received on the control interface of the second application, a fourth control instruction to a first cloud platform by using the second remote assistance application, where the fourth control instruction is used to instruct the first cloud platform to send a fifth control instruction to the second device, and the fourth control instruction and the fifth control instruction are both used to instruct the second device to perform an operation corresponding to the control instruction, or sending, by the third device in response to the control instruction received on the control interface of the second application, a sixth control instruction to a first cloud platform by using the second remote assistance application, where the sixth control instruction is used to instruct the first cloud platform to send a seventh control instruction to a second cloud platform, the seventh control instruction is used to instruct the second cloud platform to send an eighth control instruction to the second device, and the sixth control instruction, the seventh control instruction, and the eighth control instruction are all used to instruct the second device to perform an operation corresponding to the control instruction.

In a possible implementation of the third aspect, the remote assistance request further carries an application identifier of a fourth application for controlling a fourth device, where the fourth device is a controlled device, and the method further includes displaying, by the third device, the control interface of the second application or a control interface of the fourth application in the second remote assistance application.

In a possible implementation of the third aspect, after starting, by the third device, a second remote assistance application in the third device, the method further includes receiving an application identifier of a fifth application for controlling a fifth device, and displaying, by the third device, a control interface of the fifth application in the second remote assistance application.

In a possible implementation of the third aspect, the second remote assistance application of the third device receives application identifiers of control applications of at least two controlled devices, the at least two controlled devices include the second device and the fourth application, and after the third device displays the first control interface of the second application by using the second remote assistance application, the method further includes switching, in response to a received first switching instruction, the control interface of the second application currently displayed in the second remote assistance application of the third device to the control interface of the fourth application.

According to a fourth aspect, an electronic device is provided, and includes a unit for starting a first remote assistance application configured to, after first information is obtained, start a first remote assistance application, where the first information includes an application identifier of a second application for controlling a second device and an identifier for indicating that the second device supports remote control, a first device is a preset assisted device, and the second device is a controlled device, and a remote assistance unit configured to send a remote assistance request to a third device by using the first remote assistance application, where the third device is an assisting device of the first device, the remote assistance request carries the application identifier of the second application, and the remote assistance request is used to indicate the third device to start a second remote assistance application.

According to a fifth aspect, an electronic device is provided, and includes a unit for starting a second remote assistance application configured to start, in response to reception of a remote assistance request, a second remote assistance application in a third device, where the remote assistance request is sent by a first device to the third device by using a first remote assistance application, the remote assistance request carries an application identifier of a second application for controlling a second device, the second device is a controlled device, and a control interface of the second application is displayed in the second remote assistance application, and a remote control unit configured for the third device to remotely control the second device in response to a control instruction received on the control interface of the second application.

According to a sixth aspect, an electronic device is provided, and includes a processor. The processor is configured to run a computer program stored in a memory, to implement the method according to any one of the implementations of the second aspect of this disclosure.

According to a seventh aspect, an electronic device is provided, and includes a processor. The processor is configured to run a computer program stored in a memory, to implement the method according to any one of the implementations of the third aspect of this disclosure.

According to an eighth aspect, a remote assistance system is provided, and includes the electronic device according to the sixth aspect and the electronic device according to the seventh aspect.

According to a ninth aspect, a chip system is provided, and includes a processor. The processor is coupled to a memory. The processor executes a computer program stored in the memory, to implement the method according to any one of the implementations of the second aspect and/or the method according to any one of the implementations of the third aspect of this disclosure.

According to a tenth aspect, a computer-readable storage medium is provided. The computer-readable storage medium stores a computer program, and when the computer program is executed by one or more processors, the method according to any one of the implementations of the second aspect and/or the method according to any one of the implementations of the third aspect of this disclosure are/is implemented.

According to an eleventh aspect, an embodiment of this disclosure provides a computer program product. When the computer program product is run on a device, the device is enabled to perform the method according to any one of the implementations of the second aspect and/or the method according to any one of the implementations of the third aspect of this disclosure.

It may be understood that for beneficial effects of the second aspect to the eleventh aspect, refer to the related description in the first aspect, and details are not described herein again.

BRIEF DESCRIPTION OF DRAWINGS

FIGS. 6A, 6B, 6C, and 6D are a schematic diagram of a process of an assisted device establishing a remote assistance conversation with an assisting device that is indicated in step 3 of the embodiment shown in FIG. 4;

FIGS. 12A, 12B, and 12C are schematic diagrams of an application scenario of a remote assistance method according to an embodiment of this disclosure;

FIGS. 14A, 14B, 14C, 14D, 14E, 14F, 14G, 14H, and 14I are schematic diagrams of an application scenario of a remote assistance method according to an embodiment of this disclosure;

FIGS. 15A, 15B, 15C, and 15D are a schematic diagram of a process of a first device displaying a control interface of a control application according to an embodiment of this disclosure;

FIG. 16 is a schematic flowchart of a remote assistance method performed by a first device according to an embodiment of this disclosure;

FIG. 17 is a schematic flowchart of a remote assistance method performed by a third device according to an embodiment of this disclosure;

DESCRIPTION OF EMBODIMENTS

In the following descriptions, for illustration instead of limitation, specific details such as a particular system structure and a technology are provided to make a thorough understanding of embodiments of this disclosure. However, a person skilled in the art should know that this disclosure may also be implemented in other embodiments without these specific details.

It should be understood that, when used in the specification and the appended claims of this disclosure, the term "include" indicates presence of the described features, entireties, steps, operations, elements, and/or components, but does not exclude presence or addition of one or more other features, entireties, steps, operations, elements, components, and/or sets thereof.

It should be further understood that, in embodiments of this disclosure, "one or more" refers to one, two, or more, and the term "and/or" describes an association between associated objects, and indicates that three relationships may exist. For example, A and/or B may indicate the following cases: only A exists, both A and B exist, and only B exists, where A and B may be singular or plural. The character "/" generally indicates an "or" relationship between the associated objects.

In addition, in the description of the specification and the appended claims of this disclosure, the terms "first", "second", "third", "fourth", and the like are merely used for distinguishing and description, and shall not be understood as an indication or implication of relative importance.

Reference to "an embodiment", "some embodiments", or the like described in the specification of this disclosure indicates that one or more embodiments of this disclosure include a specific feature, structure, or characteristic described with reference to the embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise emphasized in another manner. The terms "include", "have", and their variants all mean "include but are not limited to", unless otherwise emphasized in another manner.

Figure 1:
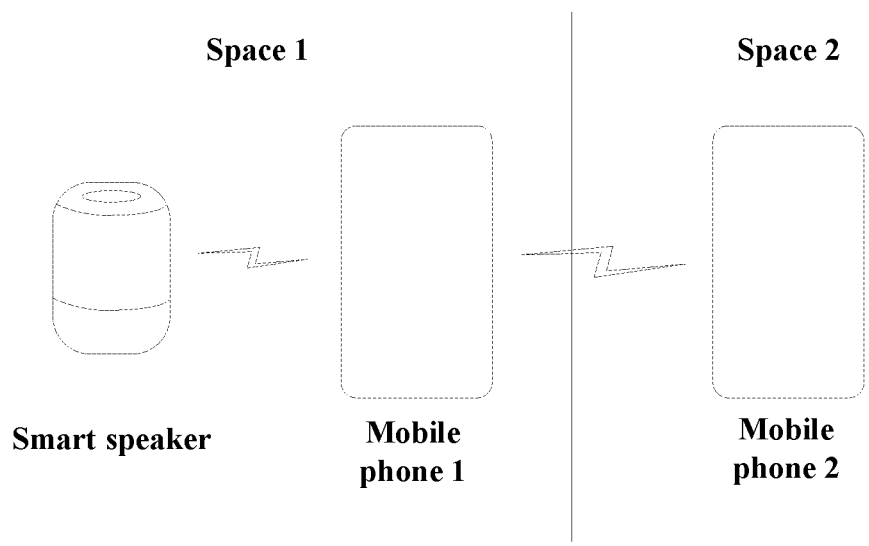
FIG. 1 is a schematic diagram of an application scenario of a remote assistance method according to an embodiment of this disclosure.

A remote assistance method provided in an embodiment of this disclosure may be applied to an application scenario shown in FIG. 1. As shown in FIG. 1, an electronic device such as a smart speaker may serve as a controlled device, and the controlled device is provided with an NFC module. A mobile phone 1 may serve as an assisted device for an assisted user to use, and the mobile phone 1 is provided with an NFC module. The smart speaker and the mobile phone 1 are in a same space. For example, the smart speaker and the mobile phone 1 are at a home of the assisted user corresponding to the mobile phone 1. A mobile phone 2 and the mobile phone 1 are in different spaces. For example, the mobile phone 2 is at a home or a company of an assisting user corresponding to the mobile phone 2. The mobile phone 2 serves as an assisting device for the assisting user to use. For example, when the assisted user is an elderly person, the assisting user may be a child of the elderly person.

When the assisted user wants to operate the smart speaker, the assisted user may tap the mobile phone 1 used by the assisted user against the smart speaker. The mobile phone 1 receives NFC tag information of the smart speaker, where the NFC tag information includes an application identifier of a control application of the smart speaker and an identifier indicating that the smart speaker supports remote control. The mobile phone 1 sends, to the mobile phone 2, a remote assistance request that carries the application identifier of the control application of the smart speaker, and the mobile phone 2 remotely controls the smart speaker based on the control application corresponding to the received application identifier.

It should be noted that, for ease of subsequent description, a scenario of tapping the assisted device against the controlled device to obtain the NFC tag information of the controlled device is subsequently referred to as a "OneHop" scenario.

In addition, the application scenario of the remote assistance method shown in FIG. 1 is merely used as an example, and does not constitute any limitation on the embodiments of this disclosure.

The remote assistance method provided in this embodiment of this disclosure may be applied to a system including a plurality of electronic devices. The electronic device in the system is not limited to the mobile phone 1 and the mobile phone 2 described in the foregoing application scenario, and may also be another electronic device, for example, a tablet computer, a wearable device, a notebook computer, an ultra-mobile personal computer (UMPC), a netbook, or a personal digital assistant (PDA). A specific type of the electronic device is not limited in the embodiments of this disclosure.

Figure 2:
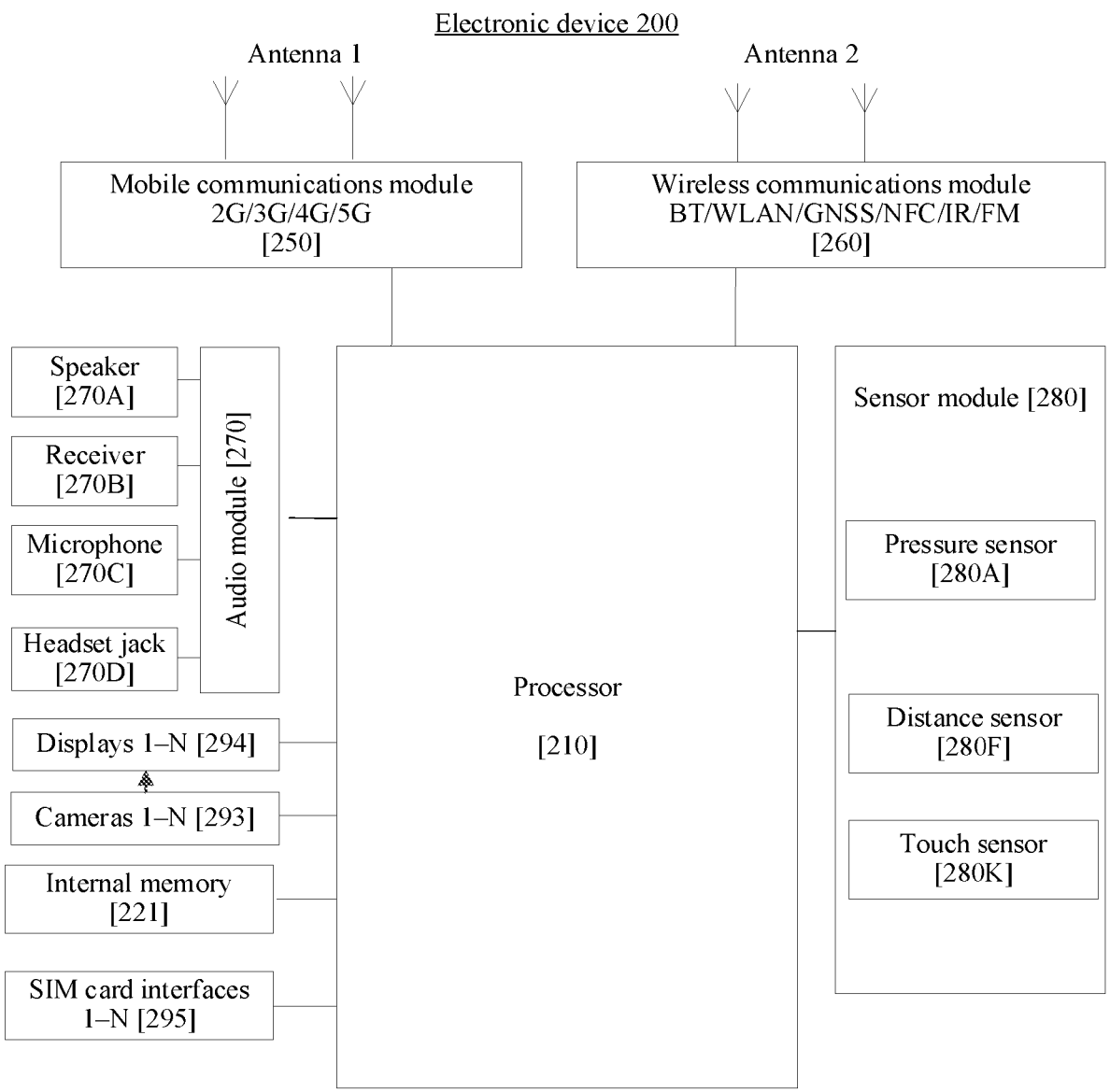
FIG. 2 is a schematic diagram of a hardware structure of an electronic device for performing a remote assistance method according to an embodiment of this disclosure.

FIG. 2 is a schematic diagram of a structure of an electronic device. The electronic device 200 may include a processor 210, an internal memory 221, an antenna 1, an antenna 2, a mobile communications module 250, a wireless communications module 260, an audio module 270, a speaker 270A, a receiver 270B, a microphone 270C, a headset jack 270D, a sensor module 280, an indicator 292, a camera 293, a display 294, a subscriber identity module (SIM) card interface 295, and the like. The sensor module 280 may include a pressure sensor 280A, a magnetic sensor 280D, a distance sensor 280F, a touch sensor 280K, and the like.

It may be understood that, the structures shown in embodiments of this disclosure do not constitute specific limitation on the electronic device 200. In some other embodiments of this disclosure, the electronic device 200 may include more or fewer components than those shown in the figure, or combine some components, or split some components, or have different component arrangements. The components shown in the figure may be implemented by hardware, software, or a combination of software and hardware.

The processor 210 may include one or more processing units. For example, the processor 210 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors. The processor 210 is configured to perform a remote assistance method in an embodiment of this disclosure, for example, the following step 301 to step 304.

The controller may be a nerve center and a command center of the electronic device 200. The controller may generate an operation control signal based on an instruction operation code and a time sequence signal, to complete control of instruction reading and instruction execution.

A memory may be further disposed in the processor 210, and is configured to store instructions and data. In some embodiments, the memory in the processor 210 is a cache. The memory may store instructions or data that has been used or cyclically used by the processor 210. If the processor 210 needs to use the instructions or the data again, the processor 210 may directly invoke the instructions or the data from the memory. In this way, repeated access is avoided, a waiting time of the processor 210 is reduced, and system efficiency is improved.

In some embodiments, the processor 210 may include one or more interfaces. The interface may include an Inter-Integrated Circuit (I2C) interface, an I2C Sound (I2S) interface, a pulse code modulation (PCM) interface, a universal asynchronous receiver/transmitter (UART) interface, a mobile industry processor interface (MIPI), a general-purpose input/output (GPIO) interface, a SIM interface, and the like.

The I2C interface is a two-way synchronization serial bus, and includes a serial data line (SDL) and a serial clock line (SCL). In some embodiments, the processor 210 may include a plurality of groups of I2C buses. The processor 210 may be separately coupled to the touch sensor 280K, a charger, a flash, the camera 293, and the like through different I2C bus interfaces. For example, the processor 210 may be coupled to the touch sensor 280K through the I2C interface, so that the processor 210 communicates with the touch sensor 280K through the I2C bus interface, to implement a touch function of the electronic device 200. For example, in an embodiment of this disclosure, an assisting user generates a control instruction by touching a control interface of a control application displayed on a display of a third device.

The I2S interface may be configured to perform audio communication. In some embodiments, the processor 210 may include a plurality of groups of I2S buses. The processor 210 may be coupled to the audio module 270 through the I2S bus, to implement communication between the processor 210 and the audio module 270. In some embodiments, the audio module 270 may transmit an audio signal to the wireless communications module 260 through the I2S interface, to implement a function of answering a call through a BLUETOOTH headset. For example, an assisted user answers voice information in a video or audio conversation of the assisting user by using a headset.

The PCM interface may also be used to perform audio communication, and sample, quantize, and code an analog signal. In some embodiments, the audio module 270 may be coupled to the wireless communications module 260 through a PCM bus interface.

In some embodiments, the audio module 270 may alternatively transfer an audio signal to the wireless communications module 260 through the PCM interface, to implement a function of answering a call by using a BLUETOOTH headset. Both the I2S interface and the PCM interface may be used for audio communication.

The UART interface is a universal serial data bus, and is configured to perform asynchronous communication. The bus may be a two-way communications bus. The bus converts to-be-transmitted data between serial communication and parallel communication.

In some embodiments, the UART interface is generally configured to connect the processor 210 and the wireless communications module 260.

It may be understood that, an interface connection relationship between the modules shown in this embodiment of this disclosure is merely an example for description, and does not constitute a limitation on the structure of the electronic device 200. In some other embodiments of this disclosure, the electronic device 200 may alternatively use an interface connection mode different from an interface connection mode in this embodiment, or a combination of a plurality of interface connection modes.

A wireless communication function of the electronic device 200 may be implemented by using the antenna 1, the antenna 2, the mobile communications module 250, the wireless communications module 260, the modem processor, the baseband processor, and the like.

The antenna 1 and the antenna 2 are configured to transmit and receive an electromagnetic wave signal. Each antenna in the electronic device 200 may be configured to cover one or more communications frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 250 may provide a wireless communication solution that includes second generation (2G)/third generation (3G)/fourth generation (4G)/fifth generation (5G) or the like and that is applied to the electronic device 200. The mobile communications module 250 may include at least one filter, a switch, a power amplifier, a low-noise amplifier (LNA), and the like. The mobile communications module 250 may receive an electromagnetic wave through the antenna 1, perform processing such as filtering or amplification on the received electromagnetic wave, and transmit the electromagnetic wave to the modem processor for demodulation. The mobile communications module 250 may further amplify a signal modulated by the modem processor, and convert the signal into an electromagnetic wave for radiation through the antenna 1.

In some embodiments, at least some functional modules in the mobile communications module 250 may be disposed in the processor 210. In some embodiments, at least some functional modules in the mobile communications module 250 may be disposed in a same component as at least some modules in the processor 210.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (not limited to the speaker 270A, the receiver 270B, or the like), or displays an image or a video by using the display 294. In some embodiments, the modem processor may be an independent component. In some other embodiments, the modem processor may be independent of the processor 210, and is disposed in a same component as the mobile communications module 250 or another function module.

The wireless communications module 260 may provide a wireless communications solution that is applied to the electronic device 200 and that includes a wireless local area network (WLAN) (such as WI-FI network), BLUETOOTH (BT), a global navigation satellite system (GNSS), frequency modulation (FM), an NFC technology, and an infrared (IR) technology. The wireless communications module 260 may be one or more components integrating at least one communications processing module. The wireless communications module 260 receives an electromagnetic wave by the antenna 2, performs frequency modulation and filtering processing on an electromagnetic wave signal, and sends a processed signal to the processor 210. The wireless communications module 260 may further receive a to-be-sent signal from the processor 210, perform frequency modulation and amplification on the signal, and convert the signal into an electromagnetic wave for radiation through the antenna 2. For example, the assisted device may transmit the control instruction to a controlled device by using a BLUETOOTH or WI-FI module in the assisted device.

In some embodiments, in the electronic device 200, the antenna 1 and the mobile communications module 250 are coupled, and the antenna 2 and the wireless communications module 260 are coupled, so that the electronic device 200 can communicate with a network and another device by using a wireless communications technology. The wireless communications technology may include a Global System for Mobile Communications (GSM), a General Packet Radio Service (GPRS), code-division multiple access (CDMA), wideband CDMA (WCDMA), time division-synchronous CDMA (TD-SCDMA), Long-Term Evolution (LTE), BT, a GNSS, a WLAN, NFC, FM, an IR technology, and/or the like. The GNSS may include a Global Positioning System (GPS), a global navigation satellite system (GLONASS), a BEIDOU navigation satellite system (BDS), a quasi-zenith satellite system (QZSS), and/or a satellite based augmentation system (SBAS).

The electronic device 200 implements a display function by using the GPU, the display 294, the application processor, and the like. The GPU is a microprocessor for image processing, and is connected to the display 294 and the application processor. The GPU is configured to perform mathematical and geometric computation, and render an image. The processor 210 may include one or more GPUs that execute program instructions to generate or change display information.

The display 294 is configured to display an image, a video, and the like. The display 294 includes a display panel. The display panel may be a liquid-crystal display (LCD), an organic light-emitting diode (LED) (OLED), an active-matrix OLED (AMOLED), a flexible LED (FLED), a Mini-LED, a MicroLED, a Micro-OLED, a quantum dot LED (QLED), or the like. In some embodiments, the electronic device 200 may include one or N displays 294, where N is a positive integer greater than 1.

For example, a video conversation between the assisted device and the assisting device may be implemented by using an ISP, a camera 293, a video codec, a GPU, a display 294, an application processor, and the like.

The ISP is configured to process data fed back by the camera 293. For example, during photographing, a shutter is pressed, light is transferred to a camera photosensitive element through a lens, an optical signal is converted into an electrical signal, and the camera photosensitive element transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 293.

The camera 293 is configured to capture a static image or a video. An optical image of an object is generated through the lens, and is projected onto the photosensitive element. The photosensitive element may be a charge-coupled device (CCD) or a complementary metal-oxide-semiconductor (CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as red, green, and blue (RGB) or luma, blue projection, and red projection (YUV). In some embodiments, the electronic device 200 may include one or N cameras 293, where N is a positive integer greater than 1.

The digital signal processor is configured to process a digital signal, and may process another digital signal in addition to the digital image signal.

The video codec is configured to compress or decompress a digital video. The electronic device 200 may support one or more video codecs. Therefore, the electronic device 200 can play or record videos in a plurality of encoding formats, for example, Moving Picture Experts Group (MPEG) 1, MPEG2, MPEG3, and MPEG4.

The internal memory 221 may be configured to store computer executable program code, where the executable program code includes instructions. The processor 210 executes various function applications and data processing of the electronic device 200 by running the instructions stored in the internal memory 221. The internal memory 221 may include a program storage area and a data storage area. The program storage area may store an operating system and an application program (for example, the control application of the controlled device) required by at least one function. The data storage area may store data created during the use of the electronic device 200.

In addition, the internal memory 221 may include a high-speed random-access memory (RAM), or may include a nonvolatile memory, for example, at least one magnetic disk storage device, a flash memory, or a Universal Flash Storage (UFS).

The electronic device 200 may implement an audio function by using the audio module 270, the speaker 270A, the receiver 270B, the microphone 270C, the headset jack 270D, the application processor, and the like. For example, an audio conversation between the assisted device and the assisting device is implemented.

The audio module 270 is configured to convert a digital audio signal into an analog audio signal for output, and also configured to convert an analog audio input into a digital audio signal. The audio module 270 may be further configured to code and decode an audio signal. In some embodiments, the audio module 270 may be disposed in the processor 210, or some functional modules in the audio module 270 are disposed in the processor 210.

The speaker 270A, also referred to as a "loudspeaker", is configured to convert an audio electrical signal into a sound signal. The electronic device 200 may listen to music or answer a hands-free call by using the speaker 270A.

The receiver 270B, also referred to as an "earpiece", is configured to convert an audio electrical signal into a sound signal. When the electronic device 200 answers a call or receives voice information, the receiver 270B may be placed close to a human ear to listen to a voice.

The microphone 270C, also referred to as a "mike" or a "mic", is configured to convert a sound signal into an electrical signal. When making a call or sending voice information, a user may make a sound by moving a human mouth close to the microphone 270C to input a sound signal to the microphone 270C. At least one microphone 270C may be disposed in the electronic device 200. In some other embodiments, two microphones 270C may be disposed in the electronic device 200, to collect a sound signal and further implement a noise reduction function. In some other embodiments, three, four, or more microphones 270C may alternatively be disposed in the electronic device 200, to collect a sound signal, reduce noise, identify a sound source, implement a directional recording function, and the like.

The headset jack 270D is configured to connect to a wired headset. The headset jack 270D may be the Universal Serial Bus (USB) interface 230, or may be a 3.5 millimeter (mm) Open Mobile Electronic Device Platform (OMTP) standard interface or a cellular telecommunications industry association of the United States of America (USA) (CTIA) standard interface.

The pressure sensor 280A is configured to sense a pressure signal, and may convert the pressure signal into an electrical signal. In some embodiments, the pressure sensor 280A may be disposed on the display 294. There are many types of pressure sensors 280A, such as a resistive pressure sensor, an inductive pressure sensor, and a capacitive pressure sensor. The capacitive pressure sensor may include at least two parallel plates made of conductive materials. Capacitance between electrodes changes when a force is applied to the pressure sensor 280A. The electronic device 200 determines pressure intensity based on the change of the capacitance. When a touch operation is performed on the display 294, the electronic device 200 measures intensity of the touch operation based on the pressure sensor 280A. The electronic device 200 may also calculate a touch location based on a detection signal of the pressure sensor 280A.

The distance sensor 280F is configured to measure a distance. The electronic device 200 may measure the distance through infrared or laser. In some embodiments, the assisted device may receive the NFC tag information through BLUETOOTH ranging, and during the BLUETOOTH ranging, the distance sensor 280F is used for ranging.

The touch sensor 280K is also referred to as a "touch panel". The touch sensor 280K may be disposed in the display 294, and the touch sensor 280K and the display 294 form a touchscreen, which is also referred to as a "touch control screen". The touch sensor 280K is configured to detect a touch operation performed on or near the touch sensor 280K. The touch sensor may transfer the detected touch operation to the application processor to determine a type of the touch event. Visual output related to the touch operation may be provided by using the display 294. In some other embodiments, the touch sensor 280K may alternatively be disposed on a surface of the electronic device 200, or disposed in a position different from the display 294.

The SIM card interface 295 is configured to connect to a SIM card. The SIM card may be inserted into the SIM card interface 295 or removed from the SIM card interface 295, to implement contact with or separation from the electronic device 200. The electronic device 200 may support one or N SIM card interfaces, where N is a positive integer greater than 1. The SIM card interface 295 may support a nano-SIM card, a micro-SIM card, a SIM card, and the like. A plurality of cards may be simultaneously inserted into a same SIM card interface 295. The plurality of cards may be of a same type or different types. The SIM card interface 295 may also be compatible with different types of SIM cards. The SIM card interface 295 may also be compatible with the external storage card. The electronic device 200 interacts with a network by using the SIM card, to implement a call function, a data communication function, and the like. In some embodiments, the electronic device 200 uses an eSIM, that is, an embedded SIM card. The eSIM card may be embedded into the electronic device 200, and cannot be separated from the electronic device 200.

A specific structure of an execution body of a remote assistance method is not particularly limited in the embodiments of this disclosure, provided that a program that records code of the remote assistance method in the embodiments of this disclosure can be run to perform communication according to the remote assistance method provided in the embodiments of this disclosure. For example, the execution body of the remote assistance method provided in the embodiments of this disclosure may be a function module in an electronic device that can invoke and execute a program, or may be a communications apparatus, for example, a chip, that is applied to the electronic device.

The remote assistance method provided in the embodiments of this disclosure is described below in detail. For ease of description, the assisted device (the mobile phone 1) and the assisting device (the mobile phone 2) in the application scenario corresponding to FIG. 1 may be denoted as a first device and a third device, respectively, the controlled device (the smart speaker) in the application scenario corresponding to FIG. 1 may be denoted as a second device, and the control application of the controlled device in the application scenario corresponding to FIG. 1 may be denoted as a second application. A remote assistance system provided in the embodiments of this disclosure includes the first device and the third device, and may further include the second device.

Figure 3:
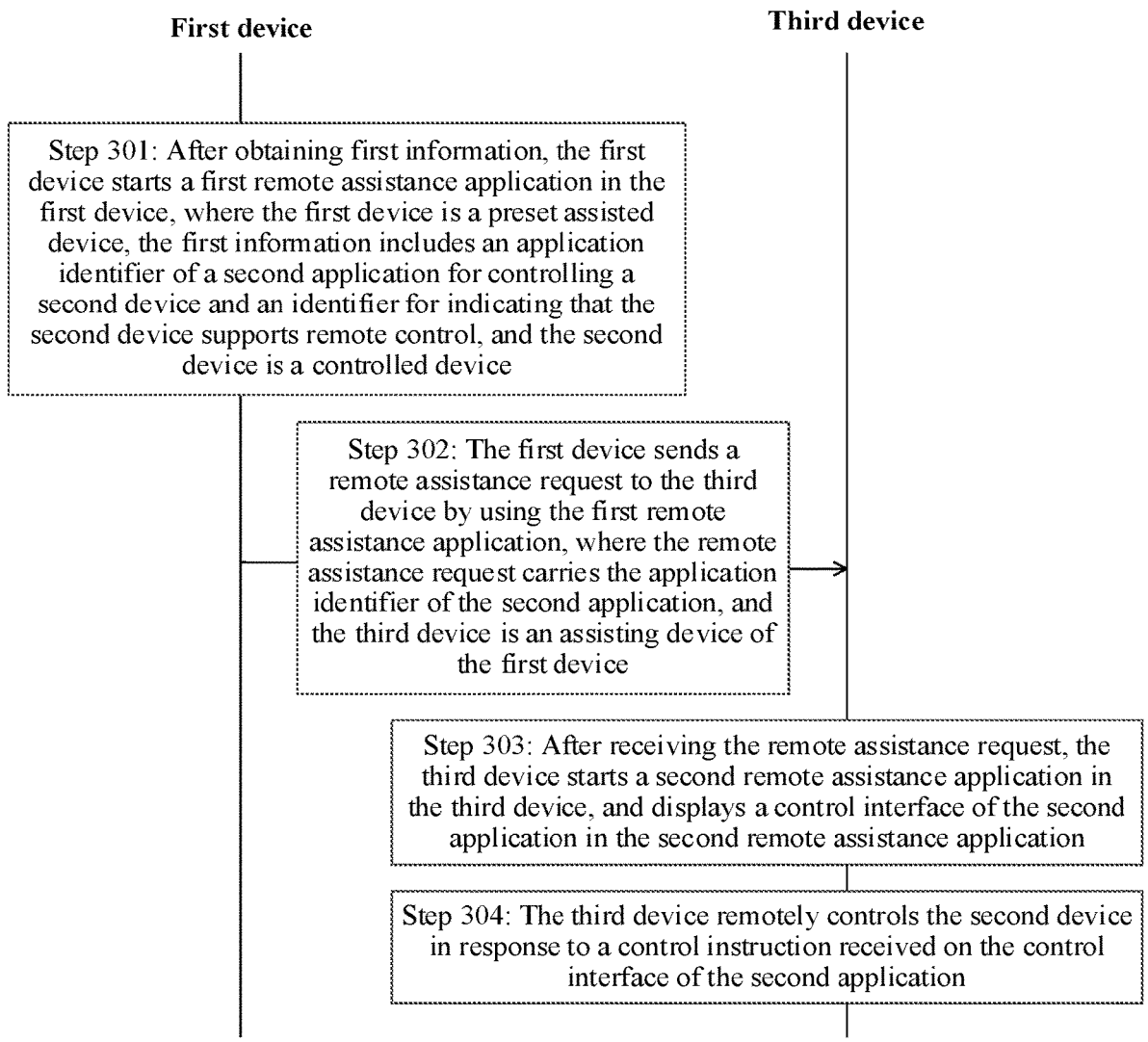
FIG. 3 is a schematic flowchart of a remote assistance method according to an embodiment of this disclosure.

FIG. 3 is a schematic flowchart of a remote assistance method according to an embodiment of this disclosure. As shown in the figure, the method includes the following steps.

Step 301: After obtaining first information, a first device starts a first remote assistance application in the first device, where the first device is a preset assisted device, the first information includes an application identifier of a second application for controlling a second device and an identifier for indicating that the second device supports remote control, and the second device is a controlled device.

In this embodiment of this disclosure, the first device as an assisted device may obtain the first information in a short-range communication manner. As an example, WI-FI Aware wireless sensing, BLUETOOTH ranging, or NFC may be used.

The first information may further include a device identifier of the second device. The device identifier of the second device is used in the subsequent step 304 for a third device to determine, based on the device identifier when remotely controlling the second device, the second device to be remotely controlled.

For example, if the first device obtains the first information by using NFC, the first information may be NFC tag information of the second device.

As an example, the NFC tag information includes at least three fields: a first field, which is the application identifier of the second application, a second field, which is the device identifier of the second device, and a third field, which is an identifier indicating whether the second device supports remote control.

Before the remote assistance method provided in this embodiment of this disclosure is implemented, the first device needs to be preset as an assisted device, or in other words, an electronic device preset as an assisted device is the first device. The third device is preset as an assisting device of the first device, or in other words, an electronic device preset as an assisting device of the first device is the third device. When the first device is preset as an assisted device, the first device obtains the first information. If the identifier, in the first information, indicating whether the second device supports remote control is "the second device supports remote control", the first device starts the first remote assistance application in the first device. If the identifier, in the first information, indicating whether the second device supports remote control is "the second device does not support remote control", the first device starts the second application corresponding to the application identifier in the first information, where the second application is used to control the second device. When the first device, which is not preset as an assisted device, obtains the first information, even if the identifier, in the first information, indicating whether the second device supports remote control is "the second device supports remote control", the first device does not start the first remote assistance application, but starts the second application corresponding to the application identifier in the first information, namely, the second application for controlling the second device.

Step 302: The first device sends a remote assistance request to the third device by using the first remote assistance application, where the remote assistance request carries the application identifier of the second application, and the third device is an assisting device of the first device.

In this embodiment of this disclosure, the remote assistance request may include the following content: a command for the remote assistance request, the application identifier of the second application, and the device identifier of the second device that is in a one-to-one correspondence with the application identifier of the second application.

It should be noted herein that the content included in the NFC tag information received by the first device may be more than the information carried in the remote assistance request. For example, the first field and the second field in the NFC tag information may be carried in the remote assistance request, but the third field does not need to be carried in the remote assistance request.

Step 303: After receiving the remote assistance request, the third device starts a second remote assistance application in the third device, and displays a control interface of the second application in the second remote assistance application.

In this embodiment of this disclosure, after the third device receives the remote assistance request, the third device may display an interface including an option of accepting or rejecting the remote assistance request. After an assisting user accepts the remote assistance request via the interface displayed by the third device, it indicates that a remote assistance conversation is established between the first device and the third device.

After the interface of the third device receives the information that the remote assistance request is accepted, the third device starts the second remote assistance application in the third device, and the second remote assistance application of the third device may display the control interface of the second application corresponding to the application identifier carried in the remote assistance request.

The third device needs to obtain the second application corresponding to the application identifier in the remote assistance request. Further, the second application may be downloaded from a preset server, or may be obtained from storage space of the third device. When the second application is present in the storage space of the third device, the second remote assistance application of the third device may display the control interface of the second application, so as to remotely control the second device.

It should be noted herein that an application identifier may be an application identifier of a control application of a microwave oven. However, there may be multiple versions (for example, an earlier version, an intermediate version in continuous upgrade, and a current latest version) of control applications even for microwave ovens of the same model from the same manufacturer, and control applications downloaded by different assisting devices based on the application identifier may be of different versions. When the assisted device also needs to download a control application corresponding to the application identifier, the respective control applications downloaded by the assisted device and the assisting device may also be of different versions. Actually, regardless of the version of the downloaded control application, the controlled device can be controlled. Therefore, the second application in this embodiment of this disclosure includes various versions of control applications for controlling the second device.

For a same electronic device, when the electronic device is set as an assisted device, the electronic device is the first device, and a remote assistance application in the electronic device is the first remote assistance application, or when the electronic device is set as an assisting device, the electronic device is the third device, and a remote assistance application in the electronic device is the second remote assistance application. For the same electronic device, with the remote assistance application installed, the electronic device as an assisted device obtains the NFC tag information including the application identifier of the control application, and starts the pre-installed remote assistance application, where the remote assistance application is named the first remote assistance application. When receiving the remote assistance request that carries the application identifier of the control application, the electronic device as an assisting device also starts the remote assistance application, where the remote assistance application on the assisting device may be named the second remote assistance application.

In an actual application, because the assisting user needs to set an assisted device of the assisting device in the remote assistance application of the assisting device, the remote assistance application needs to be pre-installed or an applet of the remote assistance application needs to be added into the assisting device, so that the assisting user can set the assisted device after starting the remote assistance application (or starting the applet of the remote assistance application) on the assisting device. However, the remote assistance application may not be pre-installed or the applet of the remote assistance application may not be added into an electronic device (for example, an electronic device 1) that is selected by the assisting user to be set as an assisted device. The electronic device 1 obtains the role of the assisted device only after the electronic device 1 accepts a setting request (a request for setting the electronic device 1 as an assisted device of another electronic device). After the electronic device 1 accepts the setting request, the electronic device 1 may download the remote assistance application from an application store (or a first cloud platform) based on the setting request (or at the user's will), or after the electronic device 1 accepts the setting request, the electronic device 1 may add the applet of the remote assistance application based on the setting request (or at the user's will).

In addition, it should be noted that, when the electronic device is in a role of an assisting device or does not have a preset role, if the NFC tag information that includes the application identifier of the control application and the identifier indicating that the controlled device supports remote control is obtained, the electronic device starts the control application corresponding to the application identifier in the NFC tag information.

Step 304: The third device remotely controls the second device in response to a control instruction received on the control interface of the second application.

In this embodiment of this disclosure, the second remote assistance application in the third device may obtain and display the control interface of the second application corresponding to the application identifier, and the assisting user may receive the control instruction via the control interface of the second application displayed by the second remote assistance application, and remotely control, by using the control instruction, the second device corresponding to the second application.

In this embodiment of this disclosure, the first device may serve as an assisted device used by a user that needs assistance, and during the use of the assisted device, the assisted user may trigger, in a short-range communication manner, the assisted device to obtain the first information of the controlled device. Subsequently, without further operations on the assisted device, the assisted user can notify an assisting user on the side of the third device serving as an assisting device to remotely control the second device serving as the controlled device, thereby simplifying operations of the assisted user. In addition, because the assisted device sends, to the assisting device, the remote assistance request that carries the application identifier of the control application of the controlled device (for example, the controlled device is the second device, and the control application is the second application), high network quality is not required. Finally, because control of the controlled device is completed on the assisting device, control applications corresponding to all controlled devices may not be installed on the assisted device. Therefore, excessive storage space of the assisted device used by the assisted user may not be occupied.

In another embodiment of this disclosure, step 302 of sending, by the first device, a remote assistance request to the third device by using the first remote assistance application includes sending, by the first device, the remote assistance request to the first cloud platform by using the first remote assistance application, so as to indicate the first cloud platform to send the remote assistance request to the third device, where the remote assistance request carries the application identifier of the second application.

In this embodiment of this disclosure, the first device and the third device may communicate with each other via the first cloud platform. The first cloud platform stores a binding relationship between the first device and the third device. The first cloud platform is a server that provides support for a remote assistance application. For details about the binding relationship between the first device and the third device, refer to the description in the subsequent embodiments.

In another embodiment of this disclosure, step 304 of remotely controlling the second device in response to a control instruction received on the control interface of the second application includes sending, by the third device in response to the control instruction received on the control interface of the second application, the control instruction to the first device by using the second remote assistance application, and sending, by the first device in response to the received control instruction sent by the third device, the received control instruction to the second device, or sending, by the third device in response to the control instruction received on the control interface of the second application, the control instruction to the first cloud platform by using the second remote assistance application, so as to instruct the first cloud platform to send the control instruction to the second device, or sending, by the third device in response to the control instruction received on the control interface of the second application, the control instruction to the first cloud platform by using the second remote assistance application, so as to instruct the first cloud platform to send the control instruction to the second device by using a second cloud platform.

In this embodiment of this disclosure, the control instruction between the third device and the second device may be forwarded by the first device, or may be forwarded by the first cloud platform, or may be forwarded by a plurality of cloud platforms, for example, forwarded by the first cloud platform to the second cloud platform, and then forwarded by the second cloud platform to the second device. The control instruction is used to instruct the second device to perform a response corresponding to the control instruction.

The first cloud platform is a server corresponding to the remote assistance application, and the second cloud platform is a server corresponding to the control application. This is because developers of the remote assistance application and the control application may be different, and the developer of the control application may not expect a cloud platform of another developer to directly control a controlled device of the developer of the control application. In this way, cloud platform interconnection allows the developer corresponding to the controlled device to control its own controlled device.

The remote assistance method provided in the embodiment shown in FIG. 3 may be applied to a remote assistance system including the first device and the third device.

Figure 4:
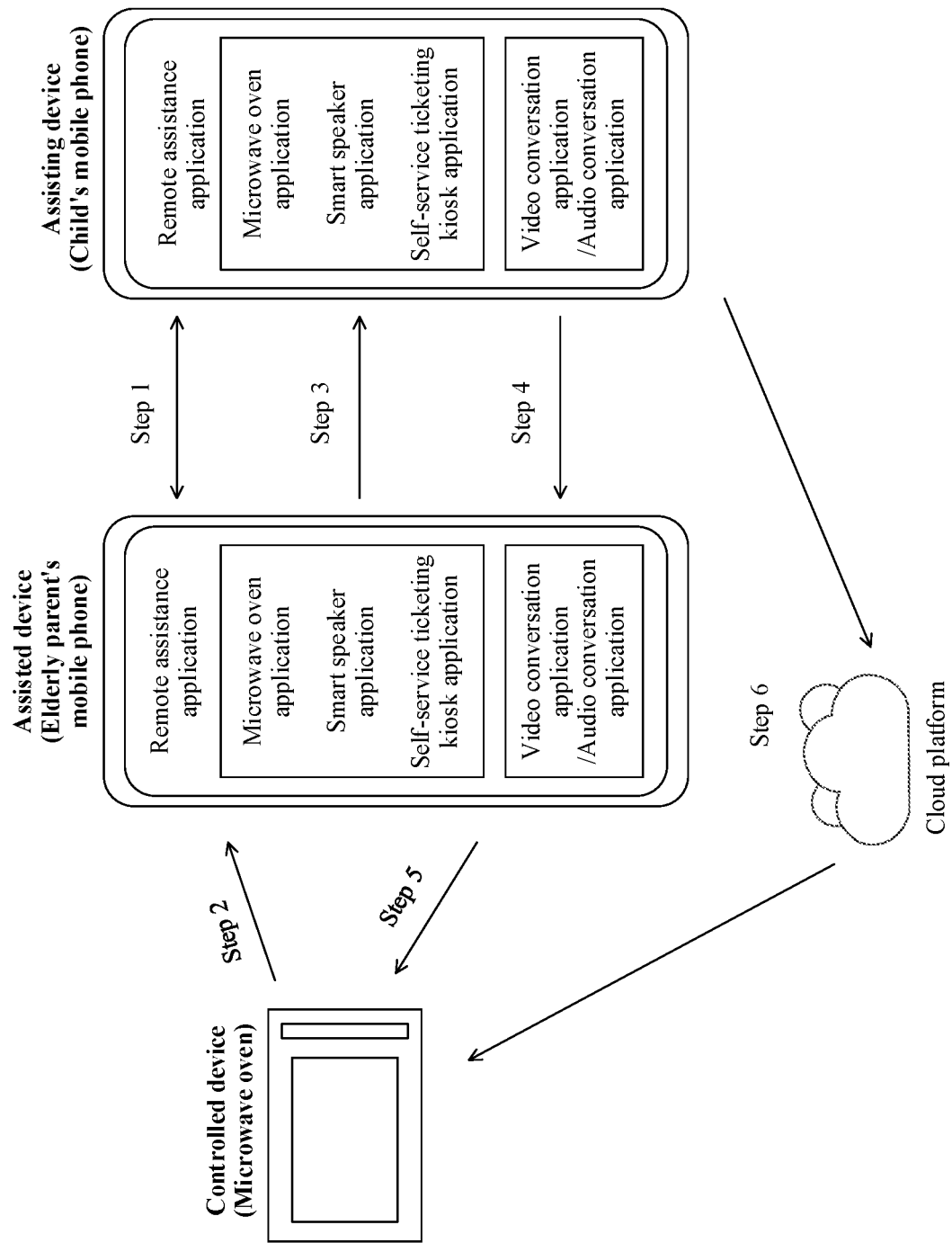
FIG. 4 is a schematic diagram of an application scenario of a remote assistance method according to an embodiment of this disclosure.

The foregoing embodiment focuses on an interaction process between the first device and the third device. For a clearer understanding of the interaction process in the foregoing embodiment, refer to FIG. 4. FIG. 4 is a schematic diagram of an application scenario of the foregoing embodiment.

Referring to step 1 in FIG. 4, during implementation of the remote assistance method provided in this embodiment of this disclosure, two electronic devices need to be bound in advance. During the binding, an assisted device and an assisting device of the assisted device are preset, or an assisting device and an assisted device of the assisting device are preset. An electronic device set as the assisted device is the first device (for example, an elderly parent's mobile phone) described in the foregoing embodiment, and an electronic device set as the assisting device is the third device (for example, a child's mobile phone) described in the foregoing embodiment.

It should be noted herein that, in an actual application, the first device and the third device may be bound, or a first account associated with the first device and a second account associated with the third device may be bound. The elderly parent may register the first account on a first cloud platform themselves or with the assistance of their family member, and the child may register the second account on the first cloud platform. An association relationship between the first device and the first account may be: a SIM card number in the first device corresponds to the first account, a device identifier of the first device corresponds to the first account, or an account for logging in to a remote assistance application in the first device is the first account. For an association relationship between the third device and the second account, refer to the association relationship between the first device and the first account. Details are not described herein again.

Figures 5A, 5B, 5C:
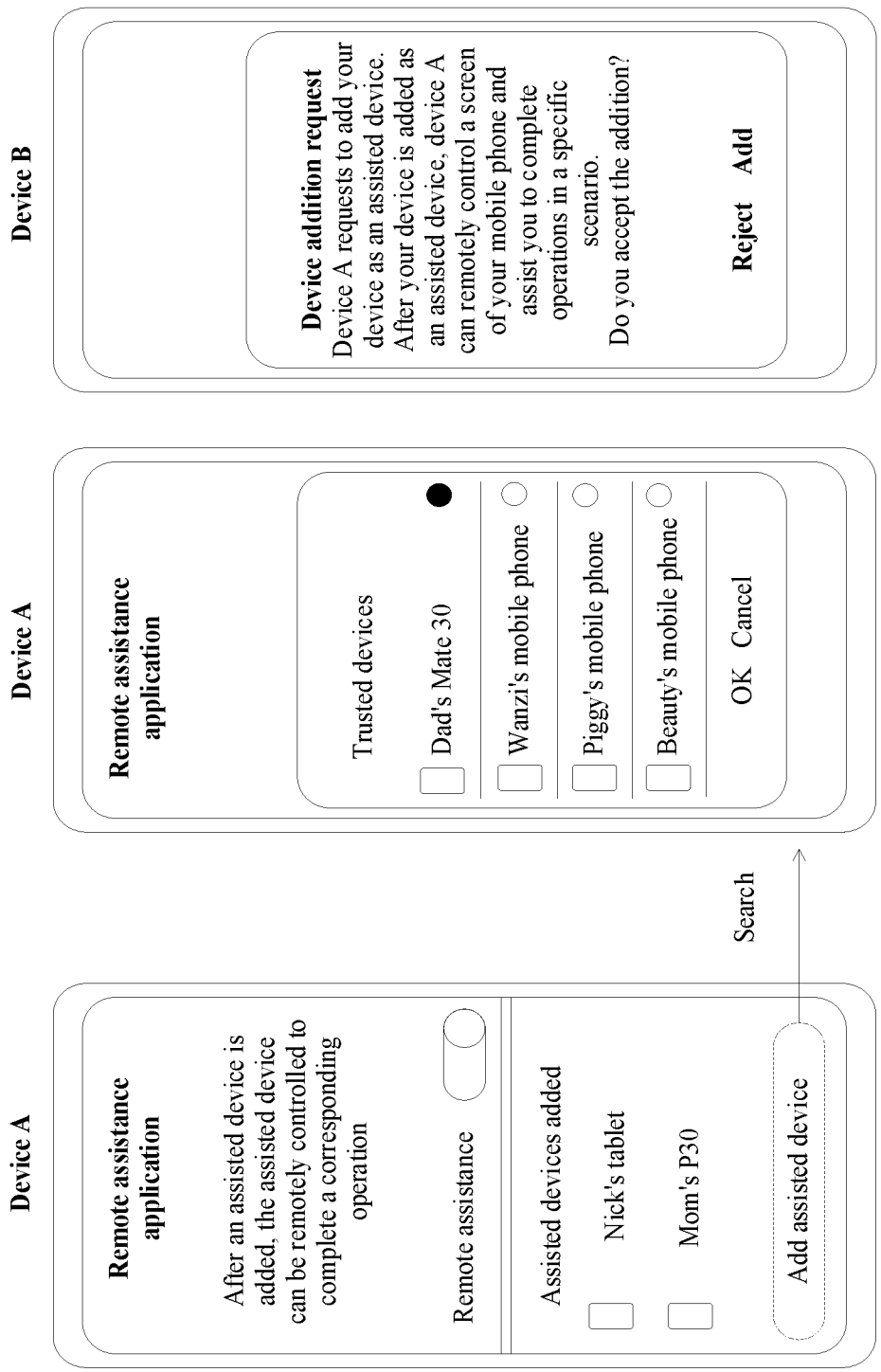
FIGS. 5A, 5B, and 5C are schematic diagrams of a process, indicated in step 1 of the embodiment shown in FIG. 4, of binding two electronic devices.

For a process of binding the two electronic devices in advance, refer to FIGS. 5A-5C. An assisting user (for example, the child of the elderly parent) may open the remote assistance application on a device A (for example, the child's mobile phone) by searching for the remote assistance application on a minus 1 screen of the device A or tapping the remote assistance application on the home screen of the device A. After the remote assistance application of the device A is opened, a display interface (which may be denoted as a first interface) is shown in FIG. 5A. In this case, a purpose of binding is to set the device A as an assisting device or set another electronic device as an assisted device of the device A. The device A is associated with the second account. If some assisted devices have been added to the device A or the second account associated with the device A, the display interface may display the added assisted devices. For example, the interface shown in FIG. 5A may include an on/off button for the remote assistance application. After the user enables the remote assistance function, a list of added assisted devices is displayed in the display interface shown in FIG. 5A. For example, Nick's tablet and Mom's P30 are displayed in the list of added assisted devices in FIG. 5A. An electronic device displayed in the list of added assisted devices is an assisted device that has been added by the device A. The display interface may include a virtual button "Add assisted device" (which may be denoted as a first control). The assisting user taps the virtual button "Add assisted device" (which may be denoted as a first operation) to control the device A to search for other electronic devices nearby via BLUETOOTH or WI-FI or the like (which is only used as an example, and in an actual application, may also be another manner). After the other electronic devices are found, the device A may display, in the form of a list, the other electronic devices found (trusted devices shown in FIG. 5B), as shown in a display interface (which may be denoted as a second interface) shown in FIG. 5B. The trusted devices found are displayed in the display interface. The trusted devices include Dad's Mate 30, Wanzi's mobile phone, Piggy's mobile phone, and Beauty's mobile phone. In the display interface shown in FIG. 5B, a checkable button is correspondingly set for a device name of each trusted device found, and the assisting user selects a to-be-added assisted device by tapping the checkable button. Certainly, the assisting user may add one or more assisted devices at a time. The display interface shown in FIG. 5B further includes an "OK" button and a "Cancel" button. The assisting user may set the selected one or more trusted devices as an assisted device of the device A by using the "OK" button. An operation of tapping the identifier of "Dad's Mate 30" by the user may be denoted as a second operation, that is, there is no "OK" button. Sending of a device addition request is triggered by the operation of tapping the identifier of "Dad's Mate 30" by the user. Alternatively, the operation of tapping the identifier of "Dad's Mate 30" by the user and an operation of tapping the virtual button "OK" may be denoted as the second operation. Certainly, for the sake of user data security, the device A further needs to send a device addition request (which may be denoted as a first request) to each selected trusted device. For example, the assisting user taps the "OK" button in the display interface shown in FIG. 5B to send the device addition request to the selected trusted device, where the addition request carries the second account of the device A. After receiving the device addition request, the selected trusted device (a device B, for example, Dad's Mate 30) may display a display interface (which may be denoted as a third interface) shown in FIG. 5C, to prompt a user on the side of the selected trusted device (the device B) to confirm a consequence of this electronic device (the device B) being added as an assisted device of the device A and confirm whether to allow this electronic device (the device B) to be added as an assisted device of the device A. The virtual button "Add" may be denoted as a second control, and the virtual button "Reject" may be understood as a third control. An operation of tapping the second control by the user may be denoted as a third operation. After the user on the side of the selected trusted device (the device B) accepts the addition, the device B becomes an assisted device of the device A, and the device A becomes an assisting device of the device B. It may also be understood that the device B is the first device, and the device A is the third device. A binding relationship between the device A and the device B may be embodied by a binding relationship between the second account associated with the device A and the first account associated with the device B. After the device B accepts the addition, the device B stores the binding relationship between the device A and the device B. In addition, the device B may further feed back response information to the device A. For example, the response information (which may be denoted as second information) may carry the binding relationship between the device A and the device B, so that the device A stores the binding relationship between the device A and the device B. Alternatively, the response information may carry the first account of the device B, so that the device A may generate and store the binding relationship between the device A and the device B. Certainly, in an actual application, alternatively, the device B may send the binding relationship between the device A and the device B to the first cloud platform by using the first account, and the device A may also send the binding relationship between the device A and the device B to the first cloud platform by using the second account, so that the first cloud platform stores the binding relationship between the device A and the device B.

In an actual application, the device A may not necessarily in a one-to-one correspondence with the device B. The device A may also set a plurality of devices B as assisted devices of the device A, that is, one assisting device may assist a plurality of assisted devices. Similarly, a plurality of devices A may also set one device B as an assisted device, that is, one assisted device may seek help from a plurality of assisting devices.

The application scenario shown in FIGS. 5A-5C are an application scenario in which the device B is added, on the device A, as an assisted device of the device A. In an actual application, the device B may also be added, on the device A, as an assisting device of the device A. As an example, a first setting control in the remote assistance application of the device A is tapped to display an interface for adding an assisting device shown in FIG. 5A. A second setting control in the remote assistance application of the device A is tapped to display the interface for adding an assisting device. Similarly, the interface for adding an assisting device may also display a list of assisting devices that have been added, and may also include a virtual button "Add assisting device". The user taps the virtual button "Add assisting device" to display an interface including a trusted device list and a virtual button "OK". The user selects at least one trusted device and taps the virtual button "OK", to send a device addition request to the device B. However, in this case, the device addition request indicates that the device A requests to add the device B as an assisting device of the device A. A binding relationship between the device A and the device B in this disclosure scenario is opposite to the roles of the assisting device and the assisted device in the binding relationship between the device A and the device B in the scenario shown in FIGS. 5A-5C. For a specific process of adding an assisting device for an electronic device, refer to the process of adding an assisted device for an electronic device, and details are not described again.

Referring to step 2 in FIG. 4, the assisted user on the side of the assisted device may tap, in a "OneHop" scenario, the assisted device (for example, the elderly patent's mobile phone) against a controlled device (for example, a microwave oven) that supports remote control. Certainly, the controlled device may also be another electronic device such as a smart speaker or a self-service ticketing kiosk. The controlled device is provided with an NFC module, and the assisted device is also provided with an NFC module. After the assisted device approaches the controlled device that supports remote control, the assisted device may obtain NFC tag information of the controlled device. As an example, the first device approaches the microwave oven to obtain NFC tag information of the microwave oven, where the NFC tag information of the microwave oven includes a first field, which is an application identifier of a control application of the microwave oven, a second field, which is a device identifier of the microwave oven, and a third field, which is an identifier indicating whether the microwave oven supports remote control. All controlled devices in this disclosure scenario support remote control by default. Certainly, after approaching the microwave oven, the assisted device may continue to approach the smart speaker (not shown in FIG. 4). The first device obtains NFC tag information of the smart speaker, where the NFC tag information of the smart speaker includes a first field, which is an application identifier of a control application of the smart speaker, a second field, which is a device identifier of the smart speaker, and a third field, which is an identifier indicating whether the smart speaker supports remote control. In an actual application, when the remote control application of the assisted device is not started, after the assisted device approaches the first controlled device to obtain NFC tag information of the first controlled device, if a third field in the first NFC tag information is an identifier indicating that remote control is supported, the assisted device starts the remote assistance application. After the remote assistance application of the assisted device is started, when the assisted device approaches the second controlled device to obtain NFC tag information of the second controlled device, the operation of starting the remote assistance application in the assisted device is no longer performed. Certainly, before the assisted user initiates help-seeking, the assisted user may obtain NFC tag information of a plurality of controlled devices in a "OneHop" scenario, so as to obtain application identifiers of control applications of the plurality of controlled devices. After obtaining application identifiers of control applications of one or more controlled devices, the assisted device may obtain a control application corresponding to each application identifier, so as to obtain an entrance to each control application.

Referring to a display interface of the remote assistance application of the assisted device in FIG. 4, the remote assistance application of the assisted device adds the entrance to each control application to a container management module of the remote assistance application of the assisted device. The remote assistance application may display the entrance to the control application in the container management module. An icon of each control application may be used as the entrance to the control application. To be specific, the remote assistance application of the assisted device may display an icon of a microwave oven application, and may further display an icon of a smart speaker application (a step of tapping the assisted device against the smart speaker is not shown in FIG. 4). The assisted user may tap the icon to enter and display a control interface of the control application corresponding to the icon.

Figure 6A:
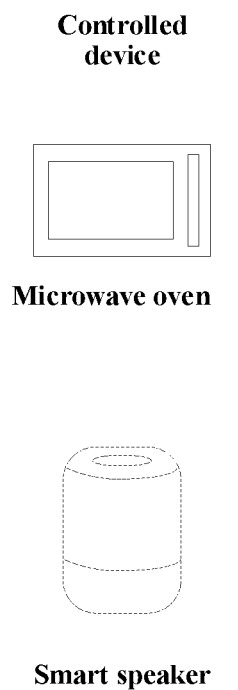
Figure 6B:
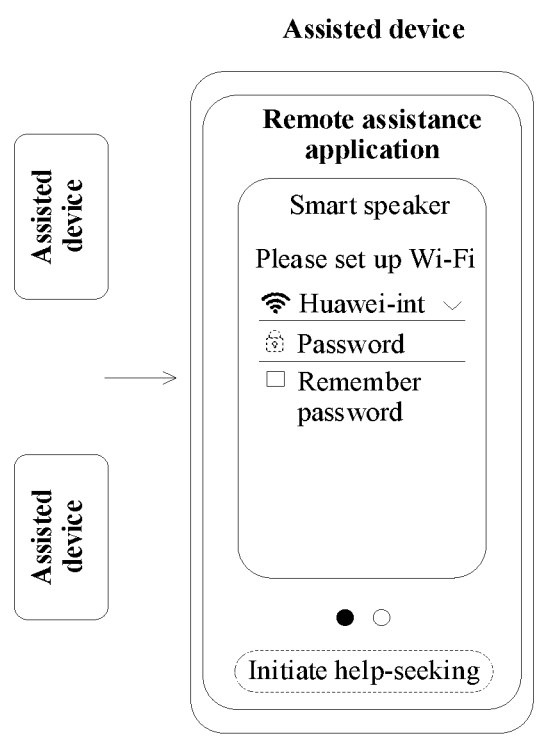

Certainly, in an actual application, the remote assistance application of the assisted device may not display an entrance to a control application in the form of an icon, but the remote assistance application directly starts the control application of the controlled device, and displays a control interface of the started control application. For details, refer to FIG. 6A to FIG. 6D. As shown in FIG. 6A, the assisted user taps, in a "OneHop" scenario, the assisted device against at least two controlled devices, for example, a microwave oven and a smart speaker shown in the figure. The assisted device displays a control interface of the microwave oven and a control interface of the smart speaker via the remote assistance application, for example, as shown in FIG. 6B. Certainly, when the remote assistance application displays control interfaces of at least two control applications, the assisted user may further switch between control interfaces of different control applications by using a switching gesture (for example, a swipe gesture). As shown in FIG. 6B and FIG. 6C, the control interface displayed by the remote assistance application of the assisted device may be switched, by using a swipe gesture, from the control interface of the control application of the smart speaker to the control interface of the control application of the microwave oven.

Referring to step 3 in FIG. 4, after the assisted device displays the control interface of the control application of the controlled device via the remote assistance application, the assisted device may initiate a remote assistance request to the assisting device. Referring to FIG. 6B and FIG. 6C, the remote assistance application may further display an "Initiate help-seeking" button (which may be denoted as a fourth control) for initiating the remote assistance request. When the assisted user taps the virtual button "Initiate help-seeking" (which may be denoted as a fourth operation), the assisted device sends, to the assisting device, the remote assistance request that carries the application identifier of the control application of the microwave oven and the application identifier of the control application of the smart speaker. Referring to FIG. 6D, the display interface of the assisting device includes an Accept or Reject button. The assisting user may tap the Accept button on the current display interface of the assisting device, so that a remote assistance conversation is established between the assisted device and the assisting device, and a video conversation or an audio conversation is established between the assisted device and the assisting device at the same time. The assisting user may tap the Reject button on the current display interface to reject the remote assistance request.

It should be noted that when the assisted device has a plurality of assisting devices, the assisted device may select one of the plurality of assisting devices as a recipient device of the current remote assistance request. If the recipient device of the current remote assistance request rejects the current remote assistance request, the assisted device may continue to select another assisting device as the recipient device of the remote assistance request, until a recipient device of the remote assistance request accepts the remote assistance request or all the assisting devices reject the remote assistance request.

Certainly, when the assisted device has a plurality of assisting devices, priorities may be further preset for the plurality of assisting devices. To be specific, the plurality of assisting devices are prioritized, and an assisting device with the highest priority is preferentially selected as a recipient device of the current remote assistance request. After the recipient device with the highest priority rejects the current remote assistance request, the remote assistance request continues to be sent to an assisting device with the second highest priority, until a recipient device of the remote assistance request accepts the remote assistance request or all the assisting devices reject the remote assistance request.

In addition, the video conversation or the audio conversation between the assisted device and the assisting device may be used for identity confirmation between the assisted user and the assisting user. In addition, the assisting user may further instruct, through the video conversation or the audio conversation, the assisted user how to operate the controlled device.

Referring to the display interface of the assisting device in FIG. 4, after the assisting user receives, in the display interface of the assisting device, the remote assistance request sent by the assisted device, the assisting device starts the remote assistance application in the assisting device. The remote assistance request received by the assisting device includes the application identifier of the control application of the controlled device. The remote assistance application in the assisting device may obtain the control application corresponding to the application identifier. The remote assistance application of the assisting device may display icons of various control applications. When the assisting user taps an icon of any control application, the remote assistance application of the assisting device may display a control interface of the control application corresponding to the icon. Certainly, the remote assistance application of the assisting device may also directly display the control interface of the control application, for example, the control interface, displayed by the assisting device, of the control application of the microwave oven shown in FIG. 7B. Similarly, when the remote assistance application of the assisting device obtains the control interfaces of the control applications of the plurality of controlled devices, the assisting user may also instruct, by using a switching gesture in the assisting device, the remote assistance application of the assisting device to switch the currently displayed control interface of the control application of the microwave oven to a control interface of a control application of another controlled device. The assisting user may operate on the control interface displayed by the remote assistance application of the assisting device, so as to generate a control instruction. For details, refer to FIG. 7B. The assisting user touches a button "Milk" on the control interface, displayed by the remote assistance application of the assisting device, of the control application of the microwave oven, and then touches a button "Start", so as to generate a control instruction indicating that the microwave oven runs according to the milk program.

Figure 7A:
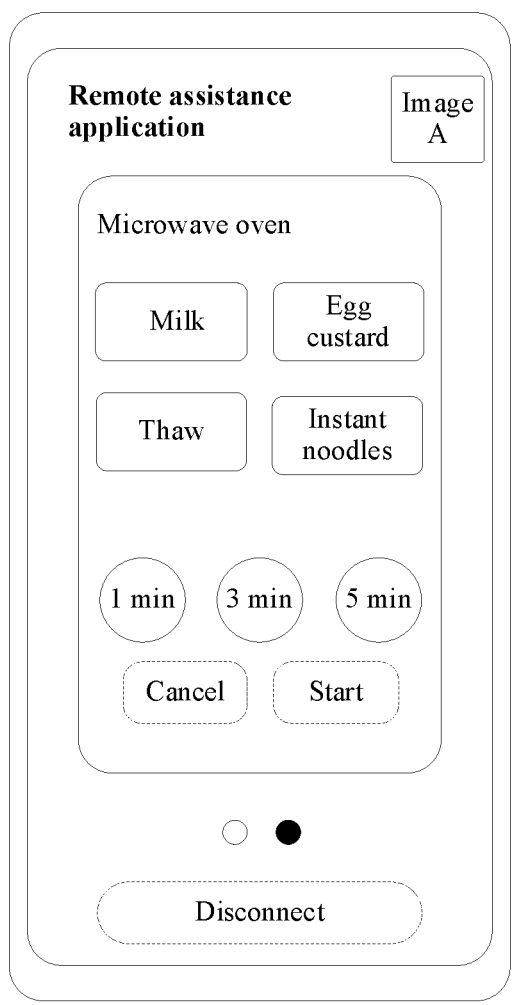
FIGS. 7A and 7B are schematic diagrams of display interfaces of an assisted device and an assisting device in the embodiment shown in FIG. 4.
Figure 7B:
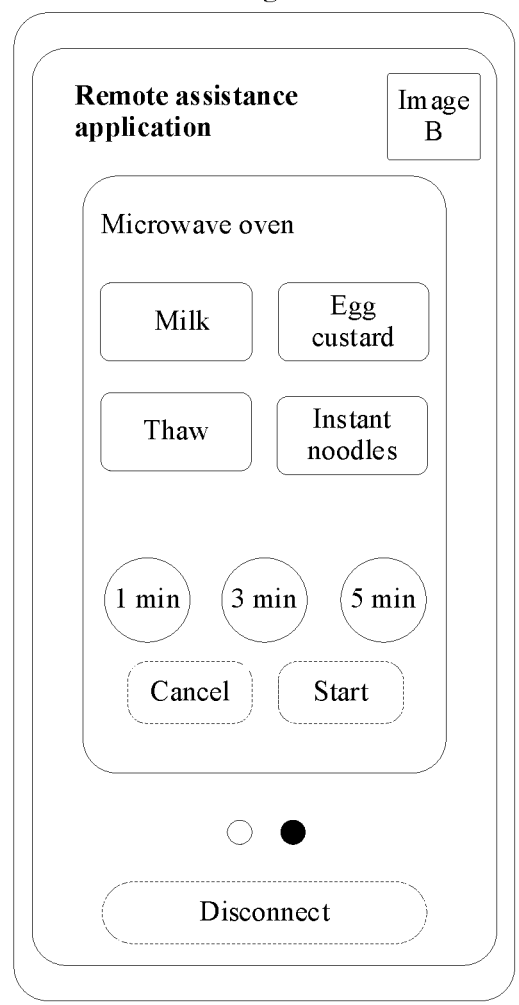

A control interface displayed in FIG. 7A is a second control interface displayed by the remote assistance application of the assisted device, and a control interface displayed in FIG. 7B is a first control interface displayed by the remote assistance application of the assisting device. As shown in FIGS. 7A and 7B, an image of the video conversation may be displayed in the remote assistance applications of both the assisted device and the assisting device. For example, an image A displayed in the assisted device is an image of the assisting user, and an image B displayed in the assisting device is an image of the assisted user, where the image of the assisting user may be an image shot by a camera of the assisting device used by the assisting user, and the image of the assisted user may be an image shot by a camera of the assisted device used by the assisted user.

Certainly, after the remote assistance conversation is established between the assisted device and the assisting device, a "Disconnect" button may be displayed in the remote assistance applications of both the assisted device and the assisting device. The current remote assistance conversation may be disconnected by the assisted user tapping the "Disconnect" button in the assisted device or the assisting user tapping the "Disconnect" button in the assisting device, and the video conversation (or the audio conversation) is also interrupted at the same time.

If the assisted user taps the "Disconnect" button in the remote assistance application of the assisted device, causing interruption of the remote assistance conversation between the assisted device and the assisting device, both the assisted device and the assisting device may close their respective remote assistance applications, and at the same time, clear the entrance icons or the control interfaces of the control applications in the container management module of the remote assistance application.

If the assisting user taps the "Disconnect" button in the remote assistance application of the assisting device, causing interruption of the remote assistance conversation between the assisted device and the assisting device, the assisting device may close the remote assistance application, and at the same time, clear the entrance icons or the control interfaces of the control applications in the container management module of the remote assistance application of the assisting device. However, the remote assistance application in the assisted device may not be closed, and the entrance icons and the control interfaces in the container management module of the remote assistance application in the assisted device may not be cleared. The assisted user may continue to initiate a remote assistance request to another assisting device via the "Initiate help-seeking" button. When the assisted user confirms that help is no longer required, the assisted user may exit the remote assistance application in the assisted device, and at the same time, clear the entrance icons or the control interfaces of the control applications in the container management module of the remote assistance application of the assisted device.

Certainly, in an actual application, it may also be set that, if the assisting user taps the "Disconnect" button in the remote assistance application of the assisting device, causing interruption of the remote assistance conversation between the assisted device and the assisting device, both the assisted device and the assisting device may close their respective remote assistance applications, and at the same time, clear the entrance icons or the control interfaces of the control applications in the container management module of the remote assistance application.

Referring to step 4 in FIG. 4, after the assisting user generates the control instruction by using the control interface displayed by the remote assistance application of the assisting device, the assisting device sends the control instruction to the assisted device.

Referring to step 5 in FIG. 4, the assisted device forwards the control instruction to the microwave oven.

Referring to step 6 in FIG. 4, the assisting device may also forward the control instruction to the microwave oven via the cloud platform. Further, the assisting device may send the control instruction to the first cloud platform, and the first cloud platform forwards the control instruction to the microwave oven. Alternatively, the control instruction is sent to the first cloud platform, the first cloud platform sends the control instruction to a second cloud platform, and the second cloud platform sends the control instruction to the microwave oven. The first cloud platform may be a server corresponding to the remote assistance application, and the second cloud platform may be a server of the controlled device.

In some application scenarios, the following case may further exist. In the application scenario, there are two or more microwave ovens, and these microwave ovens may be of a same series of products from a same manufacturer. Control applications of these microwave ovens may be the same. In the process in which the assisting device sends the control instruction to the microwave oven, to enable the assisted device, the first cloud platform, or the second cloud platform to accurately send the control instruction to the corresponding microwave oven, the device identifier of the microwave oven may be further included in the NFC tag information of the microwave oven obtained when the assisted device "taps" against the microwave oven, the remote assistance request sent by the assisted device to the assisting device may further include the device identifier of the microwave oven, and the device identifier of the microwave oven is in a one-to-one correspondence with the application identifier of the control application of the microwave oven. In the process in which the assisting device sends the control instruction to the assisted device or the cloud platform, the device identifier of the controlled device corresponding to the control instruction may also be sent along with the control instruction.

After receiving the control instruction, the microwave oven performs a corresponding operation according to the control instruction.

In this embodiment of this disclosure, an application scenario of the remote assistance method provided in the embodiments of this disclosure is described with reference to FIG. 4 and FIGS. 5A-5C to FIG. 7B. In a specific implementation process of the remote assistance method provided in the embodiments of this disclosure, there may be other application scenarios. The content described in FIG. 4 to FIG. 7B does not constitute any limitation on the embodiments of this disclosure.

Figure 8:
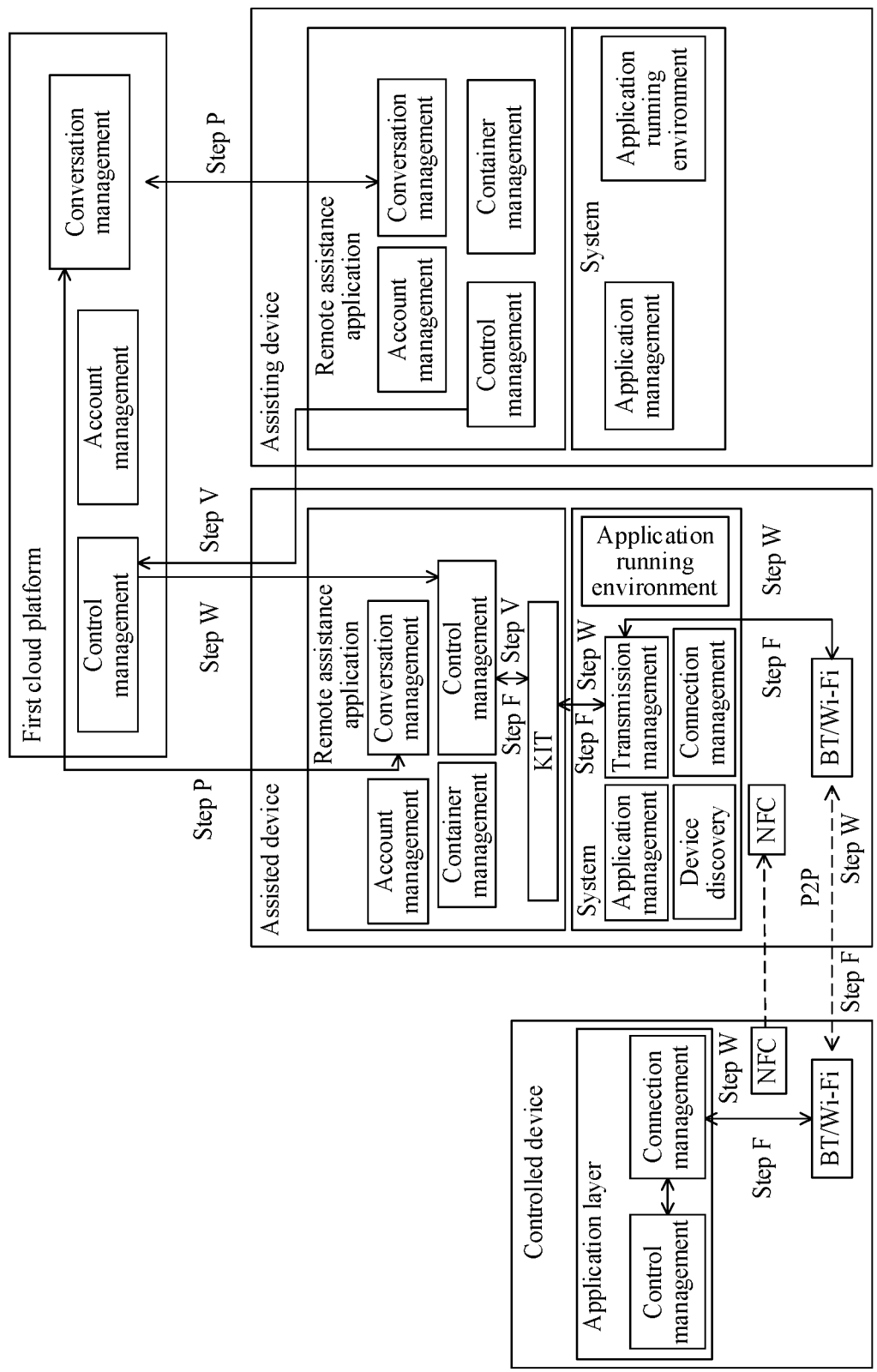
FIG. 8 is a diagram of a technical architecture of a remote assistance method according to an embodiment of this disclosure.
Figure 9A:
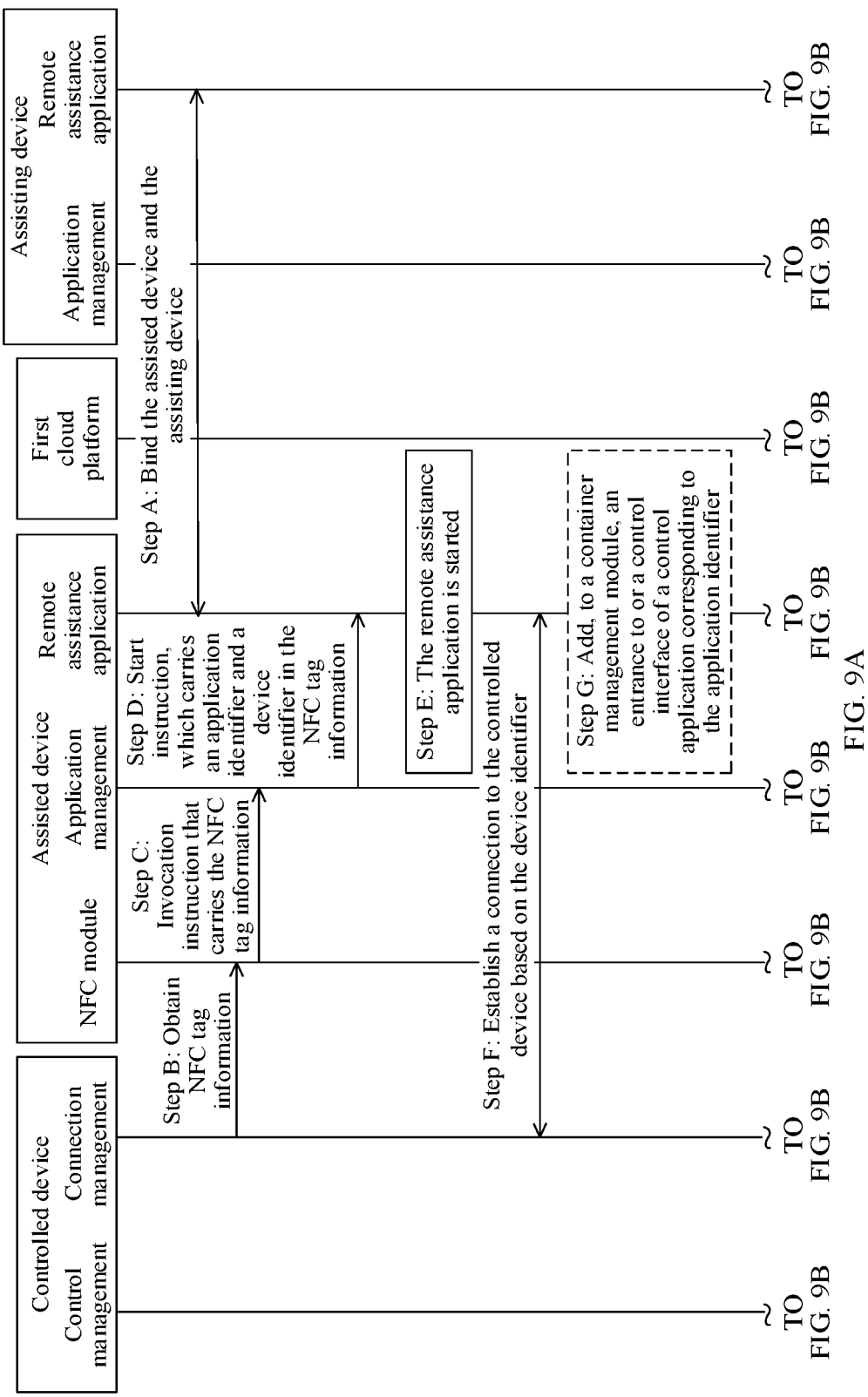
FIGS. 9A, 9B, and 9C are a schematic diagram of a timing process of a remote assistance method based on the diagram of the technical architecture according to the embodiment shown in FIG. 8.
Figure 9B:
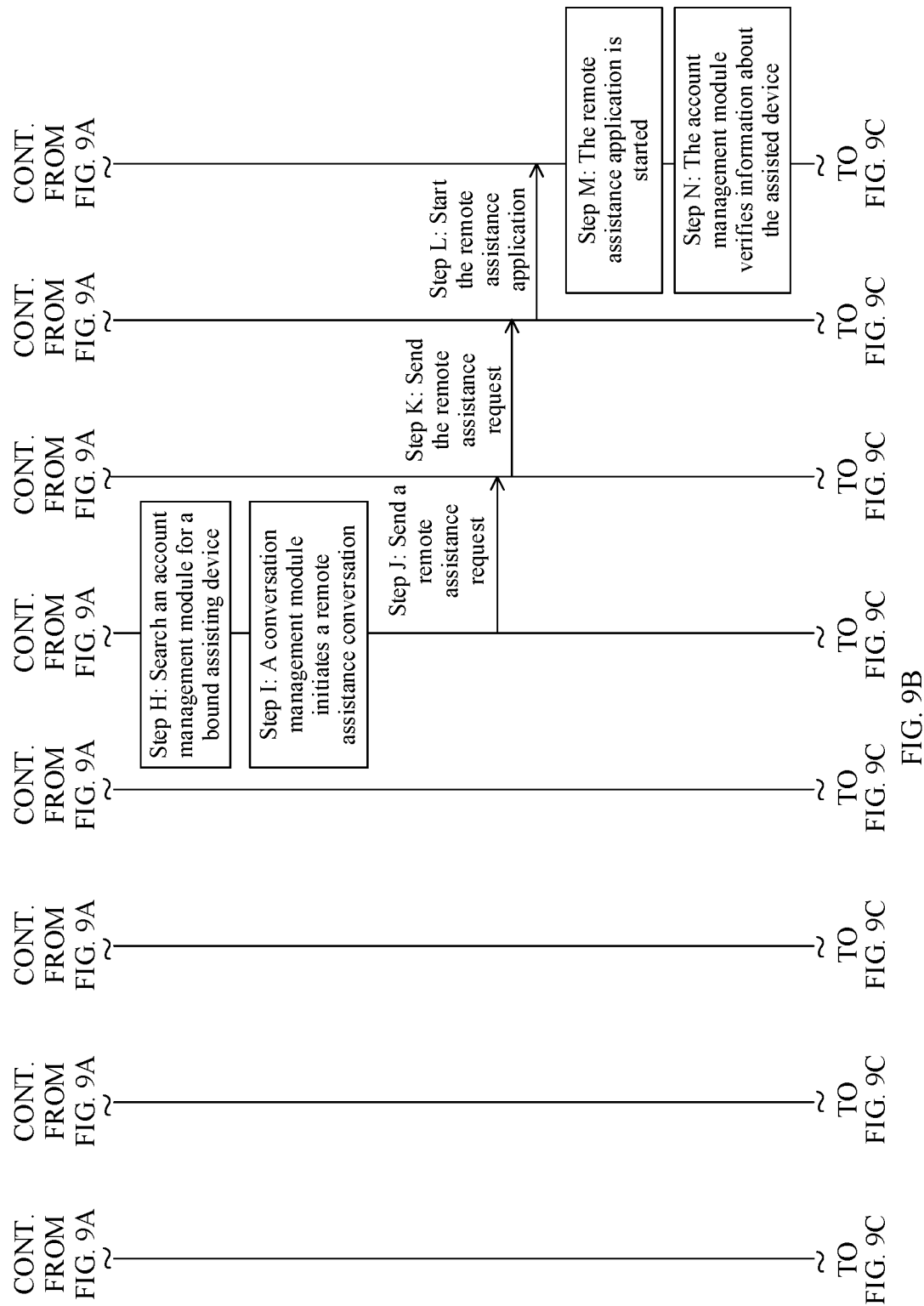
Figure 9C:
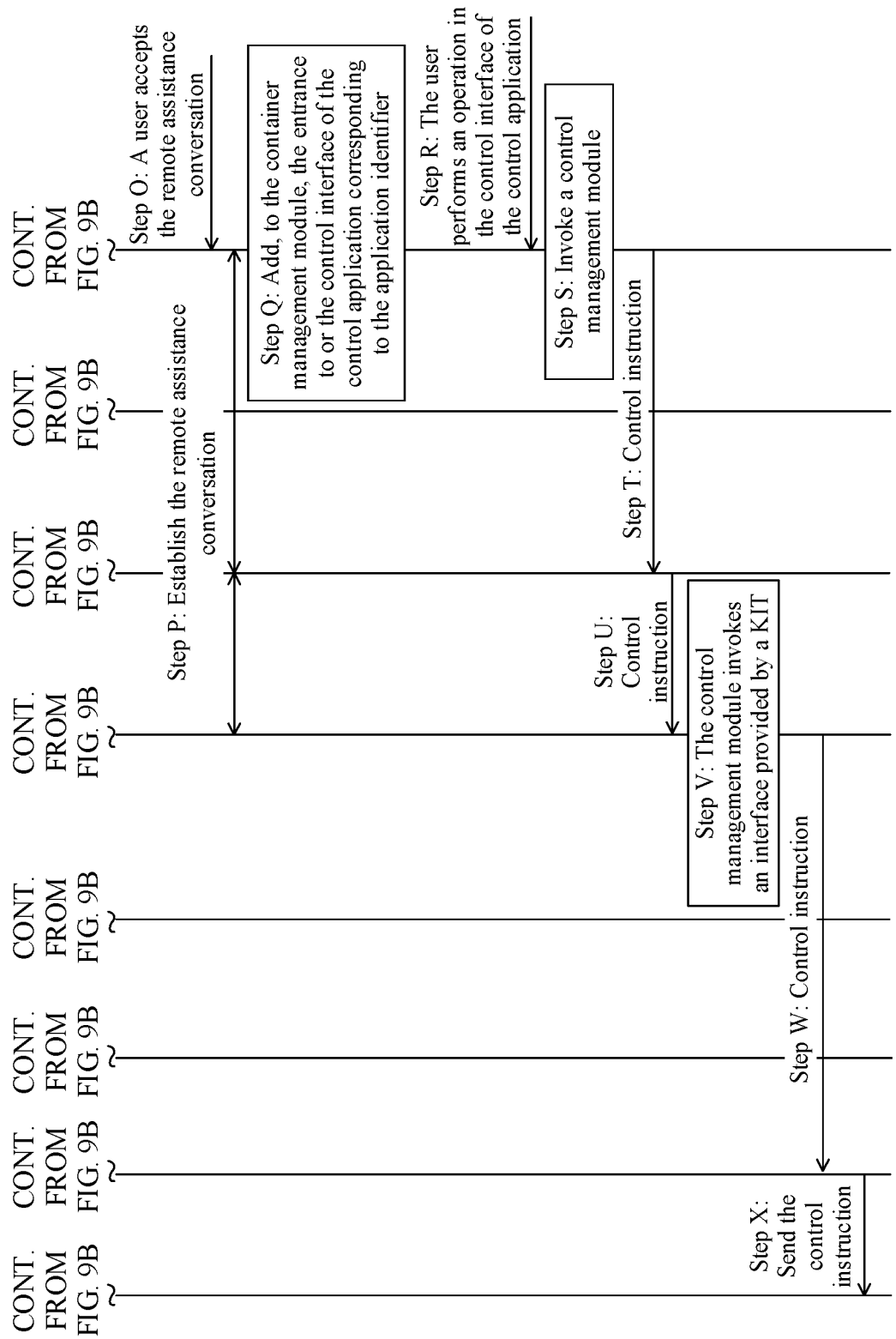

For a clearer understanding of the remote assistance method provided in the embodiments of this disclosure, refer to FIG. 8. FIG. 8 is a diagram of a technical architecture of a remote assistance method according to an embodiment of this disclosure. FIG. 9A to FIG. 9C are a timing diagram of a remote assistance method based on the diagram of the technical architecture shown in FIG. 8 according to an embodiment of this disclosure.

A timing process of the remote assistance method shown in FIG. 9A to FIG. 9C is described with reference to the diagram of the technical architecture shown in FIG. 8.

At step A in FIG. 9A to FIG. 9C, an assisted device and an assisting device are bound to each other. The binding process may be implemented by a remote assistance application in the assisted device and a remote assistance application in the assisting device. If the binding process is performed on a first account associated with the assisted device and a second account associated with the assisting device, the binding process may be implemented by using a first cloud platform corresponding to the first account and the second account. Referring to FIG. 8, both the assisted device and the assisting device have remote assistance applications at an upper layer of a system. In addition, each of the assisted device, the assisting device, and the first cloud platform has an account management module. The binding relationship between the assisted device and the assisting device may be stored in the account management module in the remote assistance application of the assisted device, the account management module in the remote assistance application of the assisting device, and the account management module of the first cloud platform.

At step B in FIG. 9A to FIG. 9C, an NFC module of the assisted device obtains NFC tag information of a controlled device, where the NFC tag information includes an application identifier of a control application of the controlled device, a device identifier of the controlled device, and an identifier indicating whether the controlled device supports remote control. Referring to FIG. 8, the controlled device is provided with an NFC module. Actually, the assisted device is also provided with an NFC module. When a user taps the assisted device against the controlled device, a device discovery module in the assisted device discovers the controlled device provided with the NFC module (a dashed line between the NFC module and the device discovery module in FIG. 8), and after the assisted device discovers the controlled device provided with the NFC module, the NFC module (not shown in FIG. 8) in the assisted device may obtain the NFC tag information of the controlled device.

A short-range communication manner supported by the device discovery module shown in FIG. 8 shows only proximity discovery that supports NFC. In an actual application, proximity discovery of WI-FI Aware, proximity discovery of BLUETOOTH, and the like may be further supported. For example, BLUETOOTH proximity discovery is used as an example, and the device discovery module in the assisted device may discover a controlled device provided with a BLUETOOTH module. After the device discovery module in the assisted device discovers the controlled device provided with the BLUETOOTH module, the BLUETOOTH module of the assisted device may obtain, in a BLUETOOTH transmission manner, the application identifier of the control application of the controlled device, the device identifier of the controlled device, and the identifier indicating whether the controlled device supports remote control.

At step C in FIG. 9A to FIG. 9C, the NFC module in the assisted device sends, to an application management module, an invocation instruction carrying the NFC tag information, where the invocation instruction is an instruction for invoking an interface in the application management module, and the interface has a function of starting a remote assistance application. The invocation instruction carries the NFC tag information. Referring to FIG. 8, a system layer of the assisted device includes the application management module, and the application management module may start an application at an upper layer of the system.

At step D in FIG. 9A to FIG. 9C, the application management module in the assisted device starts the remote assistance application. The remote assistance application may be started by using a start instruction, and the start instruction may carry the application identifier and the device identifier in the NFC tag information. In this step, after the application management module in the assisted device receives the NFC tag information, if the identifier, in the NFC tag information, indicating whether the controlled device supports remote control indicates "Yes" and the current electronic device is set as an assisted device, the application management module in the assisted device sends the start instruction to the remote assistance application. In this case, the start instruction does not carry the identifier indicating whether the controlled device supports remote control, and the start instruction may carry the application identifier and the device identifier.

At step E in FIG. 9A to FIG. 9C, the remote assistance application at the upper layer of the system of the assisted device is started. The remote assistance application of the assisted device obtains the application identifier and the device identifier.

At step F in FIG. 9A to FIG. 9C, a connection is established, based on the device identifier, between the remote assistance application at the upper layer of the system of the assisted device and the controlled device. Referring to FIG. 8, a control management module is provided in the remote assistance application at the upper layer of the system of the assisted device, and a connection relationship is established between the control management module and a kit (a related control interface in the kit is opened to an upper-layer application for use). The kit may be integrated into the upper-layer application, for example, integrated into the remote assistance application. A connection relationship is established between the kit and a transmission management module at the system layer. A connection management module further exists at the system layer of the assisted device. When an NFC connection is established between the assisted device and the controlled device in a BLUETOOTH manner, the connection management module at the system layer of the assisted device and the connection management module in the controlled device are jointly responsible for establishing a connection between BLUETOOTH of the controlled device and BLUETOOTH of the assisted device. After the BLUETOOTH connection is successfully established between the assisted device and the controlled device, a transmission channel between the transmission management module of the assisted device, BLUETOOTH of the assisted device, BLUETOOTH of the controlled device, and the connection management module of the controlled device is formed, where the transmission channel is configured to subsequently transmit a control instruction. The connection management module of the controlled device is responsible for transmitting the received control instruction to a control management module through an integrated interface (for example, an interface provided in a software development kit (SDK)), so as to control the controlled device.

It may be understood from the foregoing description that a path for transmitting the control instruction from the control management module of the assisted device to the control management module of the controlled device is: the control management module of the assisted device—the kit module—the transmission management module—BLUETOOTH or WI-FI of the assisted device—BLUETOOTH or WI-FI of the controlled device—the connection management module of the controlled device—the control management module of the controlled device. Referring to FIG. 8 and FIG. 9A to FIG. 9C, step F indicates a connection established between the assisted device and the controlled device, and the connection provides a transmission channel for the subsequent control instruction.

At step G in FIG. 9A to FIG. 9C, the remote assistance application in the assisted device adds, to a container management module of the remote assistance application, an entrance to or a control interface of the control application corresponding to the application identifier. Referring to FIG. 8, the remote assistance application is provided with the container management module. The container management module is configured to accommodate or control an entrance to or a control interface of an application. In an actual application, the display interface of the remote assistance application of the assisted device displays the entrance to or the control interface of the control application in the container management module.

In a specific implementation process, the remote assistance application invokes a method for starting the control application of the controlled device provided by the system layer, for example, invokes a start ability( ) function, and inputs the application identifier of the control application of the controlled device and the device identifier of the controlled device at the same time. The system layer may verify, based on the "identifier indicating whether the controlled device supports remote control" in the NFC tag information received by the application management module, whether the control application of the controlled device is allowed to be started by the remote assistance application. If the control application of the controlled device is allowed to be started by the remote assistance application, the control application of the controlled device is started, the entrance to or the control interface of the control application is added to the container management module of the remote assistance application, and the remote assistance application may display the entrance or the control interface in the container management module.

In an actual application, because the controlled device may be controlled by a user on the side of the assisting device, the remote assistance application of the assisted device may not display the entrance to or the control interface of the control application of the controlled device. In other words, in an actual application, step G may be omitted.

At step H in FIG. 9A to FIG. 9C, the remote assistance application of the assisted device searches the account management module for the bound assisting device. Referring to the description of step A in FIG. 9A to FIG. 9C, the binding relationship between the assisted device and the assisting device has been pre-stored in the account management module of the assisted device.

At step I in FIG. 9A to FIG. 9C, a conversation management module in the remote assistance application of the assisted device may initiate a remote assistance conversation, for example, may generate a remote assistance request, where the generated remote assistance request carries the application identifier of the control application.

At step J in FIG. 9A to FIG. 9C, the remote assistance application of the assisted device sends the remote assistance request to the first cloud platform.

At step K in FIG. 9A to FIG. 9C, the first cloud platform sends the remote assistance request to the assisting device.

At step L in FIG. 9A to FIG. 9C, after an application management module in the assisting device receives the remote assistance request, the application management module starts a remote assistance application. Referring to FIG. 8, the application management module exists at a system layer of the assisting device, and the remote assistance application exists at an upper layer of the system layer.

At step M in FIG. 9A to FIG. 9C, the remote assistance application in the assisting device is started.

At step N in FIG. 9A to FIG. 9C, an account management module in the remote assistance application of the assisting device verifies the information about the assisted device. The account management module of the assisting device also pre-stores the binding relationship between the assisted device and the assisting device, and the account management module may determine whether an initiator of the currently received remote assistance request is an assisted device that has a binding relationship with the assisting device.

At step O in FIG. 9A to FIG. 9C, the user accepts the remote assistance conversation. When the account management module determines that the initiator of the currently received remote assistance request is the assisted device that has a binding relationship with the device, the remote assistance application of the assisting device may display an interface including an "Accept" or "Reject" button, and the user may tap "Accept" to indicate that the user accepts the remote assistance conversation.

At step P in FIG. 9A to FIG. 9C, a remote assistance conversation is established between the remote assistance application of the assisting device and the remote assistance application of the assisted device. Referring to step P shown in FIG. 8, the conversation management module in the remote assistance application of the assisted device, the conversation management module in the first cloud platform, and the conversation management module in the remote assistance application of the assisting device allow a remote assistance conversation to be established between the remote assistance application of the assisted device and the remote assistance application of the assisting device.

It should be noted that, when the remote assistance conversation is established, a video conversation or an audio conversation may also be established between the assisted device and the assisting device.

The remote assistance conversation between the assisting device and the assisted device may exist in the form of a conversation. For example, when the assisted device sends the remote assistance request to the assisting device, the assisting device creates a conversation, assigns an identifier (ID) to the conversation, and sends the ID to the assisted device. When sending other information to the assisting device, the assisted device may include the ID in the other information. In this way, when receiving information that carries the ID, the assisting device may associate the currently received information carrying the ID with the previously received information having the same ID, so as to maintain the conversation between the assisting device and the assisted device. For brief description, a forwarding process of the first cloud platform is omitted in the description of the foregoing conversation.

As an example, after the assisted device "taps" the microwave oven, the assisted device sends a remote assistance request to the assisting device, where the remote assistance request carries the application identifier and the device identifier of the control application of the microwave oven. The assisting device may return a conversation ID to the assisted device. After the assisted device continues to "tap" the smart speaker, the assisted device sends the application identifier, including the conversation ID, of the control application of the smart speaker to the assisting device. After receiving the application identifier, carrying the conversation ID, of the control application of the smart speaker, the assisting device determines that the application identifier of the control application of the smart speaker and the application identifier of the control application of the microwave oven are from the same remote assistance conversation with the same assisted device.

At step Q in FIG. 9A to FIG. 9C, the remote assistance application of the assisting device adds, to a container management module, the entrance to or the control interface of the control application corresponding to the application identifier. Referring to FIG. 8, the remote assistance application of the assisting device also includes the container management module. The container management module may have the same function as the container management module in the assisted device, and details are not described herein again.

At step R in FIG. 9A to FIG. 9C, the user performs an operation on a control interface of the control application, so as to generate a control instruction. The remote assistance application of the assisting device may display the control interface of the control application in the container management module, and the user performs an operation in the control interface to generate the control instruction for the controlled device.

At step S in FIG. 9A to FIG. 9C, the remote assistance application of the assisting device invokes a control management module. As shown in FIG. 8, the remote assistance application of the assisting device is provided with the control management module, and the control management module may send the control instruction to a control management module of the first cloud platform.

At step T in FIG. 9A to FIG. 9C, the control management module in the remote assistance application of the assisting device sends the control instruction to the first cloud platform.

At step U in FIG. 9A to FIG. 9C, the first cloud platform sends the control instruction to the assisted device.

Referring to FIG. 8, the control management module in the remote assistance application of the assisting device sends the control instruction to the control management module of the first cloud platform, and then the control management module of the first cloud platform sends the control instruction to the control management module in the remote assistance application of the assisted device.

At step V in FIG. 9A to FIG. 9C, the control management module in the remote assistance application of the assisted device invokes an interface provided by the kit. Referring to the description in step F, the interface provided by the kit may provide a channel for transmitting the control instruction between the assisted device and the assisting device.

At step W in FIG. 9A to FIG. 9C, the assisted device sends the control instruction to a connection management module of the controlled device through a pre-established channel between the assisted device and the assisting device. In this embodiment, referring to FIG. 8, the connection management module exists in the controlled device, and the connection management module may include an SDK. The SDK integrates a communication interface between the control management module and a BLUETOOTH module at an underlying layer of the controlled device, or a communication interface between the control management module and a WI-FI module of the controlled device, so as to provide a communication channel between the control management module and the BLUETOOTH module of the controlled device or a communication channel between the control management module and the WI-FI module of the controlled device.

As described above, step F in FIG. 8 and FIG. 9A to FIG. 9C indicates the process of establishing the channel for transmitting the control instruction between the assisted device and the controlled device. Step W in FIG. 8 and FIG. 9A to FIG. 9C indicates a process of sending the control instruction through the channel established in step F in FIG. 8 and FIG. 9A to FIG. 9C.

At step X in FIG. 9A to FIG. 9C, the connection management module in the controlled device provides an SDK interface to send the control instruction to the control management module, where the control management module is configured to control, based on the control instruction, corresponding software and hardware to respond.

It may be understood from step V to step X in FIG. 9A to FIG. 9C and with reference to FIG. 8 that, a process of transmitting the control instruction from the assisted device to the controlled device is: the control management module in the remote assistance application of the assisted device—the Kit—the transmission management module at the system layer of the assisted device—the BLUETOOTH or WI-FI module of the assisted device—the BLUETOOTH or WI-FI of the controlled device—the connection management module of the controlled device—the control management module of the controlled device—the software and hardware corresponding to the controlled device.

Figure 10:
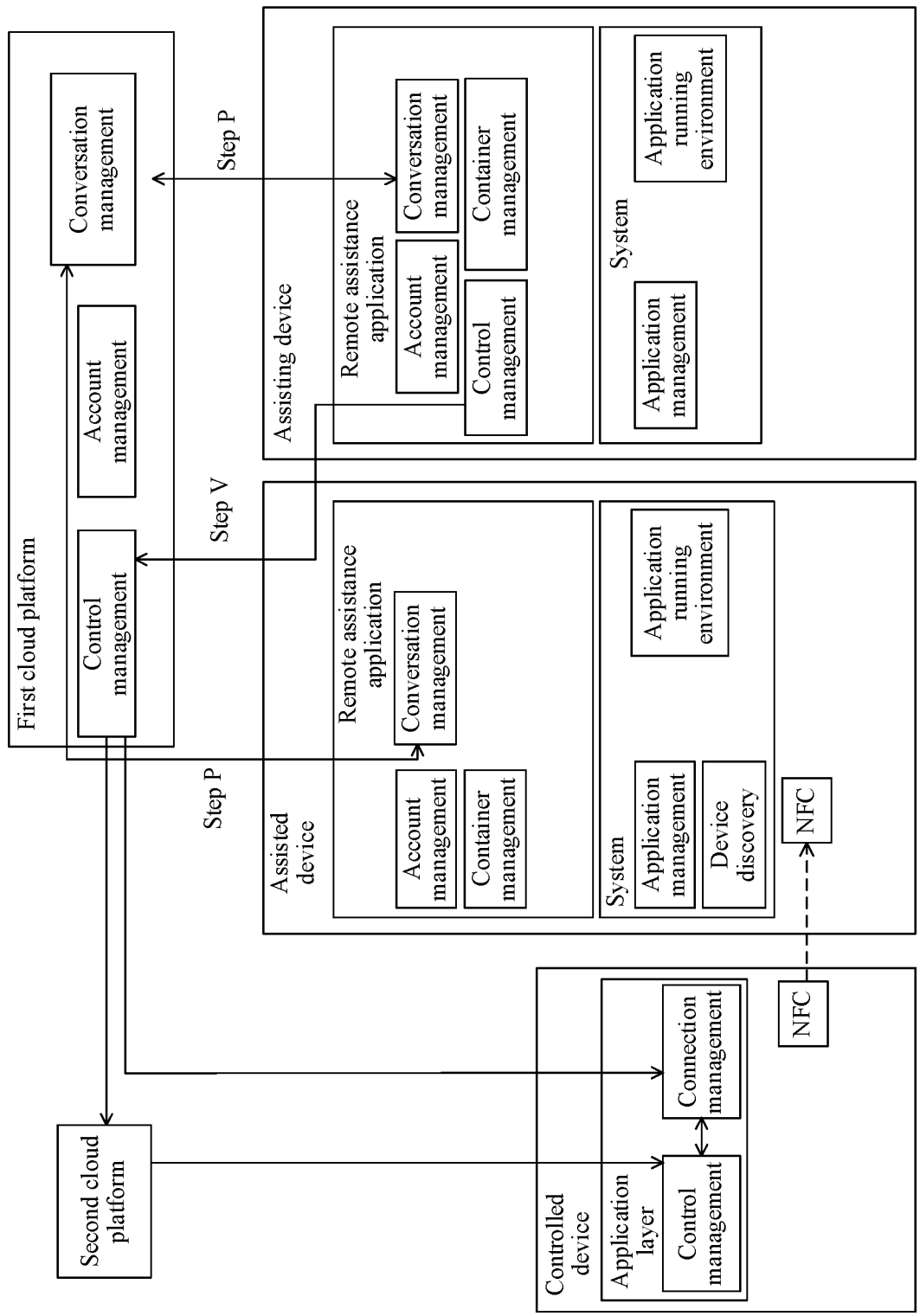
FIG. 10 is a diagram of a technical architecture of another remote assistance method according to an embodiment of this disclosure.
Figure 11A:
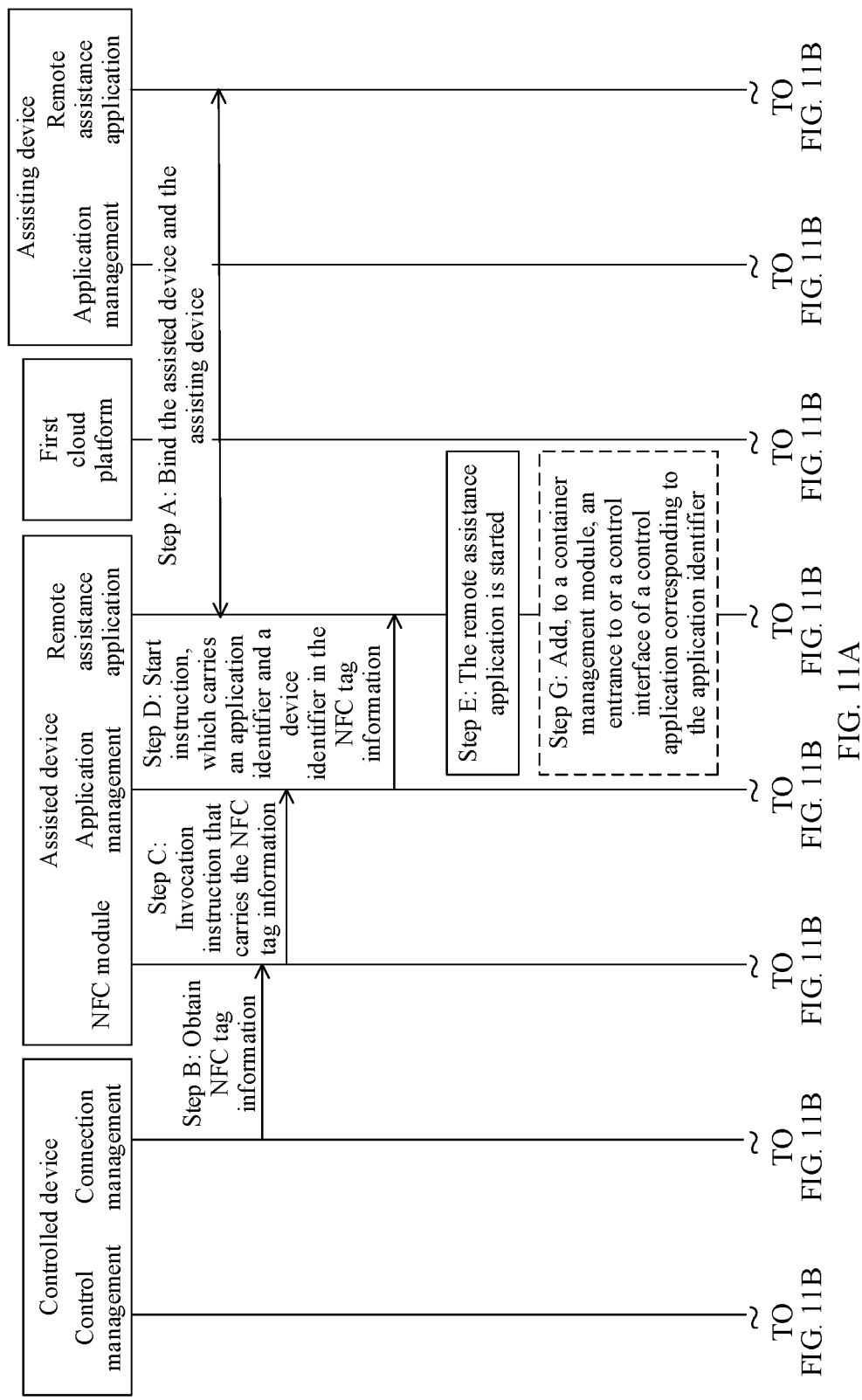
FIGS. 11A, 11B, and 11C are a schematic diagram of a timing process of a remote assistance method based on the diagram of the technical architecture according to the embodiment shown in FIG. 10.
Figure 11B:
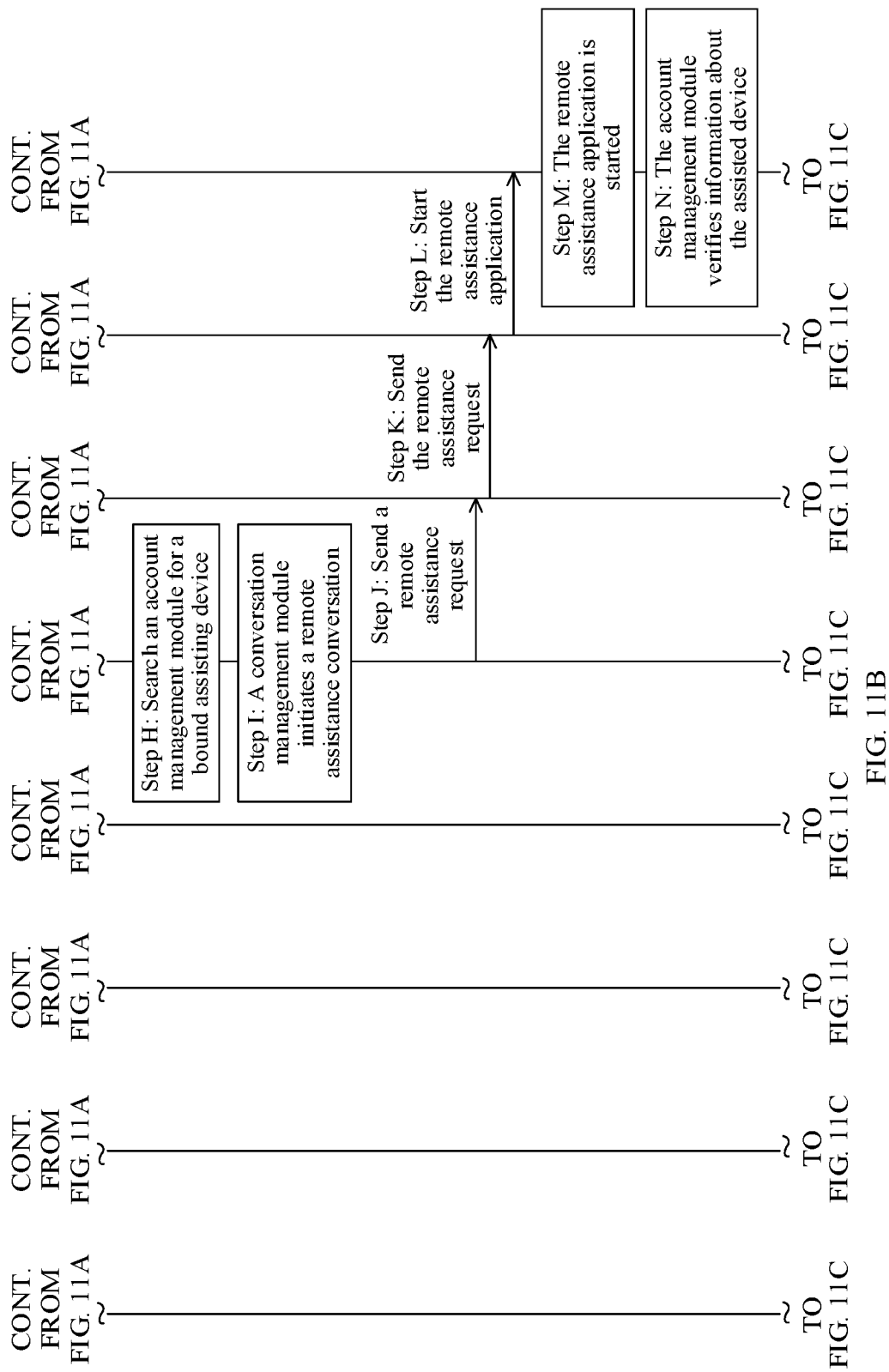
Figure 11C:
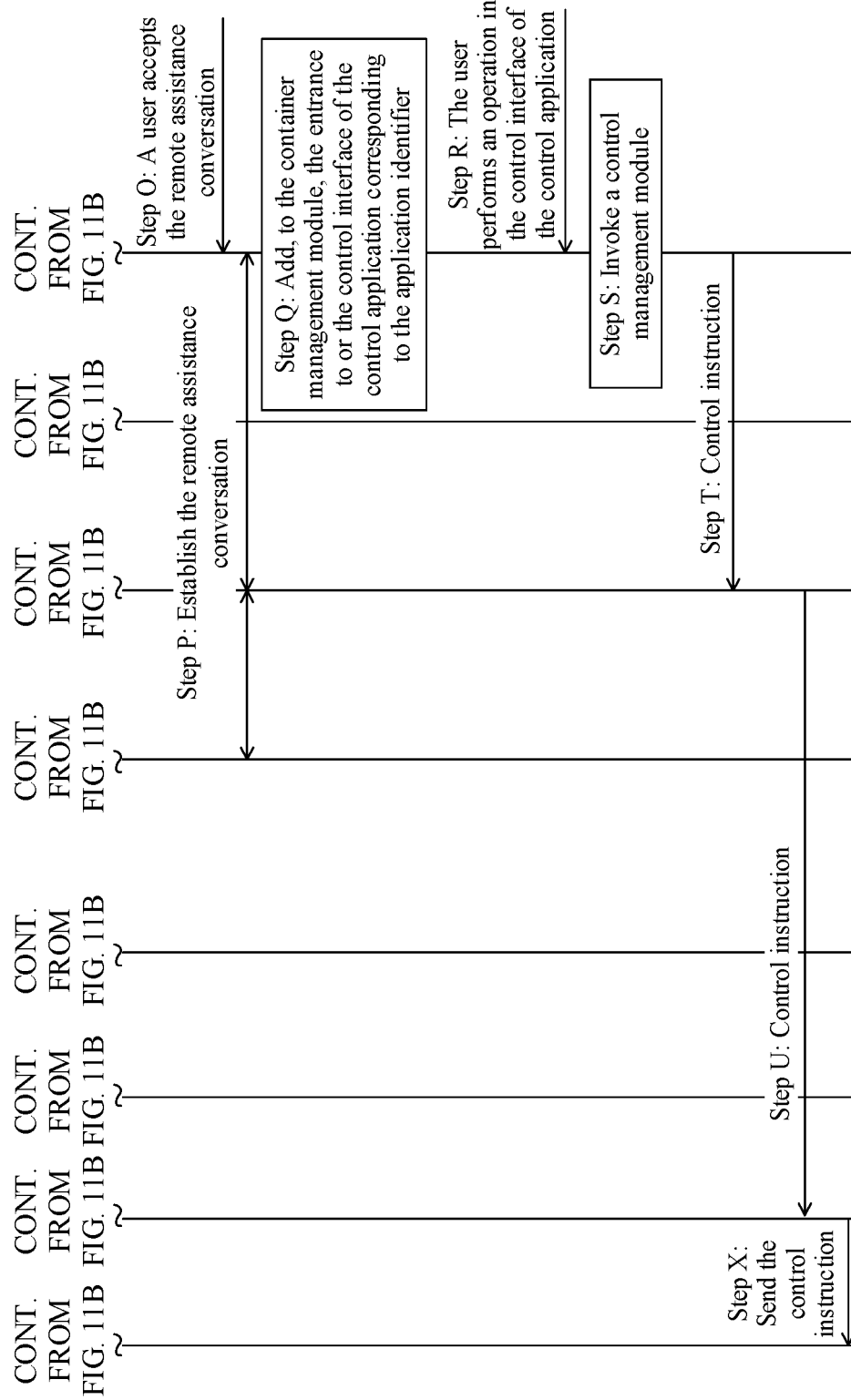

In another embodiment of this disclosure, FIG. 10 is a diagram of a technical architecture of a remote assistance method according to an embodiment of this disclosure. FIG. 11A to FIG. 11C are a timing diagram of a remote assistance method based on the diagram of the technical architecture shown in FIG. 10 according to an embodiment of this disclosure.

There are some differences between the embodiment corresponding to FIG. 10 with reference to FIG. 11A to FIG. 11C and the embodiment corresponding to FIG. 8 with reference to FIG. 9A to FIG. 9C. As shown in the figure, a process of transmitting a control instruction for a controlled device in the embodiment corresponding to FIG. 10 with reference to FIG. 11A to FIG. 11C is: an assisting device—a first cloud platform—the controlled device (in this embodiment, an instruction sent by the assisting device to the first cloud platform is denoted as a fourth control instruction, and an instruction sent by the first cloud platform to the controlled device is denoted as a fifth control instruction), or the assisting device—the first cloud platform—a second cloud platform—the controlled device (in this embodiment, an instruction sent by the assisting device to the first cloud platform is denoted as a sixth control instruction, an instruction sent by the first cloud platform to the second cloud platform is denoted as a seventh control instruction, and an instruction sent by the second cloud platform to the controlled device is denoted as an eighth control instruction). In the embodiment corresponding to FIG. 8 with reference to FIG. 9A to FIG. 9C, a process of transmitting the control instruction of the controlled device is: the assisting device—the first cloud platform—the assisted device—the controlled device (in this embodiment, an instruction sent by the assisting device to the first cloud platform is denoted as a first control instruction, a control instruction sent by the first cloud platform to the assisted device is denoted as a second control instruction, and an instruction sent by the assisted device to the controlled device is denoted as a third control instruction).

In the embodiment corresponding to FIG. 10 with reference to FIG. 11A to FIG. 11C, there is no transmission of a control instruction between the assisted device and the controlled device. Therefore, in this embodiment, there is no need to establish a connection between the assisted device and the controlled device (that is, step F in FIG. 9A to FIG. 9C may be omitted). Instead, the control instruction is forwarded to the controlled device by the first cloud platform or the first cloud platform and the second cloud platform. If the control instruction is sent to a connection management module of the controlled device by the first cloud platform, the connection management module sends the control instruction to a control management module at an application layer of the controlled device. If the control instruction is sent to the second cloud platform by the first cloud platform, and then the control instruction is sent to the controlled device by the second cloud platform, the second cloud platform may send the control instruction to the control management module at the application layer of the controlled device. The second cloud platform is a cloud platform corresponding to a manufacturer of the controlled device.

Referring to FIG. 10, the controlled device includes the connection management module, and the connection management module may include an SDK. The SDK integrates a communication interface between the control management module of the controlled device and the first cloud platform, so as to provide a channel for transmitting the control instruction between the control management module of the controlled device and the control management module of the first cloud platform.

In an actual application, there may be other application scenarios for the remote assistance method provided in the embodiments of this disclosure. To compare differences between different application scenarios, refer to application scenarios shown in FIGS. 12A, 12B, and 12C to FIG. 14A to FIG. 14I. In the application scenario shown in FIGS. 12A, 12B, and 12C, an assisted user requires an assisting user to remotely control only a microwave oven. In the application scenario shown in FIG. 13A to FIG. 13E, the assisted user requires the assisting user to remotely control the microwave oven and a smart speaker. In the application scenario shown in FIG. 14A to FIG. 14I that is based on the application scenario shown in FIG. 13A to FIG. 13E, the assisting user is further required to remotely control a self-service ticketing kiosk. All controlled devices in the application scenarios in FIGS. 12A, 12B, and 12C to FIG. 14A to FIG. 14I support remote control by default.

As shown in FIGS. 12A, 12B, and 12C, in the scenario in which the assisted user requires the assisting user only to control the microwave oven to heat milk, as shown in FIG. 12A, the assisted user "taps" the assisted device against the microwave oven, and the assisted device obtains NFC tag information of the microwave oven. As shown in FIG. 12B, the assisted device starts a remote assistance application, and the remote assistance application obtains a control interface (a control interface of the microwave oven) of a control application corresponding to an application identifier. The remote assistance application displays a control interface of a control application of the microwave oven. The user may initiate help-seeking to the assisting device via an "Initiate help-seeking" button in the remote assistance application of the assisted device. The assisted device sends a remote assistance request to the assisting device, where the remote assistance request carries the application identifier of the control application of the microwave oven. After the assisting device receives the remote assistance request, the assisting device displays an interface shown in FIG. 12C. The assisting user may establish a remote assistance conversation between the assisted device and the assisting device via an Accept button in the interface shown in FIG. 12C. The assisting user remotely controls, on the side of the assisting device, the microwave oven by using the control application (the control application of the microwave oven) corresponding to the application identifier in the remote assistance request.

In the scenario shown in FIGS. 12A, 12B, and 12C, the microwave oven is the first controlled device against which the assisted device "taps". For the first controlled device against which the assisted device "taps", the assisted device needs to start the remote assistance application in the assisted device. The assisted device sends the application identifier of the control application of the first controlled device to the assisting device together with the remote assistance request.

Figures 13A, 13B, 13C:
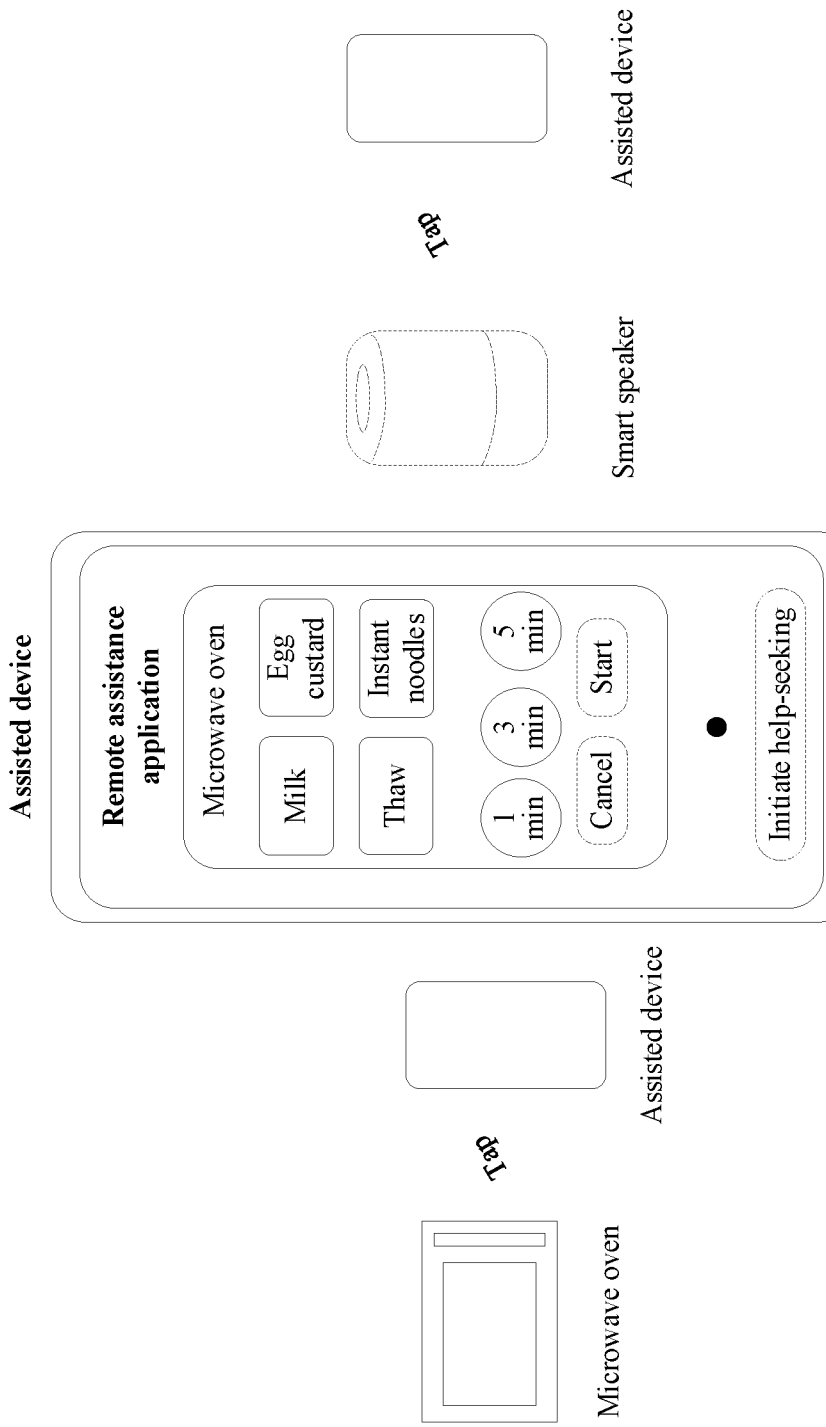
FIGS. 13A, 13B, 13C, 13D, and 13E are schematic diagrams of an application scenario of a remote assistance method according to an embodiment of this disclosure.
Figures 13D, 13E:
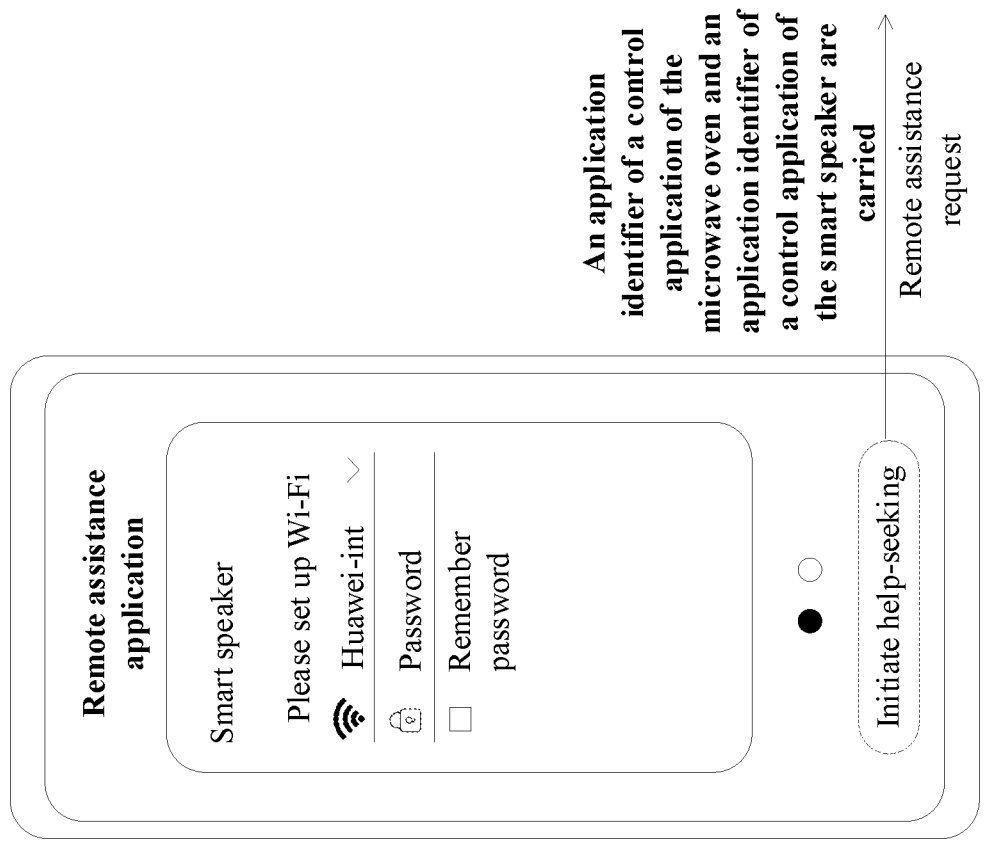

As shown in FIG. 13A to FIG. 13E, the assisted user requires the assisting user to control the microwave oven to heat milk, and further requires the assisting user to connect the smart speaker to a wireless network. As shown in FIG. 13A, the assisted user "taps" the assisted device against the microwave oven, and the assisted device obtains the NFC tag information of the microwave oven. As shown in FIG. 13B, the assisted device starts the remote assistance application. At this time, the assisted user may not initiate help-seeking by using the remote assistance application. Instead, as shown in FIG. 13C, the assisted user continues to "tap" the assisted device against the smart speaker, and the assisted device obtains NFC tag information of the smart speaker. Because the remote assistance application in the assisted device is already started, the assisted device no longer "starts the remote assistance application" in response to the obtained NFC tag information of the smart speaker. Instead, as shown in FIG. 13D, a control interface of a control application of the smart speaker may be displayed by using the started remote assistance application. Similarly, after the remote assistance application is started and before the assisted user initiates help-seeking by using the remote assistance application, the assisted device does not "start the remote assistance application" in response to NFC tag information of any controlled device that is obtained by using the "OneHop" method, but may display, by using the started remote assistance application, a control interface of a control application corresponding to an application identifier currently obtained by using the "OneHop" method. The assisted user may initiate help-seeking via an "Initiate help-seeking" button in an interface shown in FIG. 13D. In this case, the remote assistance request sent by the assisted device to the assisting device carries the application identifier of the control application of the microwave oven and the application identifier of the control application of the smart speaker. After the assisting device receives the remote assistance request, as shown in FIG. 13E, the assisting user accepts the remote assistance request on the side of the assisting device, and a remote assistance conversation is established between the assisted device and the assisting device. The assisting user remotely controls, on the side of the assisting device, the microwave oven by using the control application of the microwave oven corresponding to the application identifier in the remote assistance request. The assisting user remotely controls, on the side of the assisting device, the smart speaker by using the control application of the smart speaker corresponding to the application identifier in the remote assistance request.

In the scenario shown in FIG. 13A to FIG. 13E, the microwave oven is the first controlled device against which the assisted device "taps". For the first controlled device against which the assisted device "taps", the assisted device needs to start the remote assistance application in the assisted device. The smart speaker is the second controlled device against which the assisted device "taps". For the second controlled device against which the assisted device "taps", the assisted device does not need to start the remote assistance application in the assisted device. Certainly, for any one of the third, fourth, . . . , and $i^{th}$ controlled devices against which the assisted device "taps" before the user initiates help-seeking, the assisted device does not need to start the remote assistance application in the assisted device. When the user on the side of the assisted device initiates help-seeking, the sent remote assistance request carries application identifiers of control applications of the first to $i^{th}$ controlled devices.

In an actual application, after the assisted device "taps" against the controlled device, if the NFC tag information of the controlled device is obtained, it may be first determined whether the assisted device starts the remote assistance application.

If the remote assistance application is not started, it indicates that the currently obtained NFC tag information is NFC tag information of the first controlled device, and then the remote assistance application may be started.

If the remote assistance application has been started, it indicates that the currently obtained NFC tag information is NFC tag information of the second, third, . . . , or $i^{th}$ controlled device, and then the assisted device may wait to initiate help-seeking.

Figures 14G, 14H, 14I:
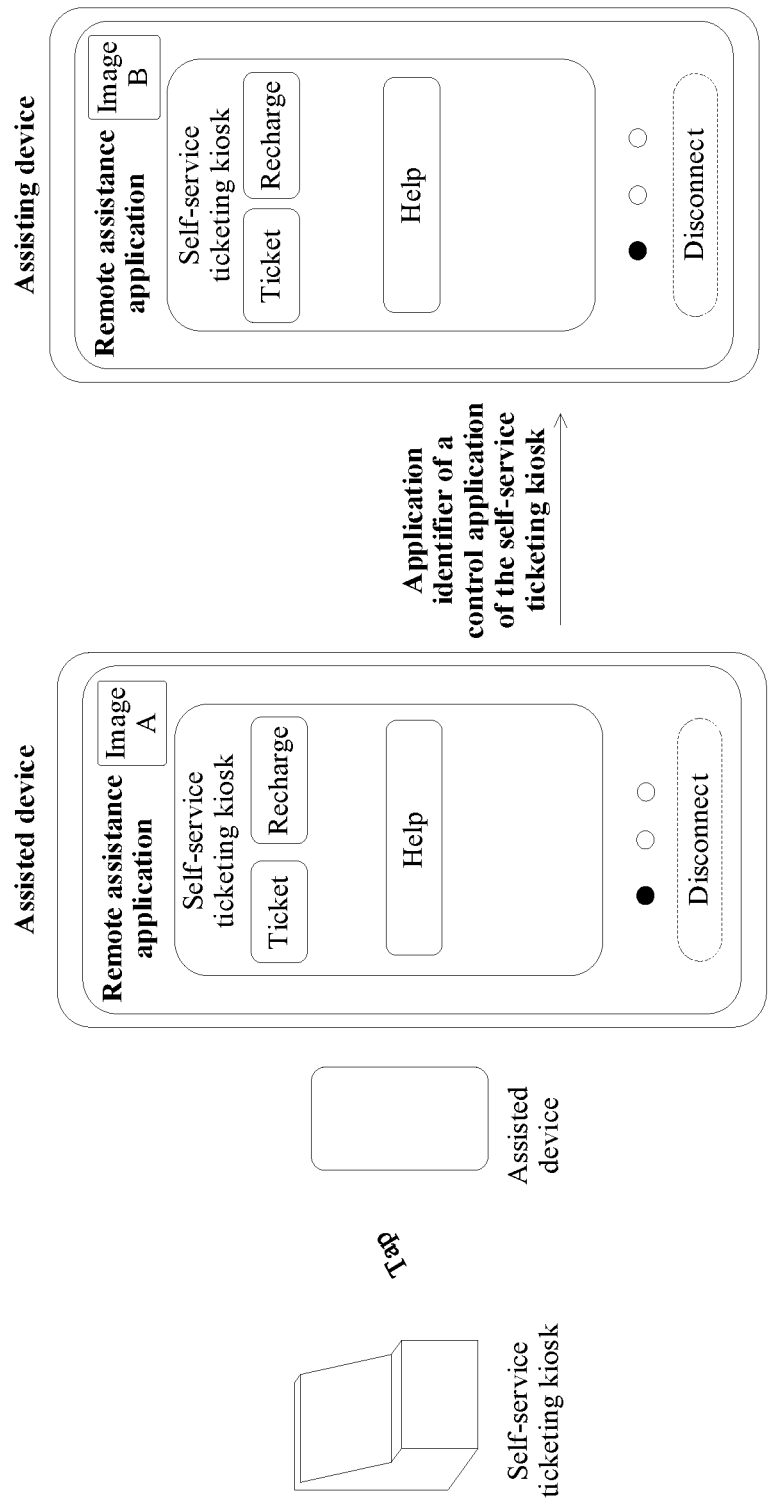

As shown in FIG. 14A to FIG. 14I, on the basis of the application scenario shown in FIG. 13A to FIG. 13E (or the application scenario shown in FIGS. 12A, 12B, and 12C in an actual application), after the assisting user accepts the remote assistance request on the side of the assisting device, as shown in FIG. 14F, a remote assistance conversation is established between the assisted device and the assisting device, and the "Initiate help-seeking" button is no longer displayed in the display interface of the remote assistance application of the assisted device. For FIG. 14A to FIG. 14E, refer to the description of FIG. 13A to FIG. 13E. Details are not described again.

After the remote assistance conversation is established between the assisted device and the assisting device, as shown in FIG. 14G, the assisted user may continue to "tap" the assisted device against a self-service ticketing kiosk to obtain NFC tag information of the self-service ticketing kiosk. Because the remote assistance application in the assisted device has been started, and the remote assistance conversation has been established between the assisted device and the assisting device by using the remote assistance request, the assisted device does not respond with "starting the remote assistance application", and as shown in FIG. 14H, the interface of the remote assistance application of the assisted device does not display the "Initiate help-seeking" button either. The assisted device may send an obtained application identifier of a control application of the self-service ticketing kiosk to the assisting device, without needing to include it in the remote assistance request as the application identifier of the control application of the second, . . . , or $i^{th}$ controlled device. As shown in FIG. 14I, the assisting device no longer displays the interface for accepting or rejecting the remote assistance request, but displays, by using the started remote assistance application, a control interface of the control application of a self-service ticketing kiosk.

As shown in FIG. 14H to FIG. 14I, the assisted user requires the assisting user to provide remote assistance on the microwave oven, the smart speaker, and the self-service ticketing kiosk. The remote assistance application in the assisting device may receive the application identifier of the control application of the microwave oven, the application identifier of the control application of the smart speaker, and the application identifier of the control application of the self-service ticketing kiosk. Therefore, the remote assistance application of the assisting device may display the control interface of the control application of the microwave oven, the control interface of the control application of the smart speaker, and the control interface of the control application of the self-service ticketing kiosk, and the assisting device may further switch between the control interfaces of all the control applications.

In the scenario shown in FIG. 14A to FIG. 14I, the microwave oven is the first controlled device against which the assisted device "taps". For the first controlled device against which the assisted device "taps", the assisted device needs to start the remote assistance application in the assisted device. The smart speaker is the second controlled device against which the assisted device "taps". For the second controlled device against which the assisted device "taps", the assisted device does not need to start the remote assistance application in the assisted device. Certainly, for any one of the third, fourth, . . . , and $i^{th}$ controlled devices against which the assisted device "taps" before the user initiates help-seeking, the assisted device does not need to start the remote assistance application in the assisted device. When the user on the side of the assisted device initiates help-seeking, the sent remote assistance request carries application identifiers of control applications of the first to $i^{th}$ controlled devices. For each controlled device (the $(i+1)^{th}$, $(i+2)^{th}$, . . . , or $(i+j)^{th}$ controlled device) against which the assisted device "taps" after the remote assistance conversation is established between the assisted device and the assisting device, the assisted device does not respond with "starting the remote assistance application", and does not send the "remote assistance request". What the assisted device needs to perform is to send an application identifier of a control application of each subsequent "tapped" controlled device (the $(i+1)^{th}$, $(i+2)^{th}$, . . . , or $(i+j)^{th}$ controlled device) to the assisting device.

In the foregoing example, NFC tag information of the second, third, fourth, . . . , and $i^{th}$ controlled devices may all be denoted as third information, and NFC tag information of the $(i+1)^{th}$, $(i+2)^{th}$, . . . , and $(i+j)^{th}$ controlled devices may all be denoted as fourth information.

In an actual application, after the assisted device starts the remote assistance application, when the assisted device "taps" against the controlled device, if the NFC tag information of the controlled device is obtained, it may be first determined whether a remote assistance conversation has been established between the assisted device and the assisting device.

If the remote assistance conversation has not been established, it indicates that the currently obtained application identifier is NFC tag information of the second, third, . . . , or $i^{th}$ controlled device, and then the assisted device may wait to initiate help-seeking.

If the remote assistance conversation has been established, it indicates that the currently obtained application identifier is NFC tag information of the $(i+1)^{th}$, $(i+2)^{th}$, . . . , or $(i+j)^{th}$ controlled device, the application identifier in the currently obtained NFC tag information is sent to the assisting device.

i is a positive integer greater than or equal to 2, and j is a positive integer greater than or equal to 1.

In another embodiment of this disclosure, in an application scenario shown in FIG. 15A to FIG. 15D, a process in which the remote assistance application of the assisted device displays the control interface of the control application of the controlled device includes the following: displaying, by the assisted device, an icon of the control application of the controlled device by using the remote assistance application, and starting, by the assisted device in response to a first start instruction received via the icon, the control application of the controlled device by using the remote assistance application, and displaying a control interface of the started control application of the controlled device.

Figures 15A, 15B, 15C:
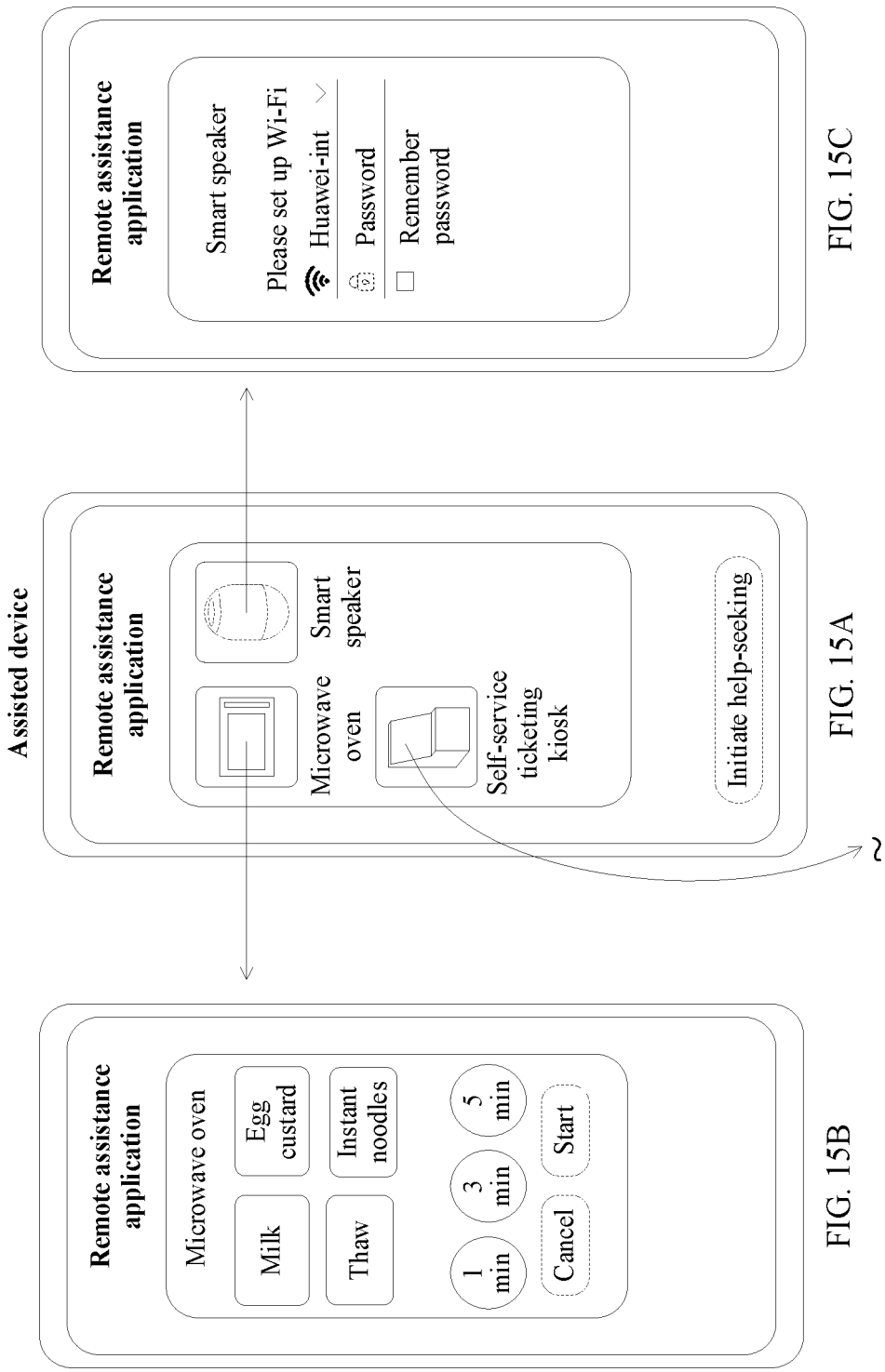

In this embodiment of this disclosure, the assisted device may request the assisting device to perform remote assistance. Therefore, it is set that when the assisted device "taps" against the controlled device that supports remote control, the assisted device starts the remote assistance application in the assisted device, so as to send the remote assistance request to the assisting device by using the remote assistance application. However, to enable the assisted user to control the controlled device autonomously when the assisted user has a capability of autonomously controlling the controlled device, an entrance to the control application of the controlled device may be displayed in the remote assistance application of the assisted device. As shown in FIG. 15A to FIG. 15D, the remote assistance application of the assisted device may display the icon of the control application of the controlled device, for example, an icon of a control application of a microwave oven, an icon of a control application of a smart speaker, and an icon of a control application of a self-service ticketing kiosk that are shown in FIG. 15A. The assisted user may enter a control interface of the control application by touching the displayed icon. As shown in FIG. 15A, when the user touches the icon of the control application of the microwave oven that is displayed in the remote assistance application of the assisted device, as shown in FIG. 15B, the remote assistance application of the assisted device displays a control interface of the control application of the microwave oven. As shown in FIG. 15A, when the user touches the icon of the control application of the smart speaker that is displayed in the remote assistance application of the assisted device, as shown in FIG. 15C, the remote assistance application of the assisted device displays a control interface of the control application of the smart speaker. As shown in FIG. 15A, when the user touches the icon of the control application of the self-service ticketing kiosk that is displayed in the remote assistance application of the assisted device, as shown in FIG. 15D, the remote assistance application of the assisted device displays a control interface of the control application of the self-service ticketing kiosk. Certainly, the control interface of the controlled device may also be directly displayed in the first remote assistance application of the first device. For details, refer to the control interface displayed by the remote assistance application of the assisted device shown in FIG. 6B and FIG. 6C.

In FIG. 15A to FIG. 15D, the assisted device is used as an example to describe a process of displaying the control interface of the control application of the controlled device. For a process of displaying, by the assisting device, the control interface of the control application of the controlled device, refer to the description corresponding to FIG. 15A to FIG. 15D, and details are not described herein again.

Certainly, in an actual application, after starting the control application of the controlled device by using the remote assistance application, the assisted device may also directly display the control interface of the started control application of the controlled device.

After the interaction process between the first device and the third device is described, the remote assistance methods provided in the embodiments of this disclosure are described below by using the first device and the third device as execution bodies, respectively.

FIG. 16 is a schematic flowchart of a remote assistance method according to an embodiment of this disclosure. The method is applied to a first device, and the method includes the following steps.

Step 1601: After obtaining first information, the first device starts a first remote assistance application in the first device, where the first information includes an application identifier of a second application for controlling a second device and an identifier for indicating that the second device supports remote control, the first device is a preset assisted device, and the second device is a controlled device.

Step 1602: The first device sends a remote assistance request to a third device by using the first remote assistance application, where the third device is an assisting device of the first device, the remote assistance request carries the application identifier of the second application, and the remote assistance request is used to indicate the third device to start a second remote assistance application and remotely control the second device based on the second remote assistance application and the second application.

In another embodiment of this disclosure, the method further includes setting, by the first device in response to a first request, the third device as an assisting device of the first device, where the first request is sent by the third device, and the first request carries account information of the third device, storing, by the first device, an assistance relationship between the first device and the third device, where the assistance relationship between the first device and the third device includes a correspondence between account information of the first device and the account information of the third device, and sending, by the first device, second information to the third device, where the second information carries the account information of the first device, or the second information carries a correspondence between the account information of the first device and the account information of the third device, and the second information is used to indicate the third device to set the first device as an assisted device of the third device.

In another embodiment of this disclosure, the first device is provided with an NFC module, and the first information is NFC tag information of the second device, and starting, by the first device after obtaining first information, a first remote assistance application in the first device includes, after the first device obtains the NFC tag information of the second device by using the NFC module, in response to determining, according to the identifier for indicating that the second device supports remote control, that the second device supports remote control, starting the first remote assistance application in the first device.

In another embodiment of this disclosure, sending, by the first device, a remote assistance request to a third device by using the first remote assistance application includes sending, by the first device, a first remote assistance request to a first cloud platform by using the first remote assistance application, where the first remote assistance request carries the application identifier of the second application, the first remote assistance request is used to indicate the first cloud platform to send a second remote assistance request to the third device, and the second remote assistance request carries the application identifier of the second application.

In another embodiment of this disclosure, after starting, by the first device, a first remote assistance application in the first device, the method further includes displaying, by the first remote assistance application in the first device, a control interface of the second application.

In another embodiment of this disclosure, the method further includes a control interface of the first remote assistance application in the first device includes a fourth control, where the fourth control is used to initiate help-seeking to the third device, detecting a fourth operation entered by a user, where the fourth operation acts on the fourth control, and sending, by the first device in response to the fourth operation, the remote assistance request to the third device by using the first remote assistance application.

In another embodiment of this disclosure, before sending, by the first device, a remote assistance request to a third device by using the first remote assistance application, the method further includes obtaining, by the first device, third information, where the third information includes an application identifier of a fourth application for controlling a fourth device and an identifier for indicating that the fourth device supports remote control, and displaying, by the first device, a control interface of the fourth application by using the first remote assistance application, and sending, by the first device, a remote assistance request to a third device by using the first remote assistance application includes sending, by the first device, the remote assistance request to the third device by using the first remote assistance application, where the remote assistance request carries the application identifier of the second application and the application identifier of the fourth application.

In another embodiment of this disclosure, after sending, by the first device, a remote assistance request to a third device by using the first remote assistance application, the method further includes obtaining, by the first device, fourth information, where the fourth information includes an application identifier of a fifth application for controlling a fifth device and an identifier for indicating that the fifth device supports remote control, displaying, by the first device, a control interface of the fifth application by using the first remote assistance application, and sending, by the first device, the application identifier of the fifth application to the third device.

In another embodiment of this disclosure, the first device obtains application identifiers of control applications of at least two controlled devices, the at least two controlled devices include the second device and the fourth device, and after the displaying, by the first remote assistance application in the first device, a second control interface of the second application, the method further includes switching, in response to a received second switching instruction, the control interface of the second application currently displayed in the first remote assistance application of the first device to the control interface of the fourth application.

In another embodiment of this disclosure, the method further includes obtaining, by the first device, the first information by approaching or tapping the second device.

In another embodiment of this disclosure, before sending, by the first device, a remote assistance request to a third device by using the first remote assistance application, the method further includes searching, by the first device, for an assisting device of the first device according to the stored assistance relationship, where the assisting device of the first device includes the third device.

In another embodiment of this disclosure, the method further includes, when there are at least two assisting devices of the first device, the third device is an assisting device with the highest priority in the assisting devices of the first device.

In this embodiment of this disclosure, for a manner in which the first remote assistance application in the first device displays the control interfaces of the fourth application and the fifth application, refer to the manner in which the control interface of the second application is displayed. Details are not described herein again. For a manner in which the remote assistance application of the first device switches between different control interfaces, refer to the manner in which the remote assistance application of the third device switches between different control interfaces in the foregoing embodiment.

FIG. 17 is a schematic flowchart of a remote assistance method according to an embodiment of this disclosure. The method is applied to a third device, and the method includes the following steps.

Step 1701: The third device starts, in response to receiving a remote assistance request, a second remote assistance application in the third device, where the remote assistance request carries an application identifier of a second application for controlling a second device, the second device is a controlled device, and a control interface of the second application is displayed in the second remote assistance application.

Step 1702: The third device remotely controls the second device in response to a control instruction received on the control interface of the second application.

In another embodiment of this disclosure, the second remote assistance application of the third device displays a first interface, where the first interface includes a first control, and the first control is used to indicate the third device to search for an electronic device, the third device detects a first operation, where the first operation acts on the first control, the second remote assistance application of the third device displays, in response to the first operation, a second interface, where the second interface displays an identifier of a found electronic device, and the identifier of the found electronic device includes an identifier of the first device, the third device detects a second operation, where the second operation acts on the identifier of the first device, and the third device sends, in response to the second operation, a first request to the first device by using the second remote assistance application, where the first request carries account information of the third device, and the first request is used to indicate the first device to set the third device as an assisting device of the first device.

In another embodiment of this disclosure, starting, by the third device in response to receiving the remote assistance request, a second remote assistance application in the third device includes displaying, by the third device in response to receiving the remote assistance request, a third interface, where the third interface includes a second control and a third control, the second control is used to accept the remote assistance request, and the third control is used to reject the remote assistance request, detecting a third operation entered by the user, where the third operation acts on the second control, and starting, by the third device in response to the third operation, the second remote assistance application in the third device.

In another embodiment of this disclosure, that a control interface of the second application is displayed in the second remote assistance application in the third device includes an entrance icon of the second application is displayed in the second remote assistance application in the third device, and the second remote assistance application displays the control interface of the second application in response to an entry instruction received via the entrance icon of the second application.

In another embodiment of this disclosure, remotely controlling, by the third device in response to a control instruction received on the control interface of the second application, the second device includes sending, by the third device in response to the control instruction received on the control interface of the second application, a first control instruction to a first cloud platform by using the second remote assistance application, where the first control instruction is used to instruct the first cloud platform to send a second control instruction to the first device, the second control instruction is used to instruct the first device to send a third control instruction to the second device, and the first control instruction, the second control instruction, and the third control instruction are all used to instruct the second device to perform an operation corresponding to the control instruction, or sending, by the third device in response to the control instruction received on the control interface of the second application, a fourth control instruction to a first cloud platform by using the second remote assistance application, where the fourth control instruction is used to instruct the first cloud platform to send a fifth control instruction to the second device, and the fourth control instruction and the fifth control instruction are both used to instruct the second device to perform an operation corresponding to the control instruction, or sending, by the third device in response to the control instruction received on the control interface of the second application, a sixth control instruction to a first cloud platform by using the second remote assistance application, where the sixth control instruction is used to instruct the first cloud platform to send a seventh control instruction to a second cloud platform, the seventh control instruction is used to instruct the second cloud platform to send an eighth control instruction to the second device, and the sixth control instruction, the seventh control instruction, and the eighth control instruction are all used to instruct the second device to perform an operation corresponding to the control instruction.

In another embodiment of this disclosure, the remote assistance request further carries an application identifier of a fourth application for controlling a fourth device, where the fourth device is a controlled device, and the method further includes displaying, by the third device, the control interface of the second application or a control interface of the fourth application in the second remote assistance application.

In another embodiment of this disclosure, after starting, by the third device, a second remote assistance application in the third device, the method further includes receiving an application identifier of a fifth application for controlling a fifth device, and displaying, by the third device, a control interface of the fifth application in the second remote assistance application.

In another embodiment of this disclosure, the second remote assistance application of the third device receives application identifiers of control applications of at least two controlled devices, the at least two controlled devices include the second device and the fourth application, and after the third device displays the first control interface of the second application by using the second remote assistance application, the method further includes switching, in response to a received first switching instruction, the control interface of the second application currently displayed in the second remote assistance application of the third device to the control interface of the fourth application.

It should be understood that sequence numbers of the steps do not mean an execution sequence in the foregoing embodiments. The execution sequence of the processes should be determined based on functions and internal logic of the processes, and should not constitute any limitation on the implementation processes of embodiments of this disclosure.

In the embodiments of this disclosure, the first device may be divided into functional units based on the foregoing method examples. For example, each functional unit may be obtained through division based on each corresponding function, or two or more functions may be integrated into one unit. The integrated unit may be implemented in the form of hardware, or may be implemented in the form of a software functional unit. It should be noted that, in this embodiment of this disclosure, division into the units is an example, and is merely a logical function division. In actual implementation, another division manner may be used. An example in which each functional unit is obtained through division based on each corresponding function is used below for description.

Figure 18:
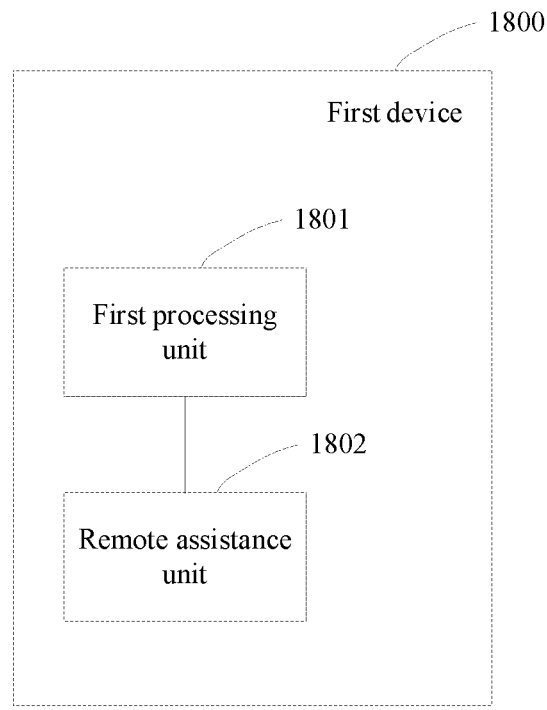
FIG. 18 is a schematic block diagram of units of a functional architecture of a first device that performs a remote assistance method according to an embodiment of this disclosure.

Referring to FIG. 18, the first device 1800 includes a first processing unit 1801 configured to, after first information is obtained, start a first remote assistance application, where the first information includes an application identifier of a second application for controlling a second device and an identifier for indicating that the second device supports remote control, a first device is a preset assisted device, and the second device is a controlled device, and a remote assistance unit 1802 configured to send a remote assistance request to a third device by using the first remote assistance application, where the third device is an assisting device of the first device, the remote assistance request carries the application identifier of the second application, and the remote assistance request is used to indicate the third device to start a second remote assistance application and remotely control the second device based on the second remote assistance application and the second application.

In another embodiment of this disclosure, the first processing unit 1801 is further configured to set, in response to a first request, the third device as an assisting device of the first device, where the first request is sent by the third device, and the first request carries account information of the third device, store an assistance relationship between the first device and the third device, where the assistance relationship between the first device and the third device includes a correspondence between account information of the first device and the account information of the third device, and send second information to the third device, where the second information carries the account information of the first device, or the second information carries the correspondence between the account information of the first device and the account information of the third device, and the second information is used to indicate the third device to set the first device as an assisted device of the third device.

In another embodiment of this disclosure, the first device is provided with an NFC module, and the first information is NFC tag information of the second device, and the first processing unit 1801 is further configured to, after the NFC tag information of the second device is obtained by using the NFC module, in response to determining, according to the identifier for indicating that the second device supports remote control, that the second device supports remote control, start the first remote assistance application in the first device.

In another embodiment of this disclosure, the first processing unit 1801 is further configured to, before the remote assistance request is sent to the third device by using the first remote assistance application, search for an assisting device of the first device, where the assisting device of the first device includes the third device.

In another embodiment of this disclosure, when there are at least two assisting devices of the first device, the third device is an assisting device with the highest priority in the assisting devices.

In another embodiment of this disclosure, the remote assistance unit 1802 is further configured to send a first remote assistance request to a first cloud platform by using the first remote assistance application, where the first remote assistance request carries the application identifier of the second application, the first remote assistance request is used to indicate the first cloud platform to send a second remote assistance request to the third device, and the second remote assistance request carries the application identifier of the second application.

In another embodiment of this disclosure, the first processing unit 1801 is configured to control the first remote assistance application to display a control interface of the second application.

In another embodiment of this disclosure, a control interface of the first remote assistance application in the first device includes a fourth control, where the fourth control is used to initiate help-seeking to the third device, the first processing unit 1801 detects a fourth operation entered by a user, where the fourth operation acts on the fourth control, and the remote assistance unit 1802 is further configured to send, in response to the fourth operation, the remote assistance request to the third device by using the first remote assistance application.

In another embodiment of this disclosure, the first processing unit 1801 is further configured to, before the remote assistance request is sent to the third device by using the first remote assistance application, obtain third information, where the third information includes an application identifier of a fourth application for controlling a fourth device and an identifier for indicating that the fourth device supports remote control, display a control interface of the fourth application by using the first remote assistance application, and send the remote assistance request to the third device by using the first remote assistance application, where the remote assistance request carries the application identifier of the second application and the application identifier of the fourth application.

In another embodiment of this disclosure, the first processing unit 1801 is further configured to obtain fourth information, where the fourth information includes an application identifier of a fifth application for controlling a fifth device and an identifier for indicating that the fifth device supports remote control, and display a control interface of the fifth application by using the first remote assistance application, and the remote assistance unit 1802 is further configured to send the application identifier of the fifth application to the third device.

In another embodiment of this disclosure, the first processing unit 1801 is further configured to enable the first device to obtain application identifiers of control applications of at least two controlled devices, the at least two controlled devices include the second device and the fourth device, and after the first remote assistance application in the first device displays the second control interface of the second application, control to switch, in response to a received second switching instruction, the control interface of the second application currently displayed in the first remote assistance application to the control interface of the fourth application.

In another embodiment of this disclosure, the first processing unit 1801 is further configured to obtain the first information by approaching or tapping the second device.

It should be noted that the information exchange, execution process, and other contents between the foregoing first devices/units are based on the same concept as the method embodiment of this disclosure. For the specific functions and technical effects, refer to the method embodiment sections, which are not described herein again.

In the embodiments of this disclosure, the third device may be divided into functional units based on the foregoing method examples. For example, each functional unit may be obtained through division based on each corresponding function, or two or more functions may be integrated into one unit. The integrated unit may be implemented in the form of hardware, or may be implemented in the form of a software functional unit. It should be noted that, in this embodiment of this disclosure, division into the units is an example, and is merely a logical function division. In actual implementation, another division manner may be used. An example in which each functional unit is obtained through division based on each corresponding function is used below for description.

Figure 19:
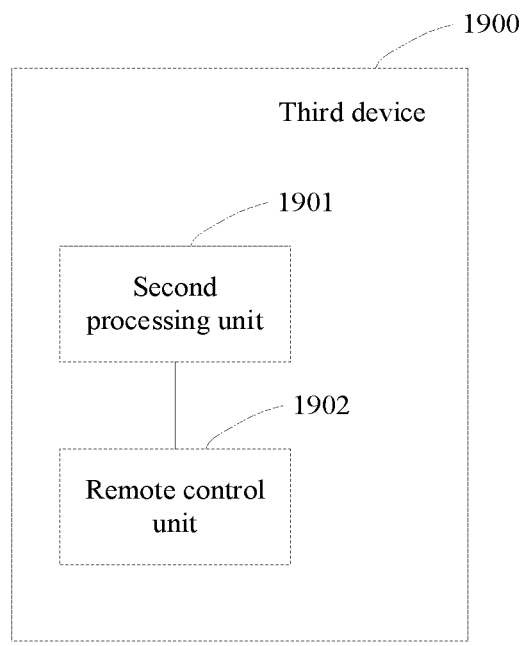
FIG. 19 is a schematic block diagram of units of a functional architecture of a third device that performs a remote assistance method according to an embodiment of this disclosure.

Referring to FIG. 19, the third device 1900 includes a second processing unit 1901 configured to start, in response to reception of a remote assistance request, a second remote assistance application in the third device, where the remote assistance request carries an application identifier of a second application for controlling a second device, the second device is a controlled device, and a control interface of the second application is displayed in the second remote assistance application, and a remote control unit 1902 configured for the third device to remotely control the second device in response to a control instruction received on the control interface of the second application.

In another embodiment of this disclosure, the second processing unit 1901 is further configured to control the second remote assistance application to display a first interface, where the first interface includes a first control, and the first control is used to indicate the third device to search for an electronic device, detect a first operation, where the first operation acts on the first control, control the second remote assistance application to display, in response to the first operation, a second interface, where the second interface displays an identifier of a found electronic device, and the identifier of the found electronic device includes an identifier of the first device, detect a second operation, where the second operation acts on the identifier of the first device, and send, in response to the second operation, a first request to the first device by using the second remote assistance application, where the first request carries account information of the third device, and the first request is used to indicate the first device to set the third device as an assisting device of the first device.

In another embodiment of this disclosure, the second processing unit 1901 is further configured to display, in response to reception of the remote assistance request, a third interface, where the third interface includes a second control and a third control, the second control is used to accept the remote assistance request, and the third control is used to reject the remote assistance request, detect a third operation entered by the user, where the third operation acts on the second control, and start, in response to the third operation, the second remote assistance application in the third device.

In another embodiment of this disclosure, the second processing unit 1901 is further configured to control an entrance icon of the second application to be displayed in the second remote assistance application, and control the second remote assistance application to display the control interface of the second application in response to an entry instruction received via the entrance icon of the second application.

In another embodiment of this disclosure, the remote control unit 1902 is further configured to send, in response to the control instruction received on the control interface of the second application, a first control instruction to a first cloud platform by using the second remote assistance application, where the first device is an assisted device of the third device, the first control instruction is used to instruct the first cloud platform to send a second control instruction to the first device, the second control instruction is used to instruct the first device to send a third control instruction to the second device, and the first control instruction, the second control instruction, and the third control instruction are all used to instruct the second device to perform an operation corresponding to the control instruction, or send, in response to the control instruction received on the control interface of the second application, a fourth control instruction to a first cloud platform by using the second remote assistance application, where the fourth control instruction is used to instruct the first cloud platform to send a fifth control instruction to the second device, and the fourth control instruction and the fifth control instruction are both used to instruct the second device to perform an operation corresponding to the control instruction, or send, in response to the control instruction received on the control interface of the second application, a sixth control instruction to a first cloud platform by using the second remote assistance application, where the sixth control instruction is used to instruct the first cloud platform to send a seventh control instruction to a second cloud platform, the seventh control instruction is used to instruct the second cloud platform to send an eighth control instruction to the second device, and the sixth control instruction, the seventh control instruction, and the eighth control instruction are all used to instruct the second device to perform an operation corresponding to the control instruction.

In another embodiment of this disclosure, the remote assistance request further carries an application identifier of a fourth application for controlling a fourth device, where the fourth device is a controlled device.

The second processing unit 1901 is further configured to display the control interface of the second application or a control interface of the fourth application in the second remote assistance application.

In another embodiment of this disclosure, the second processing unit 1901 is further configured to receive an application identifier of a fifth application for controlling a fifth device, and display a control interface of the fifth application in the second remote assistance application.

In another embodiment of this disclosure, the second remote assistance application of the third device receives application identifiers of control applications of at least two controlled devices, the at least two controlled devices include the second device and the fourth application, and the second processing unit 1901 is further configured to, after the third device displays the first control interface of the second application by using the second remote assistance application, switch, in response to a received first switching instruction, the control interface of the second application currently displayed in the second remote assistance application of the third device to the control interface of the fourth application.

It should be noted that the information exchange, execution process, and other contents between the foregoing third devices/units are based on the same concept as the method embodiment of this disclosure. For the specific functions and technical effects, refer to the method embodiment sections, which are not described herein again.

Persons skilled in the art can clearly understand that, for convenience and conciseness of description, the division of the foregoing functional units is used as only an example. In an actual application, the foregoing functions may be allocated to and completed by different functional units as required, that is, an internal structure of the first device (or the third device) is divided into different functional units to complete all or some of the functions described above. The functional units in the embodiments may be integrated into one processing unit, or each unit may be individually and physically present, or two or more units may be integrated into one unit. The integrated unit described above may be implemented in the form of hardware, or may be implemented in the form of software functional units. In addition, the specific names of the functional units are only for the convenience of distinguishing from each other, and are not used to limit the protection scope of this disclosure. For a specific working process of the units the foregoing system, refer to the corresponding process in the foregoing method embodiments. Details are not described herein again.

An embodiment further provides a computer-readable storage medium having a computer program stored thereon. When the computer program is executed by a processor, the steps of the foregoing method embodiments may be implemented.

An embodiment of this disclosure further provides a computer program product. When the computer program product is run on a first device, the first device is enabled to implement the steps in the foregoing method embodiments.

When the integrated unit is implemented in the form of a software functional unit and sold or used as an independent product, the integrated unit may be stored in a computer-readable storage medium. Based on such an understanding, all or some of the procedures of the method in the embodiments of this disclosure may be implemented by a computer program instructing relevant hardware. The computer program may be stored in a computer-readable storage medium. When the computer program is executed by a processor, the steps in the foregoing method embodiments may be implemented. The computer program includes computer program code. The computer program code may be in a source code form, an object code form, an executable file form, some intermediate forms, or the like. The computer-readable medium may include at least any entity or apparatus that can carry computer program code to the first device, a recording medium, a computer memory, a read-only memory (ROM), a RAM, an electrical carrier signal, a telecommunication signal, and a software distribution medium, for example, a USB flash drive, a removable hard disk, a magnetic disk, or an optical disk. In some jurisdictions, the computer-readable medium cannot be the electrical carrier signal or the telecommunication signal according to legislation and patent practices.

An embodiment of this disclosure further provides a chip system. The chip system includes a processor, the processor is coupled to a memory, and the processor executes a computer program stored in the memory, to implement the steps in any method embodiment of this disclosure. The chip system may be a single chip or a chip module including a plurality of chips.

In the foregoing embodiments, the description of each embodiment has respective focuses. For a part that is not described in detail or recorded in an embodiment, refer to related descriptions in other embodiments.

A person of ordinary skill in the art may be aware that, in combination with the examples described in embodiments disclosed in this specification, units and steps of methods may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

The foregoing embodiments are merely used to describe the technical solutions of this disclosure, but are not intended to limit this disclosure. Although this disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this disclosure, all of which shall fall within the protection scope of this disclosure.

The invention claimed is:

1. A method implemented by a system, wherein the method comprises:
  obtaining, by a first device of the system, first information comprising an application identifier of an application for controlling a second device of the system and a first identifier for indicating that the second device supports a remote control, wherein the application comprises a first control interface;
  starting, by the first device in response to obtaining the first information, a first remote assistance application in the first device;
  sending, by the first device, a first remote assistance request to a third device of the system using the first remote assistance application, wherein the first remote assistance request carries the application identifier, and wherein the third device is an assisting device of the first device;
  starting, by the third device in response to receiving the first remote assistance request and using the application identifier, a second remote assistance application in the third device that displays the first control interface;
  receiving, by the third device on the first control interface, a first control instruction;
  sending the first control instruction information from the third device to the first device;
  forwarding the first control information from the first device to the second device; and
  remotely controlling, by the third device in response to the first control instruction, the second device.

2. The method of claim 1, further comprising:
  displaying, by the second remote assistance application, a first interface comprising a first control, wherein the first control instructs the third device to search for an electronic device;
  detecting, by the third device, from a user, and on the first control, a first operation;
  displaying, by the second remote assistance application in response to the first operation, a second interface, wherein the second interface displays a second identifier of the electronic device, and wherein the second identifier comprises a third identifier of the first device;
  detecting, by the third device, from the user, and on the third identifier, a second operation;
  sending, by the third device, in response to the second operation, to the first device, and using the second remote assistance application, a first request carrying first account information of the third device, wherein the first request instructs the first device to set the third device as the assisting device;
  setting, by the first device in response to receiving the first request, the third device as the assisting device; and
  storing, by the first device, an assistance relationship between the first device and the third device, wherein the assistance relationship comprises a correspondence between second account information of the first device and the first account information.

3. The method of claim 2, wherein after setting the third device as the assisting device, the method further comprises:
  sending, by the first device to the third device, second information carrying either the second account information or an assistance relationship between the second account information and the first account information;
  setting, by the third device in response to receiving the second information, the first device as an assisted device of the third device; and
  storing, by the third device, the assistance relationship.

4. The method of claim 1, wherein the first device comprises a near-field communication (NFC) system, wherein the first information comprises NFC tag information of the second device, and wherein the method further comprises:
  obtaining, by the first device using the NFC system, the NFC tag information;
  determining, by the first device according to the first identifier, that the second device supports the remote control; and
  further starting, by the first device, in response to determining that the second device supports the remote control, and after obtaining the NFC tag information, the first remote assistance application.

5. The method of claim 1, further comprising:
  displaying, by the third device in response to receiving the first remote assistance request, a third interface, wherein the third interface comprises a second control to accept the first remote assistance request and a third control to reject the first remote assistance request;
  detecting, by the third device from the user, a third operation on the second control; and
  further starting, by the third device in response to the third operation, the second remote assistance application.

6. The method of claim 5, further comprising:
displaying, by the third device in the second remote assistance application, an entrance icon of the application;
receiving, by the third device via the entrance icon, an entry instruction; and
further displaying, by the third device, in the second remote assistance application, and in response to the entry instruction, the first control interface.

7. The method of claim 1, further comprising:
sending, by the first device, to a cloud platform of the system, and using the first remote assistance application, a second remote assistance request carrying the application identifier, wherein the second remote assistance request instructs the cloud platform to send a third remote assistance request to the third device; and
sending, by the cloud platform, in response to receiving the second remote assistance request, and to the third device, the third remote assistance request, wherein the third remote assistance request carries the application identifier.

8. The method of claim 1, further comprising:
sending, by the third device, in response to the first control instruction, to a cloud platform of the system, and using the second remote assistance application, a second control instruction, wherein the second control instruction instructs the second device to perform an operation corresponding to the first control instruction;
sending, by the cloud platform, in response to receiving the second control instruction, and to the first device, a third control instruction instructing the second device to perform the operation; and
sending, by the first device, in response to receiving the second control instruction, and to the second device, a fourth control instruction instructing the second device to perform the operation.

9. A method implemented by a first device, wherein the method comprises:
obtaining first information comprising a first application identifier of a first application for controlling a second device and a first identifier for indicating that the second device supports a remote control;
starting, in response to obtaining the first information, a first remote assistance application in the first device;
sending, to a third device using the first remote assistance application, a first remote assistance request,
wherein the third device is an assisting device of the first device, and
wherein the first remote assistance request carries the first application identifier and instructs the third device to start a second remote assistance application;
receiving control information from the third device; and
forwarding the control information to the second device.

10. The method of claim 9, further comprising:
receiving, from the third device, a first request carrying first account information of the third device;
setting, in response to receiving the first request, the third device as the assisting device;
storing an assistance relationship between the first device and the third device, wherein the assistance relationship comprises a correspondence between second account information of the first device and the first account information; and
sending, to the third device, second information carrying the second account information or the correspondence, wherein the second information instructs the third device to set the first device as an assisted device of the third device.

11. The method of claim 9, wherein the first device comprises a near-field communication (NFC) system, wherein the first information is NFC tag information of the second device, and wherein the method further comprises:
obtaining, using the NFC system, the NFC tag information;
determining, according to the first identifier, that the second device supports the remote control; and
further starting, in response to determining that the second device supports the remote control and after obtaining the NFC tag information, the first remote assistance application.

12. The method of claim 9, further comprising sending, to a cloud platform using the first remote assistance application, a second remote assistance request carrying the first application identifier, wherein the second remote assistance request instructs the cloud platform to send a third remote assistance request to the third device, and wherein the second remote assistance request carries the first application identifier.

13. The method of claim 9, wherein after starting the first remote assistance application, the method further comprises displaying, using the first remote assistance application, a first control interface of the first application.

14. The method of claim 13, wherein a second control interface of the first remote assistance application comprises a control initiating help-seeking to the third device, wherein the method further comprises:
detecting, from a user, an operation acting on the control; and
sending, in response to the operation, to the third device, and using the first remote assistance application, the first remote assistance request.

15. The method of claim 14, wherein before sending the first remote assistance request, the method further comprises:
obtaining second information comprising a second application identifier of a second application for controlling a fourth device and a second identifier for indicating that the fourth device supports the remote control;
displaying, using the first remote assistance application, a third control interface of the second application; and
further sending, to the third device using the first remote assistance application, the first remote assistance request carrying the second application identifier.

16. The method of claim 14, wherein after sending the first remote assistance request, the method further comprises:
obtaining, by the first device, second information comprising a second application identifier of a second application for controlling a fourth device and a second identifier for indicating that the fourth device supports the remote control;
displaying, using the first remote assistance application, a third control interface of the second application; and
sending, to the third device, the second application identifier.

17. A first device comprising:
a memory configured to store instructions and a first remote assistance application;
one or more processors coupled to the memory and configured to execute the instructions to cause the first device to:

obtain first information comprising an application identifier of an application for controlling a second device and a first identifier for indicating that the second device supports a remote control;

start, in response to obtaining the first information, the first remote assistance application;

send, to a third device using the first remote assistance application, a first remote assistance request, wherein the third device is an assisting device of the first device, wherein the first remote assistance request carries the application identifier and instructs the third device to start a second remote assistance application;

receive control information from the third device; and forward the control information to the second device.

18. The first device of claim 17, wherein the one or more processors are further configured to execute the instructions to cause the first device to:

receive, from the third device, a first request carrying first account information of the third device;

set, in response to receiving the first request, the third device as the assisting device;

store an assistance relationship between the first device and the third device, wherein the assistance relationship comprises a correspondence between second account information of the first device and the first account information; and send, to the third device, second information carrying either the second account information or the correspondence, wherein the second information instructs the third device to set the first device as an assisted device of the third device.

19. The first device of claim 17, wherein the first device comprises a near-field communication (NFC) system, wherein the first information comprises NFC tag information of the second device, and wherein the one or more processors are further configured to execute the instructions to cause the first device to:

obtain, using the NFC system, the NFC tag information;

determine, according to the first identifier, that the second device supports the remote control; and further start, in response to determining that the second device supports the remote control and after obtaining the NFC tag information, the first remote assistance application.

20. The first device of claim 17, wherein the one or more processors are further configured to execute the instructions to cause the first device to send, to a cloud platform using the first remote assistance application, a second remote assistance request carrying the application identifier and instruct the cloud platform to send a third remote assistance request to the third device, and wherein the second remote assistance request carries the application identifier.

* * * * *